US00RE39044E

(19) United States
(12) Reissued Patent
Ross

(10) Patent Number: US RE39,044 E
(45) Date of Reissued Patent: Mar. 28, 2006

(54) PERIMETER COATING ALIGNMENT

(76) Inventor: Gregory E. Ross, 2007 Long Leaf Ct., Santa Rosa, CA (US) 95403

(21) Appl. No.: 09/706,491

(22) Filed: Nov. 3, 2000

Related U.S. Patent Documents

Reissue of:
(64) Patent No.: 5,830,529
Issued: Nov. 3, 1998
Appl. No.: 08/780,594
Filed: Jan. 8, 1997

U.S. Applications:
(60) Provisional application No. 60/009,696, filed on Jan. 11, 1996.

(51) Int. Cl.
*B41M 3/12* (2006.01)
*B05D 3/00* (2006.01)
*B05D 1/36* (2006.01)
*B32B 31/00* (2006.01)

(52) U.S. Cl. ..... 427/152; 427/146; 427/148; 427/149; 427/258; 427/270; 427/271; 427/276; 427/375; 427/402; 156/230; 156/240; 156/239; 156/252

(58) Field of Classification Search ..... 427/146, 427/147, 148, 149, 152, 164, 258, 271, 270, 427/276, 284, 375, 402; 156/230, 240, 239, 156/252; 428/914
See application file for complete search history.

(56) References Cited

U.S. PATENT DOCUMENTS 4,104,111 A * 8/1978 Mack ..... 156/656
4,337,289 A * 6/1982 Reed et al. ..... 428/195
4,673,609 A * 6/1987 Hill ..... 428/187
4,936,212 A * 6/1990 Moss ..... 101/216
5,069,954 A * 12/1991 Cole et al. ..... 428/202
5,288,358 A * 2/1994 Logan ..... 156/248
5,312,645 A * 5/1994 Dressler ..... 427/148
5,391,082 A * 2/1995 Airhart ..... 439/68
5,525,177 A * 6/1996 Ross ..... 156/240
5,560,796 A * 10/1996 Yoshimura ..... 156/240

* cited by examiner

*Primary Examiner*—Michael Barr
(74) *Attorney, Agent, or Firm*—Andrews Kurth LLP

(57) ABSTRACT

A method of forming a scratch resistant color ink pattern of multi-color coatings (5) onto a see-through panel (6) with exact registration between successive color coatings of the pattern. The method of the invention includes the steps of: providing a base material (1) having an ink printable release coating on one side thereof; applying a first color coating of ceramic ink (75) to the printable release coating side of the base material (1); applying at least one additional color coating of ceramic ink (76) over at least a portion of the first color coating of ceramic ink (75); perforating the base material to provide a pattern of light passages (28) therethrough, the light passages (28) defining aligned edges of successive color coatings of ceramic inks to ensure exact registration between said successive color coatings of ceramic inks; transferring the pattern of color coatings of ceramic inks (5) onto a surface of a see-through panel (6); and heating the see-through panel (6) to fuse said pattern of color coatings of ceramic inks (5) onto said surface of said see-through panel (6). In one embodiment, the base material (1) consists of water slide paper and such that the pattern of color coatings is wetted and transferred to the see-through panel by water slide transfer. In another embodiment, the base material consists of heat transfer paper and the pattern of color coatings is transferred by application of heat and pressure or just pressure alone.

23 Claims, 35 Drawing Sheets

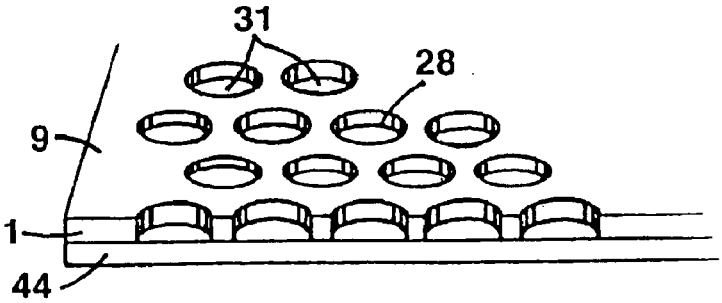
FIG. 37A
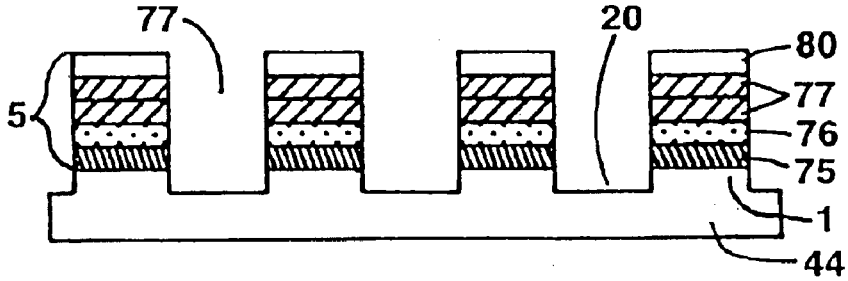
FIG. 37B
FIG.37C
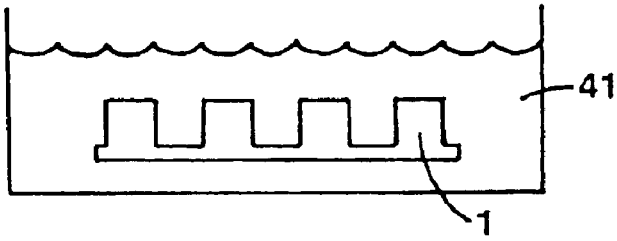
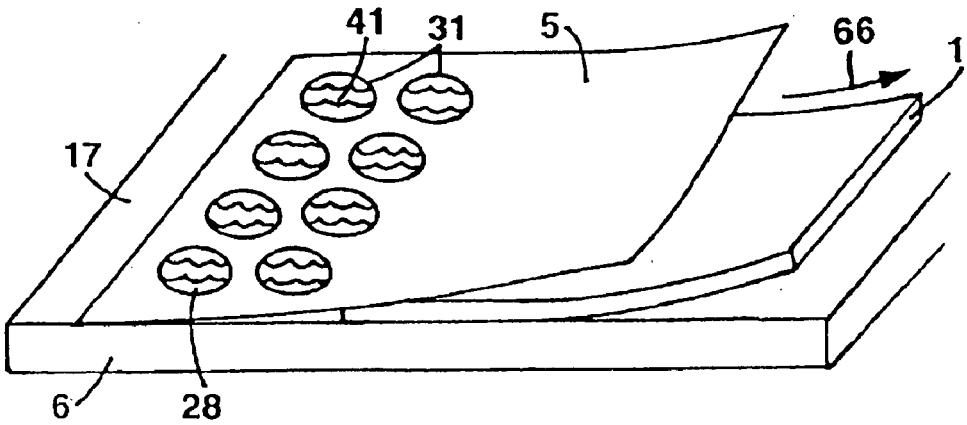
FIG. 37D

PERIMETER COATING ALIGNMENT

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,830,529. The reissue applications are application Nos. 09/706,491 (the present application), and 10/720,003 which is a divisional reissue of U.S. Pat. No. 5,830,529, and 10/720,002 which is a continuation reissue of U.S. Pat. No. 5,830,529.*

This application claims the benefit of U.S. Provisional application Ser. No. 60/009,696 filed Jan. 11, 1996.

FIELD OF THE INVENTION

This invention relates to the application and uses of coatings including precious metals, metallics, inks, toners, and the like applied to an original base, intermediate or final surface for numerous purposes including identification of documents, as a deterrent to counterfeiting, as a means to provide identifiable structures, as copyright protection, as radiation shields, as display means and as a perimeter coating alignment means useful for numerous purposes.

BACKGROUND OF THE INVENTION

There exists numerous needs which have thus far not been filled for printing or other imaging or coatings, application which can provide a precise edge limit to a material and to one or more coatings thereon.

It is particularly beneficial when a coating has an end point or a transitional point between two separate coatings. For example, when it is intended to have transparent areas beside partially or fully opaque areas; or when two separate colored or structured coatings are in direct edge contact or with a defined gap between them; or when it is desired not have any overlap between two solid adjoining coatings such that the overlapped portion would present a different appearance of color due to the overlapping coatings, or when it is desired to have large numbers of defined edges when forming a pattern such as patterns where light may be transmitted through the surface of a material, accurate coating or painting is necessary.

There are many situations, including lithography, offset and smaller sizes of screen printing where good quality of registration is possible. However, any misregistration may not be visible in the general area of the print, but becomes very noticeable along the edge of the print area because the misregistration of one or more colors show up against the non-printed background.

The term "coating application" or "print" or "printed" or "printing" or "transfer" or "vapor deposition" or "stamping" or "printing surface" or "high surface" or "sublimitation" or "micro saturation", or similar, as used herein, includes, but is not limited to, any method of applying or positioning a coating onto or in close proximity to a base or other surface and include traditional methods such as screen print, lithography, offset, ink jet, digital printing, sublimitation, paint jet, electrostatic attraction of repulsion, magnetic attraction of repulsion, or any other method of causing a visible or invisible coating to be applied on or in close proximity to a base or other material or substrate or another coating or substance and includes new technology print application methods when developed. Application methods also include: toner particles, liquid and particulates, paint jet, powder transfer, vapor deposited metals, hand applications, such as brush, air brush, roller, spray and the like, electrostatic attraction, electrostatic repulsion from one surface to another, conductive deposition, magnetic attraction, magnetic repulsion, charged particles, gravity, liquid flow, blade coating, reverse roll coating, reflective materials or treatments, retro-reflective treatment, including prisms, photochromic, coatings applied and partially removed through a variety of treatments such as laser etching, acid embossing, air abrasion, mechanical abrasion, and other means to affect a previously applied coatings; coatings placed on intermediary materials, combination with coatings placed on primary or secondary materials and any combinations of placing those bases or substrates together to combine coatings. For example, reactive coatings, or other sources which are reactive to light, radiation, frequencies of sound or combinations with any other substances type may be used, including inter-reactive coatings whereby two coatings react when placed in proximity one with the other, or combinations of two or more, such as a chemical reaction. Coatings may also react in the future to stimuli or external input such as light sensitive substances, such as polymers, including; coatings which react to electrical fields or electrical current; flowable solids; coatings which become viscous at one environment, for example, temperature, but remain solid in a different environment; metals including precious metals; halographic images, silver halide plates, photographic plates, or photographic materials; coatings which are called release coatings where the molecular structures weakens upon exposure to outside stimuli or forces such as light sensitive coatings, or heat sensitive coatings, and combinations of any and all of the above. A certain coating may be made up of two or more coatings which have been partially or fully blended together or mixed together such as to cause differential effects under some later process, inter-reaction of the mixed components or any other reason, particularly when not mixed thoroughly, so portions of the certain coating are discrete.

By way of introduction, security documents, or objects or documents subject to counterfeit, such as software discs, CD's, music tapes, share certificates and the like can use perimeter coating alignment to provide either visible or invisible coating treatments in precise repeatable patterns to provide identification which may not be readily visible. For example, precisely pattern coatings contained below the surface may be readable by electronic scanners, metal detectors, magnetrometers, and many other teachings of the present invention such that the concealed pattern becomes visible when tested, but which is not otherwise apparent. As a further example, by using perimeter coating alignment it is possible to encapture coatings or gases which react when exposed to oxygen, or air. Anybody opening a document or other structure as an attempt to forge or counterfeit it may see a different color after the air enters the structure. For example a coating may change color or texture upon exposure to oxygen, thereby thwarting any attempt to identify and reproduce it. Separately, if the counterfeiters saw, for example, red on a surface they would assume it was red and therefore reproduce a counterfeit document with the color red. In reality, the coating was not red, but turned red upon exposure to the air.

Another example includes documents or products where a coating is sensitive to light and when protected from exposure to light, such as when stored in a dark place, the coatings on the surface of sub-surface will not be affected, but if exposed to light such as by the opening or removal of covering coatings, will react to light and change their chemical constructions, colors, or other reactions caused on certain coatings by natural or artificial light sources including UV sources or the sun.

It is now possible to print sections of credit cards with see through portions which can encapsulate a perimeter printed indicia whether it be reflective, holographic or an opaque coating such that multiple layers of coatings in exact register provide an identification security which is hard to reproduce outside of the present invention. It is also possible to encapsulate metallic coatings or other reflective or reactive substances within the credit card to provide a defined area which is not visible to the normal consumer but which can be scanned using other means such as x-ray, magnetic sensors, or the like, to determine the shape of, for example Bank or Credit Card Company logos. This would typically be a metallic layer placed within the structure of the card. It is possible to have different metallic structures with the same edge alignment using the present invention.

In retail stores it is common, particularly in clothing departments to provide mirrors for consumers and shoppers to see themselves wearing new clothing, shoes, and the like. These mirrors provide an ideal opportunity for promotional or logo messages promoting certain brands of merchandise or the store identity. By being able to print four color process in large areas with defined perimeters it means that, for example, a central area of a mirror can be left fully reflective, and yet the perimeter can be presented with a multi-colored image with the edge of the image being in exact registration despite the larger sizes of these mirrors which are typically a minimum of one meter by two meters.

Known printing methods, such as lithography, offset, screen printing, toner transfer and others, are capable of reproducing good registration results. However, these techniques are limited in accordance with the type of materials or coatings which can be applied. Typically, lithography uses transparent inks which are not resistant to sunlight and therefore, typically used for publications such as books and magazines and other documents. Offset, combined with UV type inks, are capable of producing durable colored images, which will not fade as quickly in sunlight. However, both these processes are unable to maintain an exact registration of edge alignments in repetition because of small variations in the printing process. Examples of this include slippage of the printed material and of the equipment itself, which cause minor movements of the print registration. Additionally, changes in temperature, expansion and contraction of metal machinery and the like, all can contribute to variations in registration, whether small or large.

There are numerous other uses for perimeter coating alignment. For example, it is not currently possible to accurately print multi-color grid patterns on the sunroofs of automobiles. Typically, the sunroof has a grid pattern to permit visibility through the sunroof and yet to restrict the heat radiated from the sun onto the occupants of the vehicle. To provide effective outward visibility, the coating, usually ceramic ink and black in color and is printed either as discrete dots or as a coating pattern with holes in the black coating. The commonly used printing method is screen printing. With the present invention, it is now possible to retain the current pattern of black on the passengers side of the sunroof, and yet from the outside have numerous possibilities which are advantageous. By being able to add a color or multi-colors, manufacturers can now color coordinate the exterior side of the sunroof grid pattern to the color of the vehicle, could incorporate the car manufacturers logo, and can also provide decorate treatments. The colors on the outside are not readily visible to the passengers on the inside, who still retain their visibility through the sunroof. By incorporating a heat transmissive coating, such as a metal, which may be deposited or hot foil stamped or other means, in alignment with ink coatings, as taught herein, and then supplying electric current to produce heat, the sunroof will be heated to evaporate condensation, or melt off ice and snow. A metallic reflective coating can also be overlaid accurately on the grid pattern to reflect heat from the sun.

In screen printing and other printing processes, it is known in the art to provide a blackout tape or stencil or emulsion to produce a defined area of the screen. However, this does not produce a defined edge on the material, because of a variety of factors including slippage of the printing material, stretching of the screen, expansion of the equipment, mechanical variations and other reasons so that the image produced does not have a defined edge in a repeatable manner from this method.

The present invention provides significant advantages in the areas of light control where quantities of light can be adjusted by the installation of the material onto a see through surface such as a window. As a heat control method, the present invention can offer gradiated open area possibilities where it can be installed on a window to reduce the amount of sunlight entering a building. This can also be enhanced by the addition of reflective material on the outside of the present invention to further reflect sunlight, reduce heat absorption in the material, and via conduction thereby reduce heat in the glass, and heat into the interior of the building. Another use is as a decorative material in combination with a variety of surface coatings. Security applications can also benefit whereby the material acts as a vision barrier in one direction while providing acceptable visibility from the other side, such as in surveillance applications at airports and the like or at security gates at factories and other similar applications.

The surface of a material may also be treated by processes whereby interesting surface effects may be created for the simulation of other material or as light or radiation reflective means when combined with various available surface coatings.

Protection of a material in sunlight conditions can be obtained by the addition of UV resistant formulations in the base material or by the addition of coatings on the exposed surfaces of the material or by the use of a laminate film or similar material to provide protection for both the material and any indicia or visible coatings placed on or in close proximity to the surface thereof.

As a method of producing exact registration, Hill, in U.S. Pat. No. 4,925,705, discloses a wash off method of obtaining a precisely aligned print. This is, in fact, the photo stencil process used in numerous industries since the early 1980's and for whom Kodak Corp. and E. I. DuPont provide materials for processing and Kodak is believed to have provided the chemicals and instruction steps for this process through the 1970's. However, the problem is that the process is limited as to the type of coatings which can be applied and subsequently removed. The present invention solves this limitation and can be used to apply any thickness of coatings, and any compositions of coatings. The photo stencil process cannot remove the thick coatings or thick metalized coatings which have structural integrity because the coatings become stronger than the layer below and will not break away during the removal process. The present invention solves those problems. Further, during the washoff removal process, damage occurs to the ink perimeters and to the top surface of the last ink due to the action of pressure from water and, depending on the chemicals used, solvents and other undesirable liquids. There also exists the problem of waste disposal of the removal fluids, and the material which has been removed. The present invention does not have these problems.

There are numerous uses for the present invention, including being able to control the location of and limit the perimeter of one or more types or combinations of coatings on one or more bases or coatings on or in other surfaces or materials and these will becomes readily apparent in the teachings of the present invention.

DESCRIPTION OF THE DISCLOSURE

The advantage of perimeter printing is to provide control of these edge perimeters but the same advantages may accrue using combinations of coatings and alignment methods or other methods as taught herein. The term "perimeter printing", "perimeter surfaces", or similar, as used herein, includes, but is not limited to, all the subject matter of the present invention and includes the definitions of "perimeter" and "printing" and is intended to mean a printing or coating apparatus, process, and methods providing substantially exact registration whereby the limits, or perimeter, of the printing or coating area of areas are defined, repeatable and controllable and this in turn produces a precise result in accordance with the teachings of the present invention, and as a process to produce numerous products for numerous purposes. The term "control", "perimeter control", "boundary control", or similar, as used herein, includes, but is not limited to, the effect whereby the perimeter is a partial or fully limiting factor to the location of a coating or coatings such as to prevent application of coatings in a normal layer from exceeding the perimeter or edge. The perimeter control surface may be either the downward side wall below the positioning of the coating or may be the reverse whereby the coating is limited, by a higher sidewall such as in a cavity or recess to act as a containment means for the coating. The term "edge", "edges", "cliff", or similar, as used herein, includes, but is not limited to, any one or more perimeters of a material wherein at least one surface or layer is at a different height or position to another surface or layer. The position of the edge is defined by the change of direction from one surface or plane of a material or materials to another surface or plane, whether the plane is flat or curved and may be at right angles to the plane of any surface of the material or at another angle to the plane of the material and there may be multiple edges in any one material and numerous and varied angles of edges or combinations of angles or positions of an edge or edges on any one or more pieces or sections of material. There may be several edges at different levels on each material such as to cause a different plane for the application or retention of one or more coatings, or combinations of coatings. The term "coat" or "coated" or "coatings", or similar, as used herein, includes, but is not limited to, visible and invisible substances such as inks, paints, powders, toners, flowable solids, solidified liquids, metals, including precious metals, plastics, thin films, electroconductive, thermochromic, photochromic, phosphorescent, luminescent, reflective, retroreflective, holographic, evaporative, expansive, reactive to such as actinic radiation, inter-reactive coatings, heat conductive, non heat conductive, charged particles, polymers, crystalline substances, foil and any other visible, partially opaque, partially transparent, or other substances which can be detected as disclosed herein, together with compositions and/or combinations of any coatings including components to provide friction or adhesion at one extreme or release from adhesion or friction at the other extreme, precious metals, phase change substances, printed substances, coatings for specific printing or other processes such as electrostatic transfer, laser, etch, acid emboss, lithography, offset, screen printing, ink-jet, water based and pigment based inks, dyes, ceramic inks, ultraviolet & infra red responsive inks, coloring compounds and the like, surface modifying treatments and any combinations of any of these substances.

There exists numerous needs which have thus far not been filled for printing or application of other imaging or coatings that can provide a precise edge limit to the material and to one or more coatings.

Screen printing, due to well known factors, such as stretching of the screen, variations of the registration between the screen and the surface to be printed on, differences in temperature, squeegee pressure and the like all make it difficult to produce good registration in large sizes. A mechanical repeatability of one millimeter on a five meter long screen printing press is considered good quality. When doing four color process, this tolerance is quite acceptable. However, where it is required to have thousands of defined edges in the print surface, such that only one color must be seen from one side of transparent material and on the other color or multi-color image from the other, this tolerance is not adequate as the misaligned colors will become visible at the perimeters of the edges due to this misregistration. The term "perimeter", "side wall", "boundary" or similar, as used herein, includes, but is not limited to, an edge portion whereby one plane of the base changes direction in one or more places into a second plane and at the point of the angle or angles of change, is considered to be the perimeter of the area included for primary coating. As will be seen, it is possible for one or more layers of the coating to protrude beyond the perimeter and the perimeter is intended to be an established limit, but may be deliberately exceeded, when coating.

While it is possible to make multi-layer prints, it is not possible to have certain segments of that print area with two or more layers in perimeter edge alignment. It is possible to use die cutting or laser cut as a means of cutting through the multi-layers of coating to form a sidewall edge. The problem with this technique is that as a die or knife cuts through the various layers, it is impossible not to force the upper layers down along the sidewalls of the layers below as the cutting action occurs. A laser can be used to provide precise edge cutting, but a laser set to cut one material may not be capable of cutting through a variety of different coatings such as metals, heat reactive coatings and the like evisioned in the teachings of the present invention, without causing some damage or distortion of the surface. In fact, the teachings of the present invention use laser to deliberately modify a previously edge aligned layer of coatings for identification purposes by maneuvering the laser at a variety of angles to create distinctive patterns in conjunction with selected coating orientations.

Documents such as Share Certificates and other documents of a legal or contractual nature or which have a face value, such as bonds, stocks and shares can be produced with unique patterns. By using the present invention it is possible to produce various thicknesses of coatings, such as the appearance of the old fashioned wax seal, with multiple layers of such coatings all with exactly registered edges, which would not normally be possible with such a thick coating. It is also possible to have one or more of the coatings using different substances so that exposure to light, such as ultraviolet light, will show, from the edge, an ultra fine line delineating the presence of that coating in between the other coatings, all in edge alignment, as an example.

Edge registered multicolor process printing as taught herein may also be used for placement onto a variety of surfaces, including brass plaques, glass brick or any other surface where the perimeter of the printing needs to not have any overlap, even if the printing inside the print area is misregistered slightly, may be used.

It is desirable to be able to present visual images such as logos, advertising, decorative colors, color coordinated designs and other visual patterns while still retaining visibility into storage containers and other structures. The term "decorative" or "image", or similar, as used herein, includes, but is not limited to light reflective substances, color or colors, and other visible indicia, applied to the base and to other coatings may also be subsequently transposed to another surface whereby an image is readable either via a natural eye or by artificial intelligence means such as a scanner or other sensory equipment such that it will present a shape or shapes or outline that is different over its surface. In addition, the decorative coating may be a monochromatic coating of only one color or one material. The use of perimeter printing allows for multi colored, multi layered coatings which can leave discreet area or areas of the see-through container free of coating to allow visibility to see the contents of the container.

The use of precisely edged sections of coatings, including light transmissive materials such as liquid crystal, with certain polarity alignments of the crystals, can provide certain shutter effects to control the angle of view. Other materials, including silver halide and manufactured prisms, laser treatments of surfaces, and others, can all provide controlled angles and amounts of light reflectance and/or transmittance and also produce control of the angle of light vision from one side, or the other, of a structure.

It is desirable to have observation without the stringent requirements of security or surveillance uses. Examples of this would include zoos where it is desirable for the well being of the animals that they not be subjected to the constant awareness of human beings in close proximity to them. Therefore, it is possible to provide a printed scene of a natural environment, for example African plains or tropical jungle on the side facing the animals, while the side facing the humans provides the best arrangement of light transmittance namely a clear see through surface with a substantially black partial coating. The term "black",or similar, as used herein, includes, but is not limited to, any substantially dark typically monochromic, light absorbing color or coating or substance which has low level of light reflectance and a high level of light absorbency. This means that the humans see the animals, while the animals are not as aware, if aware at all, of the visual presence of human beings. The same glass treatment could be used in aquariums where the marine life does not see the human observers, bunting blinds and other devices to restrict clear visibility of animals whilst permitting the visibility for the hunter. These, and similar uses, well known in the art, require durable long-life structures and coatings which are not readily available without the present invention. Numerous military observation applications apply on the same basis.

Other examples of observation would include: in jail where a degree of observation capability is desirable; retail stores where the replacement of the traditional strip mirror glass, which is a piece of glass with alternating stripes of reflective mirror interspersed with stripes of transparent glass, is now possible by providing a decorative image from the shopping or consumer side or a coating which looks similar to the surrounding walls, or an advertisement for a product sold in the store. The consumer would see this section as an advertising display, not a surveillance or observation situation.

Surveillance is one use of these teachings, to provide an ability for viewing from one side of the material whilst not be seen from the other side of the material. The viewer may be either a person, or, alternatively, a surveillance system such as a video or other camera, light intensifying means or infra red sensing, or heat sensing device, motion sensing device or any other person, animal or apparatus, or other types of physical presence or variation sensing not yet invented, capable of detecting something on the other side of the surface. Examples include visual surveillance of visitors to a building, surveillance in the well known police line up, which currently uses a one way mirror, for security purposes at airports, public buildings, government buildings, factories, vehicles used by law enforcement, military installations and the like; surveillance by cameras could include all of the above and other particular uses such as casinos, financial institutions and other places or public gathering where it is desirable to have visual or recorded information of activities on one side of a material without the subject party being aware of the surveillance.

Freezer and refrigerator doors in food stores such as supermarkets and convenience stores often have opaque, or one way vision, signs or posters, typically paper or plastics, but the problem can be the reduced visibility and the possibility to have the poster stolen or otherwise removed. Also, condensation can occur between the plastic poster and the glass, particularly on the inside of the freezer where condensation will become opaque crystalline ice. The present invention allows for printing on any of the surface or surfaces of freezer or refrigerator doors, typically two panes of glass, and this means that the message is visible when the door is opened, and yet the consumer can see through the message to look inside the freezer or refrigerator display. It may include a heat conductive or heat generating coating, powered by electrical current, like a defroster, to keep the glass clear of condensation. A heat producing coating may be added to plastic films for the same purpose or as part of the perimeter coating aligned coatings directly on the glass or film.

Where condensation is a problem, such as vehicles and buildings in cold climates, humid areas and the like, the coatings can incorporate either opaque or partially transparent or see through effects with or without decorative patterns on one or both sides, such that the material can either be heat absorbing, as in a dark coating, or can have other means of external heat generation, such as electrical current, through a metallic coating on the surface of or embedded in the coatings, applied to or in close proximity to the see through building or vehicle. This means that heat is generated from an artificial source, such as an electrical current or from natural sources, such as absorption of the energy of the sun, to provide a heating effect to the see through surface which evaporates condensation, or in very cold climates, would melt snow and ice, and keep the window visually clear as long as adequate heat sources were available.

For vehicle windows, it would act as a removal device for ice, snow, condensation and the like and yet still retain visibility from one side of the see through surface to the other, typically from the inside to the outside, and the outside visual appearance could be a mono color to match the vehicle color or a multi-color decorative pattern, such as vehicle logos, pattern stripes, advertising message, personal communication messages, company logos or any other decorative pattern desired.

Inks which respond to heat could also be incorporated in a coating structure, so that it would become visually apparent that the coatings were having heat applied, because a portion or all of the coatings could be heat responsive, such as thermochromic ink and provide either transparency or a degree of color change at certain temperatures.

Sports applications, such as squash courts with see through surfaces have used a discrete white and black dot printing, or, using small decals, a black and white dot partially overlaid one on top of the other. Colors have also been used to delineate the lines of the "ball in play" line. Because of the technical limits for printing in register, larger areas of glass have necessitated making individually small decals up to 60 cm to 80 cm and then going through the laborious and often problematic task of aligning each of the decals to achieve full glass coverage. Slight misalignment in the decals causes obvious lines to appear at the joining point of the decals, which does not look attractive. Even within this small decal size, it has not been possible to provide exact registration of the dots, which have typically been ceramic ink and transferred onto the glass or plastic. Additionally, the decals have been solid in construction and this has caused production difficulties in removing the water from under the transfer paper or decal at the transfer step prior to tempering or toughening the glass. The present invention provides for holes in the base which allows for efficient and effective removal of the water from under the surface area of the decal and the water forms in the holes in the ceramic ink transposed on the base. The term "transpose", "transposing", "transposition", or similar, as used herein, includes, but is not limited to, the action or result of moving one or more coatings from one or more layer or layers of one or more bases such as to reposition the coating or coatings on one or more alternative materials. There are numerous methods of transposition including transposition via, for example, heat, pressure, direct contact, adhesive, water slide, electrostatic transfer, magnetic attraction or rejection, gravity, the flow of electricity, fusion, radiated energy such as microwave, radiation, any one or more combinations of the above methods or techniques, other means which effect the movement of one or more coatings from a base to a secondary material or which cause movement of the coatings from one portion to another of a particular material, base, or materials whether in partial areas of coatings or in full areas of coatings or whether in partial transposition of coating or full transposition of coating or any combination of these. Also, coatings may be transposed or transferred from one section to another of a base or final surface using any of the disclosed means or other methods of causing movement from one portion of the base or bases to another. The term "surface", or similar, as used herein, includes, but is not limited to, one or more parts of a intermediate or final use material such that a surface may be flat, formed, curved or combinations thereof and may be partially covered with coatings or completely covered and may have coatings placed on top of existing coatings previously applied to the surface. Therefore, a second or third surface is made after applications of a first and second layer of coatings respectively. A surface may also be in the interior or exterior portion, or one side, or the other of any layer or layers. Surfaces may be treated, coated, imaged, or modified in many ways.

Other uses for the present invention in sports include the sight board in cricket whereby a white board is positioned to align to the path of the ball during bowling. The sight board is intended to provide a white background for the typically red ball. The sight board however, normally obstructs a portion of the seating area or grandstand. When the game is fully sold out this causes a loss of seating positions. The present invention can provide a while surface towards the players whilst the black, see through surface is facing the audience. Other examples include any game in which it is desired to have an audience on one side viewing players on the other, where the players are not generally aware of the presence of the audience and can concentrate on the game at hand.

The term "base", "bases", "base substrate", "base material", "base", or similar, as used herein includes, but is not limited to, a structure which comprises one or more edges or perimeters for the purposes of acting as a base of a coating or coatings. A base may be paper, plastic, glass, metal, carbon fibre, fiberglass or composites of any of the above or new materials not yet invented or multiple layered laminate constructions of any one or more of the above materials or any other material capable of temporarily, semi-permanently, or permanently, or partially, retaining a coating. The base can be reusable, or repeatable with a precise pattern, or partially modified for release, or destroyed to prohibit the repeat of a unique pattern, and to identify the source. The base can be one or more materials which may be used as temporary or permanent materials for the creation or modification or transposition of coatings. The base may be attached to the final surface or may act as a media for the transposition of one or more coatings to a permanent, or semi-permanent, or temporary installation. A base may also be the intermediate or final surface and may be transparent or opaque or partly transparent, according to the installation. The base may be prepared by many methods, including die cut, laser cut, embossing, etching, molding, forming, extrusion, abrasion, hand cutting, laser treating, and any other known or future means of creating certain shapes, patterns, angles, edges and perimeters on any material.

Separately, the present invention can provide for registered printing of large areas of plastic such as polycarbonate, acrylic and other rigid, semi rigid, flexible, stretchable, sheets of substantially see through plastics type material. It is now envisaged that squash, racquetball and other sports courts can have large expanses of see through surfaces providing improved visibility for spectators whilst providing a visible barrier for the players. Multi-colored sections of surfaces are now possible, where one wall, for example, may be one color while the side wall sections are a different color and the back wall section a fourth color. Advertising and sponsor messages are all now possible on the interior of the glass which is visible through the see through surface, from the opposite side, for the benefit of the audience and the sponsor or advertiser.

BRIEF DESCRIPTION OF THE FIGURES

FIG. 18 is a cross section of a base with a cavity together with coatings on either side of the cavity, a coating partially filling the cavity and also overlaying the existing coatings followed by an all over coating followed by a sectional coating in the recess thus formed, together with an overcoat laminate, transparent or opaque and the like.

FIG. 37A is a perspective view of a base comprising round holes placed on a solid liner.

FIG. 37B is a cross section through those holes showing five coatings with the hole cavity producing one or two way vision light passages.

FIG. 37C is wetting the transfer medium, prior to transfer.

FIG. 37D is a perspective view of the transfer decal waterslide application step showing water in the holes ready to evaporate off without causing bubbling of the coatings during firing.

FIG. 42C is a combined panel of a reflecterized perimeter light chamber together with a pattern which will become energized with light upon application of the light source to the light chamber. This construction may also be used to provide privacy at night for one way vision panels, such that people on the image side, typically the outside, cannot see through the see through surface into the home or business on the other side. This effect is created because the light reflecterizing coatings reflect the light from within the light chamber and the light comes out through the holes. The person on the inside still sees through the holes and the people on the outside have reflecterized light directed to their eyeball and are thus unable to see in.

FIG. 43B is a laser treatment of a multi-layered edge such as to cause changed characteristics of that edge.

FIG. 43C is the interreaction of two or more layers with each other such as to cause a changed effect at the joining point of the two respective layers.

FIG. 43D is the use of a chemical agent, such as acid, to cause changes to a previously aligned edge coating.

FIG. 43E is a expansion of one layer when exposed to an external, such as light to cause a unique pattern in the edging.

FIG. 44A is a portion of a structure with no visible indicia.

FIG. 44B is the same material after treatment with a radiation source such a scanning laser, to reveal a previously concealed indicia which was printed on a particular level within the structure.

FIG. 44C is a layer, in this example metal, being subjected to a scanning process to make the invisible layer readable to electronic means.

FIG. 45A is a perspective view of a multi-level assembly.

FIG. 45B is via cut-always several examples of hidden identification indicia including shapes, recesses, numbers, alpha letters, bar codes and the like.

FIGS. 46A and 46B illustrate cross sections of coated material with either a reflective surface applied to the back, such as vapor deposition of metals, silvering or other means, or, alternatively, the use of a mirror type film which may be partially light transmissive and mostly light reflective from one or both sides.

Figure 46A:
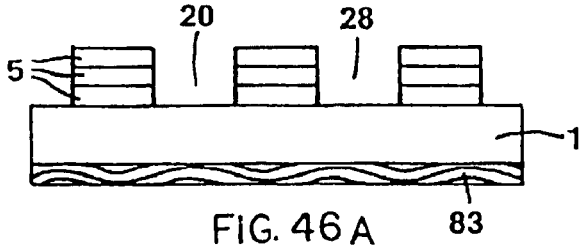
Figure 46B:
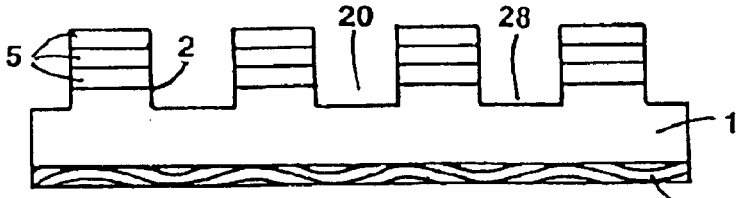
Figure 46C:
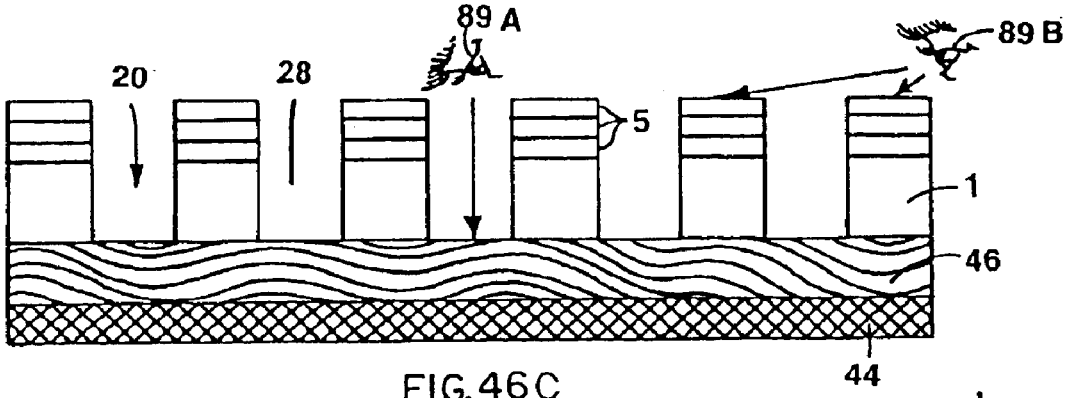

FIG. 46C is a mirror film or mirror treated film or glass, together with the base coated with multi-layers of indicia. When directly in front of the panel, a viewer sees between the coatings and has the light or other energy reflected. From the side angle view, the eye does not see the mirrored effect, but reads the indicia on the surface.

Figure 46D:
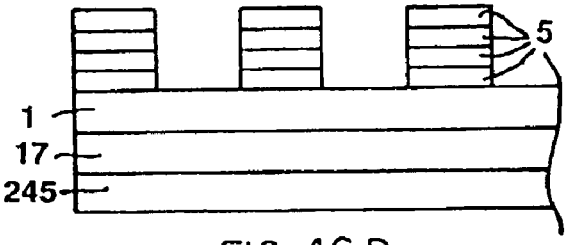

FIG. 46D is a cross section showing transposed coatings to a multi-layer panel.

Figure 46E:
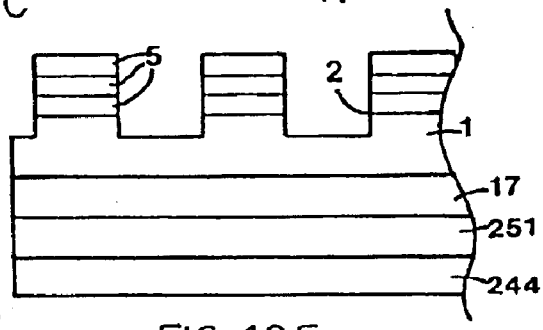

FIG. 46E shows a multi-layer panel construction with a modified base complete with coatings on the upper levels and other materials, all attached to glass.

FIG. 46E is a cross section of a perimeter edge which has become the final surface with the addition of some form of reflecting surface on the rear and multi-layer indicia on the other side.

Figure 47A:
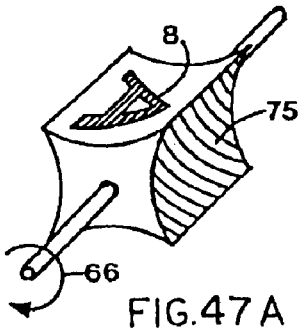

FIG. 47A is a cube such as might rotate on an axis and be used in conjunction with other cube type shapes to form a controllable panel. Such rotating cube concepts have been used in outside billboards and at sports stadiums. The purpose of this cube would be to provide a degree of light or heat control, or one way vision, such that different sides of the cube may provide different optical and/or energy treatments such as an energy reflective coat which is partially see through, or a one way vision coating treatment, or a totally opaque treatment and other possibilities on any one or more of the four sides. Three sided structures may be used in the same concept and a three sided image pattern, known as tri-vision, has been used on billboards. The purpose of this perimeter coating is to provide the control of energy, light, heat, indicia, one way vision and the like.

Figure 47B:
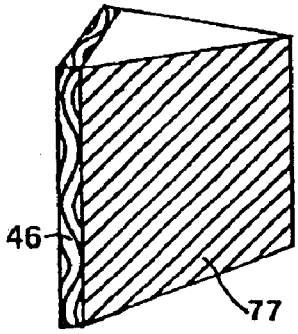

FIG. 47B is a prism or other multi-sided structure such that indicia on one side may not be visible from the other two sides and that control of light waves may be achieved in the normal way with such structures but that one or more of the sides may be coated for specific purposes, such as one way vision, heat control, flare control. ONE side of the prism may be mirrored such that it is possible for a viewer to see indicia on a second side of the prism whilst actually looking through the third side to the mirrored surface of the second side thereby reflecting the image from the first side, whilst a viewer on the first side may see through the one way vision and through the first side of the prism. Uses could include security applications, observation and the like.

Figure 47C:
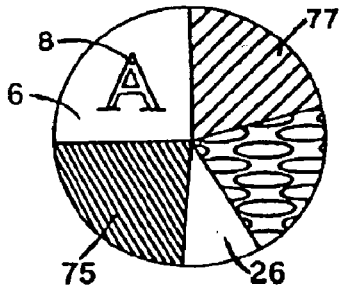

FIG. 47C is a circular surface which could be treated with numerous coatings on one or both sides of a flat circle or on segments of a ball type structure for various reasons including rotatable indicia, changeable messages, changeable panels for heat and light control and the like.

Figure 47D:
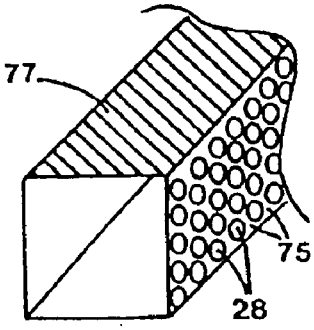

FIG. 47D is a perspective view of a parallelogram structure of any length showing examples of different sides of such a structure may be treated or coated in different ways, including, as an example, one side opaque, one side for one way vision, and two sides transparent. This means that when rotated in one direction it is impossible to see through the opaque, when rotated to the one way vision section in one direction it is possible to see, for example, through the material, when rotated to the opposite side the viewer would not easily see through the material but would see indicia printed thereon. Such transmission of these two side being possible by looking through the two transparent sides. Combinations are innumerable.

Figure 47E:
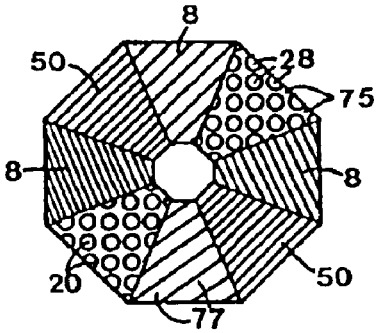

FIG. 47E is a multi-sided structure on which various coatings may be applied on any one or more of the surfaces for various effects of control of light, privacy, glare, heat and the like.

Figure 48A:
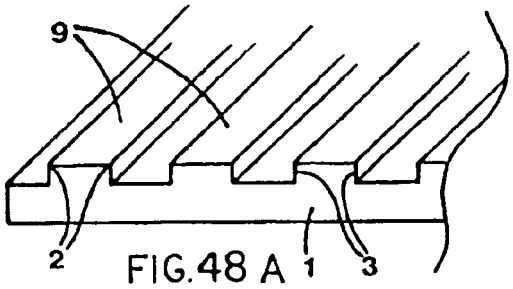

FIGS. 48A, B, C, D are various embodiments of multi level coating capability to produce two images from one base to provide transposition means, one way vision effects, differential optical angular viewing surfaces, and paired document constructions.

Figure 49A:
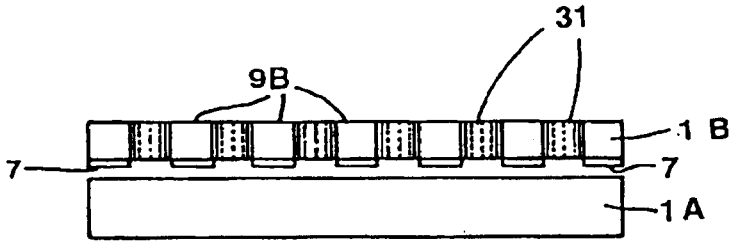

FIG. 49A is a material prepared with light passages being attached onto a solid base with a release coat.

Figure 49B:
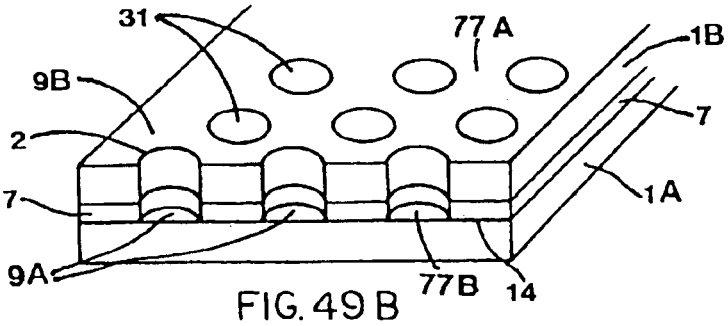

FIG. 49B is a perspective view of the overlaid one way vision material.

Figure 49C:
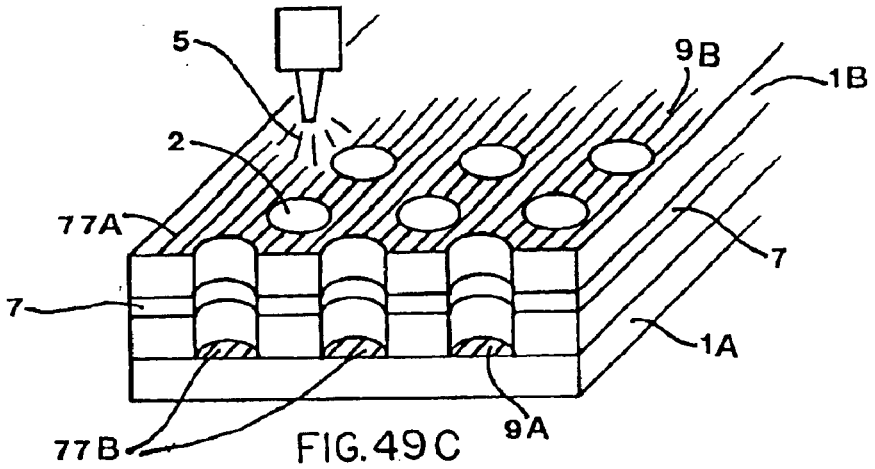

FIG. 49C is the application of one or more coatings using a spray technique, for example.

Figure 49D:
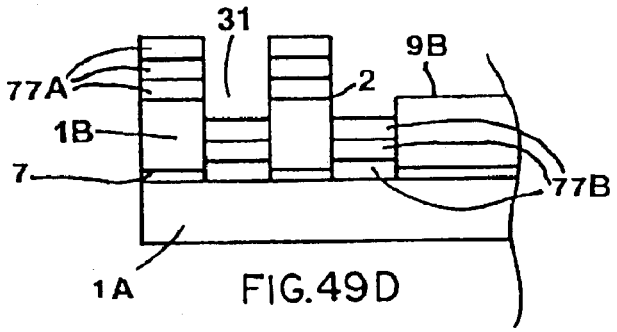

FIG. 49D is a side elevation showing identical coatings in the recesses and on top of the raised portions of the upper material.

Figure 49E:
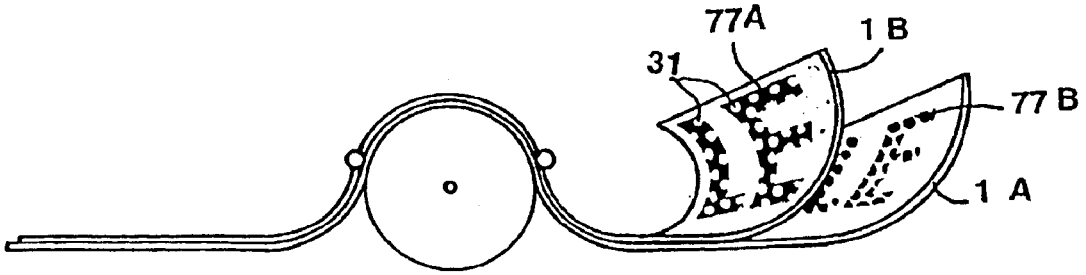

FIG. 49E is an alternative image application technique of ink jet equipment providing one or more color coatings applied at the same or on sequential passes of an image head, and separating the materials to produce two images.

Figure 50A:
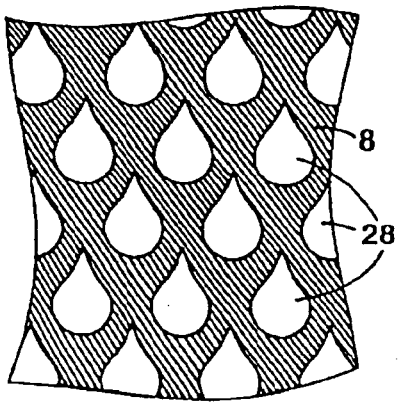

FIGS. 50A, B, C, D, E, F, G, H, I, J, K, L, M, N, O, P, Q, and R illustrate a series of examples of patterns for use as bases or as coatings for numerous uses including one way vision. These figures show paired examples of one pattern and a reverse of the same pattern, and are examples of patterns suitable for use on see through surfaces, inspection ports, one way vision and other structures, including plateaus, and other uses. For a fuller understanding of the nature and objects of the invention, reference should be had to the following embodiments and examples incorporated in the detailed description, taken in connection with the accompanying figures wherein:

The present invention can use any known coating process, printing techniques, transposition, or transfer of material techniques and there is numerous prior art on screen printing equipment and accessories, and many other types of machinery, processes, coatings, and the like. It is accepted that these apparatus, processes and methods are known in the art, but are used herein to produce new and unique improvements. It is now possible to provide accurate ink and/or coating restrictions on defined edges, and to incorporate partial coatings which may be manufactured under a process to produce alignment control using both internal and external perimeters and combinations thereof as taught herein. It is also possible to make identical reproductions of materials which have one or more unique features such as to provide clear identification.

An initial coating can be applied in the appropriate pattern and as long as the coating is thick enough or can be made thick enough it can form an elevated level or plateau, it can become either a base or the first coating layer of the final surface. If the coating is not thick enough then selection of a known coating which may expand under exposure to light, radiation, certain wave frequencies and the like can be used such as to elevate the top surface of the coatings far enough above the surface of the base surface so as to add other coatings without those coatings reaching the surface of the base. The term "final surface", or similar, as used herein, includes, but is not limited to, the surface to which the coatings are applied where it is intended that they remain in place some period of time. They may be removable from the final surface or may have other processes applied such as fusing of ceramic ink on glass, such that the coatings remain permanently part of the structure. It can also include intermediate surface or surfaces used as a media for subsequent transposition and where intermediate surface is used it may also be understood to mean final surface. The base may also be the intermediate surface or final surface.

Figure 1A:
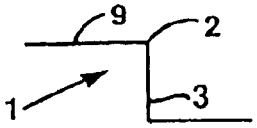
FIGS. 1A, B, C, D, and E illustrate a series of are cross sections of an edge followed by the steps of adding coatings, transposition to another surface, and removal of the base after transposition.

FIG. 1A shows a perimeter edge for use in applying coatings for alignment or registration purposes where the base 1 has a corner to form an edge 2. The coating surface 9 is at right angles to the face of the perimeter surface 3. The coating surface 9 and the perimeter surface 3 join at the edge 2.

Figure 1B:
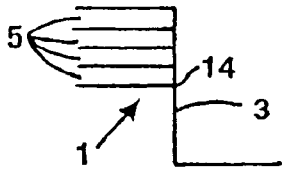

FIG. 1B has an additional, for example, four layers of coatings 5 applied on base 1 showing that the perimeter of the four coatings 5 are aligned above the perimeter 3, and in contact at a release point 14.

Figure 1C:
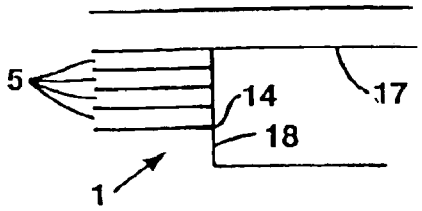

FIG. 1C shows the base 1 with coatings 5 transposed to an intermediate or final surface 17, where the vertical wall 18 has aligned the four layers of coatings 5 and has brought the top layer of the coatings 5 into contact with the surface 17, ready for separation at the release point 14.

Figure 1D:
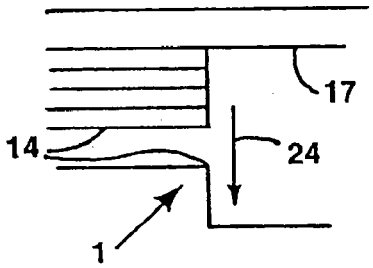

FIG. 1D shows the base 1 removed via the transposition removal step 24 such that the base 1 separated at a release point 14 on the base, and the coatings are positioned on the surface 17. The base is then removed or either disposed of, or reused.

Figure 1E:
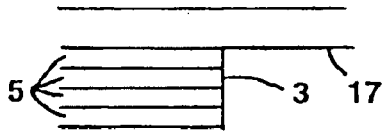

FIG. 1E shows the coatings 5 now attached to the surface 17 of a material such that the perimeters 3 of the coatings 5 are in alignment. The term "transpose", "transposing", "transposition", or similar, as used herein, includes, but is not limited to, the action or result of moving one or more coatings from one or more layer or layers of one or more bases such as to reposition the coating or coatings on one or more alternative materials. There are numerous methods of transposition including transposition via, for example, heat, pressure, direct contact, adhesive, water slide, electrostatic transfer, magnetic attraction or rejection, gravity, the flow of electricity, fusion, radiated energy such as microwave, radiation, any one or more combinations of the above methods or techniques, other means which effect the movement of one or more coatings from a base to a secondary material or which cause movement of the coatings from one portion to another of a particular material, base, or materials whether in partial areas of coatings or in full areas of coatings of whether in partial transposition of coating or full transposition of coating or any combination of these. Also, coatings may be transposed or transferred from one section to another of a base or final surface using any of the disclosed means or other methods of causing movement from one portion of the base or bases to another. The term "surface", or similar, as used herein, includes, but is not limited to, one or more parts of a intermediate or final use material such that a surface may be flat, formed, curved or combinations thereof and may be partially covered with coatings or completely covered and may have coatings placed on top of existing coatings previously applied to the surface. Therefore, a second or third surface is made after applications of a first and second layer of coatings respectively. A surface may also be in the interior or exterior portion, or one side, or the other of any layer or layers. Surfaces may be treated, coated, imaged, or modified in many ways.

The term "energy", or similar, as used herein, includes, but is not limited to, forces or radiation that are naturally created or man-made, such that energy is available in proximity to or in contact with or impinges on one or more coatings. By way of example, energy may be sunlight, electrical current energy, magnetic energy, radiation, sound waves, light waves, microwaves, electromagnetic, magnetic, electrical fields, forces of friction or reduction of forces of friction, light, heat, cold or any other form of energy or combinations of forms of energy.

Figure 2A:
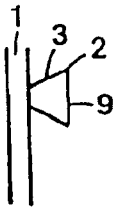
FIG. 2A, B, C, D, E, F, G, H, I, J, K, L, M, N, O, P, and Q are cross sections of various shapes as examples of edge construction.
Figure 2B:
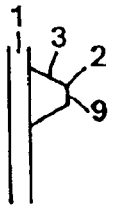
Figure 2C:
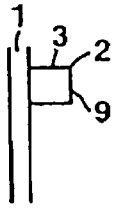
Figure 2D:
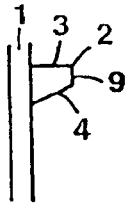
Figure 2E:
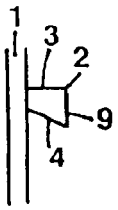
Figure 2F:
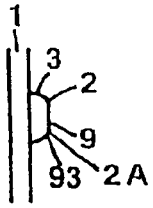
Figure 2G:
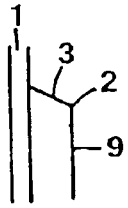
Figure 2H:
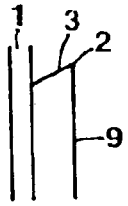
Figure 2I:
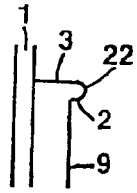
Figure 2J:
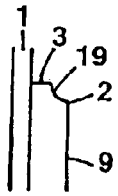
Figure 2K:
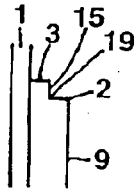
Figure 2L:
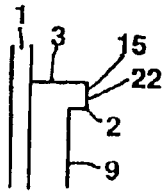
Figure 2M:
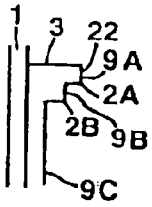
Figure 2N:
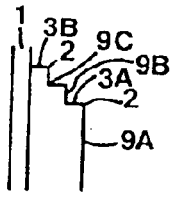
Figure 2O:
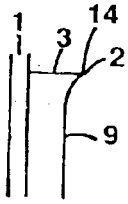
Figure 2P:
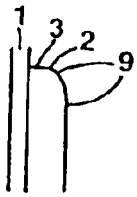
Figure 2Q:
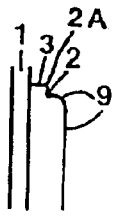

FIG. 2A–2Q shows a limited number of examples where a base 1 has one or more structures as part of, or attached to, its surface so as to be ready to receive coatings.

FIGS. 2A–Q could also represent cross sectional views of mono or multi layer coatings with appropriately modified edges, transposed to intermediate or final surfaces.

FIG. 2A has perimeter 3 which is not at a right angle to the coating surface 9. The angle of edge 2 is greater than 270 degrees and is intended to provide a resistance for coatings to move around the corner of the edge 2.

FIG. 2B shows an alternative to FIG. 2A whereby the perimeter wall 3 has an angle less than 270 degrees to the surface of the coating area 9 as measured at the edge 2.

FIG. 2C shows at least one right angle between the planes of the printing surface 9 and the perimeter face 3.

FIG. 2D shows a structure with a right angle between the print surface 9 and perimeter surfaces 3 and an alternative angle of surface 4 on the other side. This angled surface 4 may have specific uses such as control of visibility from one side to the other and, alternatively may present a broader coating area 9 if an additional coating is separately applied to that surface 9 for some uses.

FIG. 2E shows one of the perimeter sidewalls 4 is reversed and the other sidewall is at right angles. The coating surface or surfaces 9 in all of these figures may of course be of any length or shape.

FIG. 2F shows a rounded edge 2 between the perimeter 3 and the coating surface 9. This may be used to deliberately extend the coating over a portion of that surface, or to make the coating visible at wider angles. Alternatively, the perimeter 3 may be precoated with a removable substance 93, such that any coatings which inadvertently reach it because of the curvature of the transitional angle 2A, can be subsequently removed, for any reason.

FIG. 2G and FIG. 2H both show alternative edge 2 angles between the perimeter 3 and coating surfaces 9.

FIG. 21 shows a raised edge 2 to the perimeter 3 and can be used for containment of coatings up to the depth of the high point 22 of the edge 2. Increasing or reducing the height differential between the highpoint 22 and the coating surface 9 will permit different thicknesses of coatings to be placed in the space between the two height levels. Alternatively, several coatings or any type or combination may be applied one on top of the other on the coating surface 9 until the edge 2 high point 22 has been reached. It is also possible to exceed that height limit by contact printing on the then highest available coatings already applied or, to apply a different coating to the high point 22 only.

FIGS. 2J and 2K show edge 2 points with recess 19, with FIG. 2J showing a curved recess 19 and FIG. 2K showing an angular recess 19. FIG. 2K has a second level 15 on the lower surface of the recessed edge 19.

FIG. 2L shows a squared edge 2 parallel to the coating surface 9, with high point 22. The high surface 22 may be of any width on the structure such that the perimeter limiting edge 2 and the edge high point 22 may also act as a second level 15 for other uses or coatings.

FIG. 2M shows a two level edges 2A & 2B such that there are three print surfaces 9A, 9B, 9C or alternatively there may be two print surfaces 9B, 9C and the edge high point 22 is used to limit the positioning of the coatings. Coating which are placed against the lower coating surface 9C may have additional coatings applied which extend above the second highest level 9B to produce a wider perimeter of the coatings in that area.

FIG. 2N shows the reverse of FIG. 2M whereby there is a primary coating surface 9A together with an edge 2 into perimeter 3A which can also produce, if needed, two other coating surfaces 9B & 9C on the lower levels, where perimeter 3B forms a third perimeter. Alternatively one or either of these surfaces 9B or 9C may be coated or not as the case may be, or used to provide interlock junctions when another base is joined to this base.

FIG. 2O shows constructed edge 2 such that the material has been modified to provide a clear separation point 14 at the edge 2 between the coating surface 9 and the perimeter 3.

FIG. 2P shows an enlarged curved edge 2. This may be used to provide wider angles of views of the coatings 9 as the coatings 9 could be deliberately extended around the curve of the edge 2 onto the perimeter surface 3, such as shown in FIG. 2F, but used in conjunction with other constructions.

FIG. 2Q teaches a combination of a curved edge 2 and a squared edge 2A in close proximity where the limit to the edge 2 may be at the corner point of the top curved edge in the lower level. When these constructions are combined in any manner, it is possible to create precisely aligned coatings 9 on multiple levels of structures for particular purposes. Combinations of features of any part of these examples may be accomplished for any use.

Figure 3A:
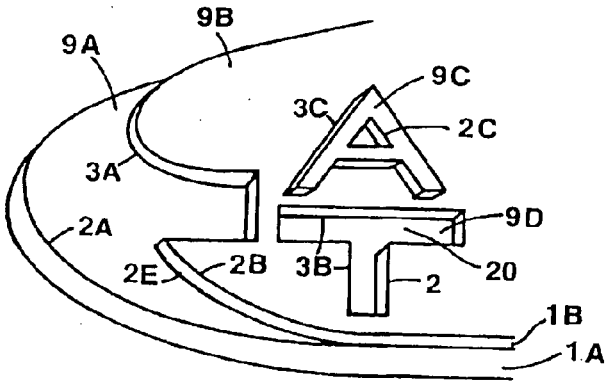
FIG. 3A is a perspective view of multiple edge layers.

FIG. 3A shows four levels demonstrated as an example. There are two base bases 1A and 1B such that the lower structure 1A provides a coating surface 9A and has an external perimeter edge 2A. Within the confines of the lower base 2A, a second base 1B has been added to provide its own edge 2B such that the portion of that edge 2B also forms an edge 2E on the lower base 1A as well as its own base 1B, to provide a secondary coating surface 9B. Above the plane of the second base 1B the letter "A" has been added in one or more layers of coatings such as to provide a further and, in this example, highest edge 2C on the top of the coating surface 9C of the letter "A". Additionally, a recess in the higher base 1B provides for the letter "T" such that the letter "T" may be filled as a recessed coating 9D in the cavity 20, defined by the edge 2. Using perimeter coating alignment, it is possible to have numerous indicia and other structures at different levels where one layer provides perimeters 3A to another 3B and the addition of other layers provides subsequent perimeters 3B and 3C to control coating positions and the end result. The term "perimeter coating", or similar, as used herein, includes, but is not limited to, the subject matter of the present invention and includes the use of the phrase "perimeter coating alignment" and incorporates by reference the definitions of perimeter and coating and the entire subject matter of this patent application. FIG. 3A may also be the representation of the coatings applied to a final surface, not shown, which were made from multiple bases and transposed one on top of the other in certain positions. For example, if the teachings of FIG. 3A were to be over sprayed by some continuous spraying of one or more coatings, and subsequently separated, it would be possible to have an unusual pattern on the left hand side on the lower level, and after separating the area under the right hand side of FIG. 3A which did not get coated would be in its original condition. The same possibility exists with the example shape "A", and also with the recessed pattern of the "T".

The term "indicia", or similar, as used herein, includes, but is not limited to, any visible substance, including coatings which has defined shape and one or more colors or tones of colors or combinations of material. Examples include such as one color with one metalized coating; any combinations that are possible within the teachings of the present invention such as to at least partially reflect or transmit light from the surface or to reflect other recognizable signals such as radiated energy and other means as defined by the word "invisible" herein. An indicia may be three dimensional, having different thickness over its surface, may be two or more sided where an indicia occurs in at least a part of the area of one or more sides or surfaces of the structure. It may be formable, expandable, compressible, or changeable such as by differential of heat, radiated energy, addition of other components, such as when wet and when dry, or under different light conditions or any other source or cause which could cause a change to the appearance of the visible surface, or subsurface.

It is possible to create an edge by die cutting or other cutting means. The problem with this is that it does not permit a unique edge to be repeated in an identically position on all materials as the die cutting tool will cut the same pattern but may be slightly out of registration with the material it is cutting and therefore the perimeter of the material may not always be in the same position. Therefore, there is no benefit for accurate identification or accurate repeatability.

Uses include security printing on any material, including papers or plastics, the creation of sequential and recordable document identification, print certification such as limited edition prints, paintings, or other valuable art, documents, objects, or any other use where a recording of a tamper evident, tamper proof, anti-counterfeit structure is useable. The term "paper", "card", "label", "decal", "document", "certificate", or similar, as used herein, includes, but is not limited to, cellulose and other wood based substances including cardboard, papers, paper coated plastics, plastic coated papers, light board, heavy board and other materials capable of retaining a visible or nonvisible image on the surface or under the surface thereof. The term "visible", or similar, as used herein, includes, but is not limited to, any coating which is able to reflect light within the visible or invisible spectrums or alternatively to reflect beams or waves of any type from a source such as artificial light, electrons, X-rays, microwaves, laser beams, sound waves, and others, ans sensory methods of discerning the existence of indicia, images, colors, or a pattern either on the surface or within the coating layers. Visible may also mean a combination of optically visible and electronically or artificially visible coatings within one or more layers within one or more materials or coatings, or finished product created after transposition of one or more coats or substances.

Examples would include security documents, bank notes, legal documents, contracts, composites incorporating paper type materials, plastics coated with substances to retain inks, or other coatings and future materials which would substitute for similar use to that for which paper could be used today.

Teachings of the present invention can also provide for access control functions, and can be used to create encoded identification passes, passes which may be used by employees entering or leaving buildings. The term "building", "buildings", or similar, as used herein, includes, but is not limited to, fixed, mobile and transportable structures for any use including residences, places of business, manufacture, provision of services, for temporary use and include buildings for government, emergency services, military, medical, public use such as theme parks, libraries, zoos, and also incorporate the infrastructure such as entrances.

Passes which may be called "one time passes" where that pass may have an internal, non apparent indicia or coating which is dissipated or changed whilst being scanned or "read" during the access or exit procedure such as security scanning, or any combinations of these techniques or uses are now possible. This can be used for security admission to buildings for providing a security pass to a person on the job site on a daily basis; for prison access and many other uses, where it is desirable to have access control on a one time basis. To achieve several entries, one or more passes can be issued, each one being destroyed upon usage. The pass could combine precise coating alignment and also have one or more coatings which are destroyed or modified by the equipment "reading" the pass.

It is also possible to create a control set of documents where a series of documents are manufactured from one master which has precise and uncommon irregularities in the edge of the perimeter such that it would be almost impossible to repeat and the master is then destroyed after printing that particular series, therefore making it difficult, if not impossible, to replicate.

An edge registered coating process may be used for placement onto a variety of surfaces, including brass plaques, glass, brick or any other surface where the perimeter of the printing needs to not have any overlap, even if the printing inside the print area is misregistered in any way.

Document identification can be added to transparent materials and modified in the manufacturing process, and the base can then be disposed of whilst the master used to make the base can be reused to make new templates, or bases. The term "transparent", "translucent", or similar, as used herein, includes, but is not limited to, any material from which partial vision through all, part, or parts of the material is possible and include examples such as glass, windows, plastic, films, papers and the like. Transparent may also mean structures through which the subsurface or interior coating can be "seen" by artificial means such as X-ray, electronic, magnetic, ultrasonic, and similar means outside the visible spectrum. Transparent also includes air or gas spaces, or portions where no coatings exist, which permit at least partial passage of beams such as light. The term "opaque", or similar, as used herein, includes, but is not limited to, the visible spectrum wherein a portion or all of the material does not transmit visible spectrum light waves. It may also restrict invisible light waves such as ultraviolet, infrared and the like, and may also inhibit or shield nonvisible spectrum or frequencies of either light or radiation including magnetic, electromagnetic, ultrasonic, sound and radio waves or any combinations of the above or any new technologies developed in the nonvisible spectrum. Opaque substances may not transmit light, but may transmit one or more specific types of radiation.

The surface of a base material, such as plastic, can be treated by a variety of methods to produce the multiple level construction ready for printing. The upper level would normally be used for printing as it can be placed in close proximity to screenprint mesh, printing plates, litho blankets, and other print methods.

The problem with die cutting as an edge defining means, particularly with pressure sensitive adhesive backed materials is that mechanical difficulties exist for removal of small or discrete individual pieces in high volume production without having the adhesive clog of build up or otherwise on the machinery. To remove a small silhouette pattern after die cutting, it is necessary to have a vacuum or some other source to separate the material out of the tool or web or liner after cutting, or if the material stays on the backing liner, to remove it from the backing liner further along the production cycle.

In the label making industry, techniques are known where the material is die cut, and then the material that is not required, typically exterior of the label itself, is removed by weeding out and disposal, thereby leaving the required cut label on the backing liner ready for sale and use. However, such techniques are easy to copy, and further, are not suitable for intricate separate pieces, for separation. Also, misregistrations occur due to mechanical causes.

Bases can be a disposable material such as water or heat transfer type paper, or a durable base made from metals, plastics, or other materials or combinations of materials which can be disposable or reusable.

Photo 3D is a known photographic processes for producing printed or photographically reproduced images which have the appearance of depth. The term "3-D", "three dimensional", "two dimensional", "multi dimensional" or similar, as used herein, includes, but it not limited to, any structure of material which has one or more surfaces, single or compound, curved, flat, or multi sided, or combinations thereof or where the extremities of the material are parallel to each other, both curved, or where one or more sides is flat or planed and one or more sides of the material has one or more curves, or other shapes. 3-D may also mean photographic, holographic or print processes which produce illusions of depth on relatively thin substrates or materials. By reproducing these on a base, it is possible that they become one way vision or form part of another identification document with a determined perimeter, usually in conjunction with other coatings, 02. The term "one way vision", "two way vision", or similar, as used herein, includes, but is not limited to, means to see through a surface or material from at least than one side. Visibility may vary from one side to the other or in a multi-sided structure may vary from any one side more or less than any other one or more sides. It may also incorporate visible indicia on any or all sides or portion of any or all sides and may incorporate indicia all over one side and have a black coating on the other side or all other sides, usually with at least one light passage or pattern of light passages.

Unique base constructions, combinations of bases, and reusable bases, may also have reversible layers or may have certain portions of the base which do not permit release of the area of coating applied to that non-release area, such as the coatings will need to break to be transferred from one surface to the other, leaving behind coatings which will not release.

In certain situations, it may be necessary to take unique base constructions, particularly absorbent papers and to align one or more coatings to a position but then to allow separation of coatings. It is preferable to cut through the applied coatings and a previously applied release coating so as to shear the release coating and the coatings to define a new edge perimeter. This method then facilitates improved waterslide or water transfer techniques.

The term "patterns", "grid", or similar, as used herein, includes, but is not limited to, any one or more configurations of discrete elements, and/or discrete but interlinked elements, one large element or any combination of elements, coating, or pattern. Examples of patterns would be lines, holes or varying shapes, multi-sided shapes, for example squares, octagons and the like, random curved perimeter shapes, patterns combining straight and curved portions, 2 or 3 dimensional shapes, and could combine flat and shaped or formed portions. Patterns may be regular, repetitive, random, symmetrical, asymmetrical, gradiated, variable, and any other design or combination. A pattern may be a singular or a repeating duplicate pattern, or a random pattern or a combination of standard repeating pattern and/or a random pattern when created initially on a base material or when transposed from one or more bases. The pattern would be defined as having one or more edges and combinations of edges and/or different materials which can produce a single or multi layered pattern comprising single or multiple, similar or dissimilar materials to produce a visible result or invisible result detectable by other means.

It is possible to produce patterns on the base with, for example, heat transfer techniques, whereby that part of the coating which is directly in contact with the base will not separate and the base may even be modified to ensure higher bonding strength between the base and the coating in that area, while the other portion of the pattern or portions of the pattern which are applied on top of a heat release coat will transfer under heat and/or pressure to an intermediate or final surface. This makes the production of small, intricate patterns, such a would be useful on see-through surfaces, and more particularly for one way vision applications, to be possible. Such a base could have the release coat applied using known printing, or coating, methods in the selected area or areas of the base surface.

Treatment of the surface with recesses or protrusions permits unique patterns. For example, a logo of the company or business printing a particular document or certificate or image can transpose that logo into every item printed or transposed from that master base. With recesses in the base, it is also possible to fill those recesses with a specific coating and then to apply a subsequent layer or layers of coating on top, such that after transposition from the base, that unique coating within the recess is now protruding from the surface of the transposed coating. Examples could be a precious metal, a reflective substance, a different color, light absorbent inks, reflectivies, and the like to differential and make the resulting protruding coating attractive or obvious to sight or touch or both.

Alternatively, where there are raised protrusions on the base, it is possible to selectively print the peaks of these protrusion without printing the lower area around them and thus create a perimeter effect. Also, it is possible to print around the perimeter of the raised section and then remove any excess print from the plateau of the raised section. The raised sections can be of any shape and conformity including cylinders, pointed structures, such as cones, or multi-faceted pointed structures such as a pyramid and also to have multiple layers on the top of the protrudence such that there are numerous recesses and protrudences on the top layers of one protrudence. By printing to an edge of the available surface, a uniquely identifiable pattern is created.

Figure 12A:
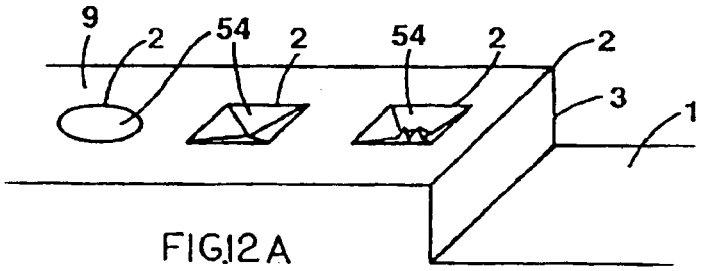
FIG. 12A is a base with examples of shapes of recesses formed in the base.

FIG. 12A shows a base 1 with a perimeter 3 and an edge 2 together with examples of recesses in the coating surface such that each recess 54 has its own perimeter edges 2 to provide limits or perimeters on either side of the coating edge 2. For example, the coating edge 2 of the recesses 54 may be a limiter for coatings placed within the recesses or alternatively may be a limiter for coatings placed on the coating surface 9 such as to not have the coatings enter the recesses 54.

The ability to print onto protruding surfaces is known in the art, but the ability to precisely align or position coatings on protruding or recessed surfaces in conjunction with a perimeter edge in a second or other defined position makes this unique construction repeatable for identification and many other purposes.

Figure 12B:
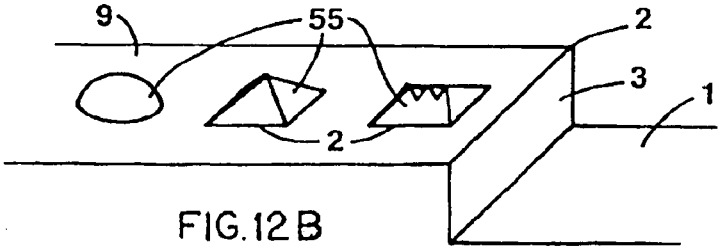
FIG. 12B is a bas with examples of raised shapes of protrusions formed on the base.

FIG. 12B shows the reverse of FIG. 12A whereby the coating surface 9 has protrusions 55 of any shape, of which several examples are shown to provide for coatings applied only to the protrusions 55 or alternatively to the coating surface 9 where edge 2 defines the protrusion area or another edge on the base 1.

Figure 12C:
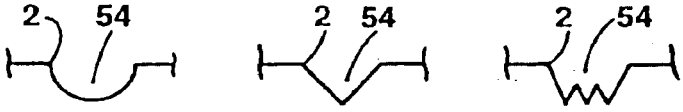
FIG. 12C is a cross section through the recesses of either the base shown in FIG. 12A or a cross section of the coatings produced from the base of FIG. 12A, or of the coatings transposed from FIG. 12B.
Figure 12D:
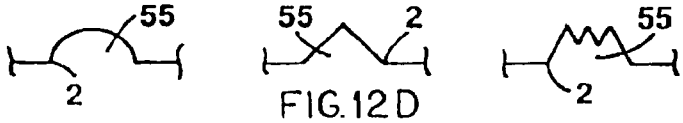
FIG. 12D is a cross section through the protrusions of the base shown in FIG. 12B or a cross section of the coatings produced from the base of FIG. 12B or of the coatings transposed from FIG. 12A.

FIG. 12C shows a cross section of the recesses 54 of FIG. 12A or if base 1 of FIG. 12A was subsequently coated then the coatings after transposition would have a protruding surface 55, as shown in FIG. 12D, which was in fact formed in the recesses 54 of FIG. 12A.

FIG. 12D, shows the reverse of FIG. 12C whereby a cross section through the protrudences 55 on base 1 of FIG. 12B could also be a cross section of the coatings produced from FIG. 12A after transposition from the base of FIG. 12A to an intermediate or final surface. Naturally it is possible to have protrusions, planar surfaces and recesses on any one or more bases, or any one or more portions of any base or surface.

It is possible to make bases with a variety of surface treatments on the base, such that a portion of the base may have a release coating for a transportation step, a portion of the base may have a surface treatment allowing subsequent mechanical or other means of removal of the coating, so that the base may be reused. Another section of the base can be made to ensure permanent bonding of the coating to make it virtually unremovable, while using the steps to remove the previously mentioned coating. The term "permanent", "fixed", "non removable", or similar, as used herein, includes, but is not limit to, a coating which is fixed to a material, or which, after transposition or final location would not be readily removable using normal means. For example, ceramic ink when fused into glass become part of the glass and is not removable by scraping, chemical processing or other traditional means of removing a visible image from the surface of glass. Permanent may also means an image which is encapsulated within a substance such as glass or plastic, or the like, where the substance is durable and would protect the coating contained therein. Such construction could include laminates of glass, plastics and other materials such that the coating is protected by outer layers or where the coating is protected by some other form of coverings such as a clear coat or a protective laminate such that the coating is not accessible to external action and may be fused, etched, internal, sealed, subsurface, partially subsurface, or on surface. Permanent may also mean non-erasable, or non-removable, and include the attachment means of one or more coatings to a base or other surface, and includes adhesives so described. This means that a base may have a portion transposed, a portion removed and a portion that is unremovable. Subsequent use of that base means it can be matched to documents produced from the base with an extact perimeter alignment between the two, and the unremovable portion is constant to all.

A base or portion of a base may also be self-destructive after or during the transposition steps, for example. When a base is manufactured of one or more certain substances and is exposed to one or more treatments, such as radiation, it is possible that the base can become self-destructing or sufficiently reactive to make it unusable for repetitive purposes. The term "radiation", "radiated", "beams", "waves" or similar, as used herein, includes, but is not limited to, a source or transmission of any force whether visible or invisible and includes light, sunlight, actinic radiation, energy such as microwave, radio waves, light waves, conductive heat, or cold, electrical fields, magnetic fields, electrostatic forces, concentration of light beams, sunlight, reflection or refraction of energy sources in wave form and the like.

This means that the base may be modified by radiation of some form or other forces to become unusable or to identify that the base has been used at least once. The term "identify", "identification", or similar, as used herein, includes, but is not limited to, any means which provides a clear match between a readable coating or coatings when compared to a second document which may be the master for comparison purposes. Identify includes verification that the structure is part of a group of identical sturctures that is proprietary to the creator of the structures, such as the printing of a single or sequential series of documents or a like series of documents, or that the structure so identified is the proprietary property of or copyright ownership of a certain organization, person, company, or other owner. Coatings and surfaces may also be self-destructive.

Figure 3B:
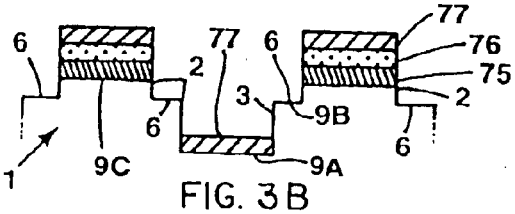
FIG. 3B and FIG. 3C are a three level structure where one level has coatings added in sequence.

FIG. 3B shows a cross sectional view of a typical construction shows three coating surfaces 9A, 9B, 9C, where the lower coating surface 9A has a indicia coating 77 contained within perimeter walls 3. The middle of the three coatings levels is a see through surface 6 such taht visibility or light or energy transmission would be possible through this section of the structure. On the higher of the three example levels, is a dark monochromic coating 75 together with a white coating 76 and an indicia coating 77 as an example of three coatings which were applied above the higher perimeter edge 2.

Figure 3C:
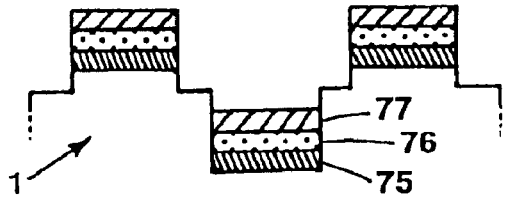

FIG. 3C shows three different coatings in the lower recess perimeter, namely the same coatingsm which could have been applied to the upper level black coating 75, a white coating 76 and an indicia coating 77.

In an example, th perimeter is defined by a captive base area, such as a cavity or cavities of some form and this means that coatings can be applied within the perimeter of the sidewalls and an area between the sidewalls may form a highe rlevel for edge printing. It is possible to have several layers as shown in the figures. The deepest recesses may be coated in a variety of ways, intermediate recesses may be coated by numerous methods and each edge, whether it be a sidewall of an edge as defined in this present invention, form a perimeter limit to the printing area. Numerous examples of combinations are possible and an example would be to have a coating in the cavity areas, which could be changeable, such as a coating which can be made opaque or transparent by the application of an outside force or energy source, an intermediate coating which can be permanent and opaque or alternatively, transparent and an upper layer using edge printing methods of the present invention where the coating may be fully colored indicia or other coating. In this example, it is possible to control light transmission through the coatings in the lower edge limits of the cavity while retaining a background color on an intermediate level and a colored image on the higher level. These combinations could be reversed or used in any other combination of coatings that is disclosed herein or which could be utilized by one normally versed in the art.

Figure 3D:
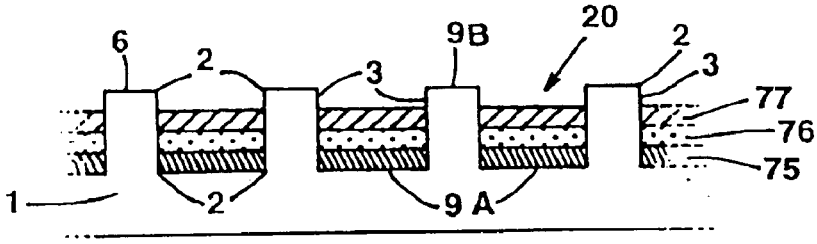
FIG. 3D is a cross section of a recessed base construction.

FIG. 3D shows a two level base 1 with three coatings 75, 76, 77 applied in the recess cavities 20 and the lower print surface 9A has been covered with these coatings. An upper coating surface 9B is either available for subsequent addition of the same or different coating or coatings which may be opaque or transparent, as required. Further, the coatings have not filled the recesses 20 and additional coatings of any type may be applied or alternatively another surface may be applied along the top to act as a second base for the coatings or alternatively, a second base made from the same master, meaning an identical base may be placed against this base 1 to provide the joining of two sets of coatings as will be shown in the present invention. The see through surface 6 may be used with a transparent base 1 for other uses as taught herein.

Figure 4A:
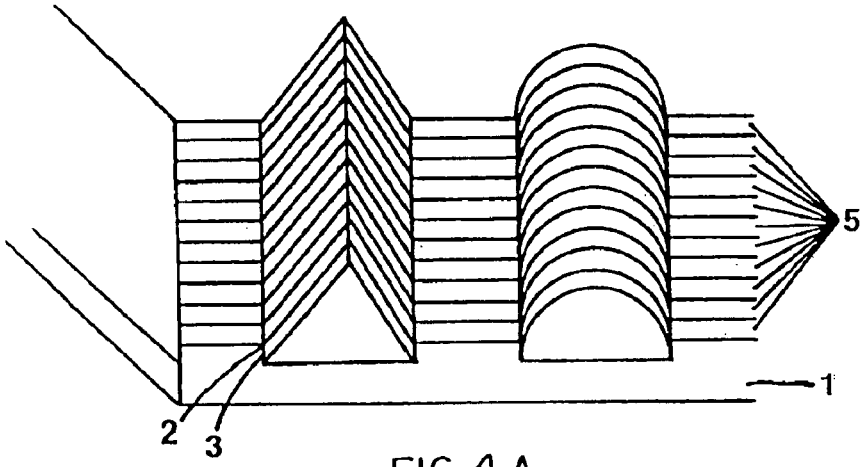
FIG. 4A is a perspective view of an edge containing multiple layers of any similar, the same or different materials and shows the alignment of the edge coatings.

FIG. 4A shows it is possible to create multi-layer structures, because the perimeter 3 is clearly defined and any one or more coatings 5 are provided on the base 1 using the edge 2 and perimeter 3 for the purposes of alignment. Numerous coatings 5 which may be of different thicknesses and types, chemical compositions and for a different purpose or purposes may be sequentially applied to a base 1. Alternatively, if there are several identical bases that have been created, it would be possible to build up a multi-level structure by having certain coatings 5 on one base 1, different coatings 5 on another base, for whatever reason and the multiple bases can be used to transpose their respective layers of coatings 5 either to a particular base 1 or to another surface such as to create substantially complex coatings with many layers in the final product.

Figure 4B:
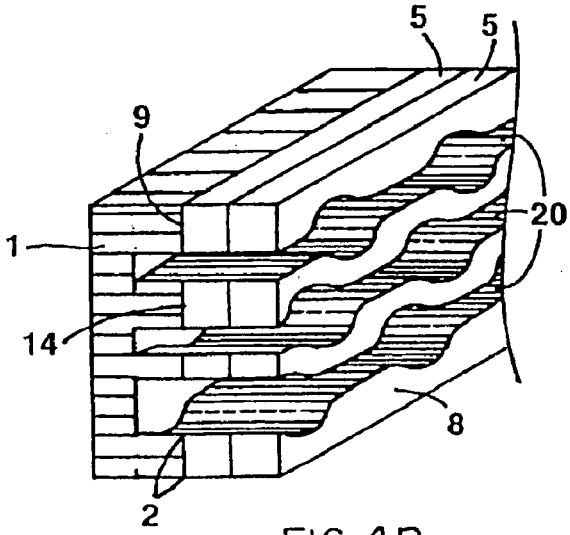
FIG. 4B is a base with more than one layer where the base edges were created by die cut, laser cut or other cutting means to produce repetitive patterns for subsequent coatings.

FIG. 4B shows that unique shapes are easily achieved once the base has been created. A base 1 has been prepared with a series of cavities 20 and has had two coatings 5 applied to the coating surface 9 of the base 1. The separation point 14 is shown between the first coating 5 and the base 1. Indicia 8 may be present on the upper surface of one of the coatings 5.

There are many ways of preparing bases 1 and coating surfaces 9 and for economy, methods such as embossing, die cutting, forming, extruding, and other methods well known in the art may be used, according to the type and material used for a base, and the desired shape and texture.

Figure 4C:
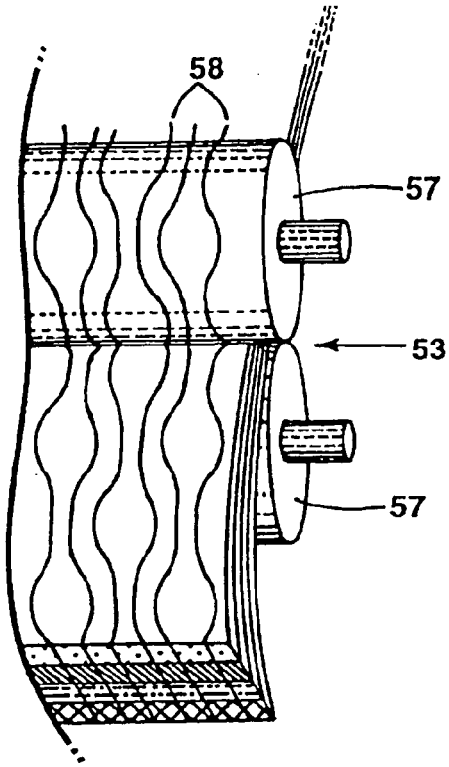
FIG. 4C is a typical rotary die cutting apparatus to produce a version of patterns to create bases or alternatively to cut multi-layered material for multiple identical bases or alternatively to cut combinations of bases and one or more coatings on one or more bases.
Figure 4D:
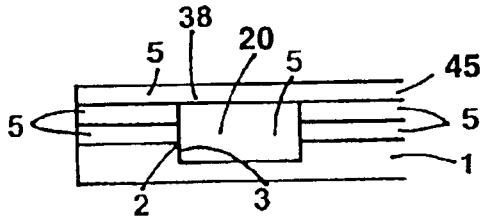
FIG. 4D is a cross sectional view where a coating has been installed in an enlarged recess made of two extra coatings on the base and over-covered with a scratch off or otherwise removable coating to subsequentially reveal the hidden coating.

FIG. 4D shows a base 1 has applied several coatings 5 of any type including, as an initial step, two coatings 5 to both the left and right of a cavity 20 defined by an edge 2 and a perimeter 3, and the cavity can contain a third coating 5 of any type. On the top of the structure, another substance, such as a laminate 45, may be added.

Figure 4E:
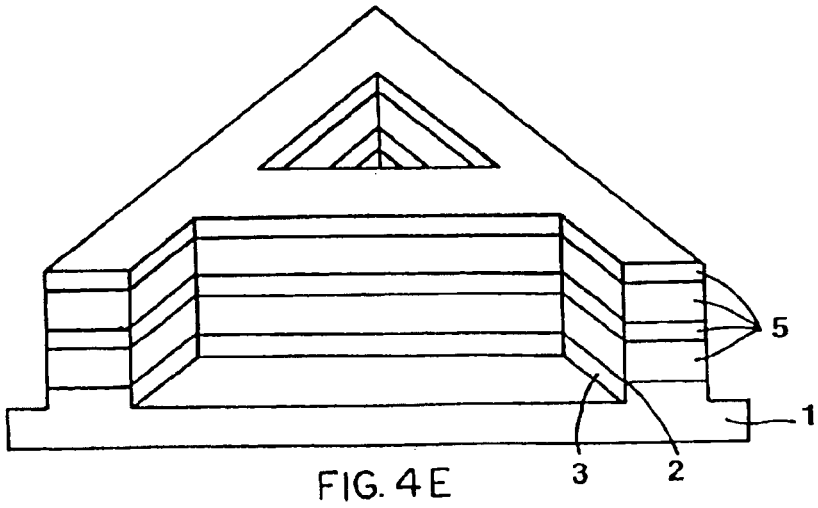
FIG. 4E is perimeter coating alignment of the letter "A" comprising four different layers in perfect alignment, two layers being thicker than the others.

FIG. 4E, shows a structure is shown whereby a base 1 comprises a multitude of premature edges 2 in the shape of an "A", with coatings 5 applied on the edge 2 to align with the perimeter 3.

A base can be constructed from a disposable material such as water transfer type paper, or a formed base made from metals, plastics, for other durable materials or combinations of materials which can be reused.

Repeatable bases which always remain the same produce print examples which can be used for manufacturing; for example, to check the tolerance of parts in a milling or other process. The same base can be used to generate a transparent material with marked lines on it which gets placed over the manufactured part milled down to the size of the markings on the transparent material and are damaged in the manufacturing process and are then disposed of while the master is reused to make new templates.

While it is possible to create multi-layered structures and then to cut and weed out certain segments to create vertical edge walls, this procedure does not offer the precision due to well known factors such as inconsistency of the material feed, mechanical variation such as tolerances in equipment worn bearings, and the like and therefore, while producing a result, cannot repeatably produce a result in registration and further, does not allow any control over precise edges to coatings. One of the reasons for this is that as the knife, laser or other cutting tool cuts the surface and the edges of the coatings, it can cause one coating to slightly overflow to the other or to, in the cutting action, be forced down as the knife or dye cuts through the material layers.

A variety of bases may also be used as the final surface. Examples include flexible plastic-films, papers, board, composites and the like where an image is applied directly to the surface of the material using painting, ink jets, electrostatic transfer, or any other equipment or method. The term "composite", or similar, as used herein, includes, but is not limited to, an arrangement of more than one material in either the base or in the final material or structure, or of more than one coating or layer, or more than one base with or without coatings, or bases or other surfaces attached together or in close proximity.

A product may be constructed by assembling printable material such as a plastic or paper base so that the material is cut and every alternate section is removed before or after printing. The cuts would be typically parallel and a preferred size for use with FIG. 50M–N would be about 1/37th of an inch separating each cut. If a version is made where it is desirable to not have any overflowed low viscosity ink visible in the sides of the remaining material, such that would cause a halo or ghost image, the material can be left cut but not separated until after printing so that no ink can overflow the side walls. Alternatively, the product can be cut and the alternating sections removed before printing for reasons of cost. Separation after printing provides two images for the price of one or two images which form a matched pair for other purposes. This removal can occur immediately after the slits are made or at a later time. It is also possible that the alternating sections of material removed after slitting, but before printing, could be repositioned onto a second release liner to provide a duplicate product. Instead of wasting the material this means that even numbered cuts would remain on the backing liner while odd numbered cuts would be transferred to a new backing liner. Any of these steps provide two sheets of base or final surface for slightly more cost than a single product.

The edge cuts or slits could be at right angles to the upper surface of the material or could be deliberately angled in a variety of combinations as follows:

a) with the cuts in parallel so that angle of the cuts would be downwards after placement on a see through surface, assuming the slits or stripes were placed horizontally on the surface.

b) the cuts were so constructed so that the remaining material had a beveled edge on either side of the gap, when the alternating stripe was removed.

c) the cuts may be constructed so that on one side of each remaining material is a cut at right angles to the material while on the other side the cut is at an angle either inwards or outwards from the upper surface so that a visual alignment could occur.

The cuts may be made before pitching, after printing, stamp cut, rough cut, and may vary the ratio of solid area to open area at the same time. At the same time, it is possible to produce an embossed or cut surface or combine with other materials such as one way mirror film and laminate for UV protection, waterproof sealing or other materials. It is possible to combine static cling and pressure sensitive adhesive film regions, and advantages include: high speed production, utilization of existing machinery, resaonsably economical tooling costs, known prior art of rotary, existing use of stamping machinery, and other combinations which provide different vision percentages at different portions across the surface. The use of multi layer laminates can include film, paper, metalizing, and combinations thereof. Other layers of material may be applied across the bus to provide a checkerboard appearance if the second web or base is at right angles to the first web or an illusion of diamond patterns is possible when the second material is placed at a suitable angle to the first material. Other combinations may be applied to other substrates including sandwiched between other adhesive backed films which are then subsequently attached to surfaces. It is useful to apply coated surfaces at various angles for reasons of air flow, drainage, fluid flow, cleaning of surfaces and the like. When using a pattern such as shown in FIG. 50M, one advantage is the deterrent to theft because it requires removal of hundreds of strips of coatings, compared to a one piece poster.

FIG. 4C shows a commonly used rotary die cutting machine 53, containing cylinders 57 which have been fitted with knives or other cutting methods 58 so as to cut through a material economically in unusual patterns. The design of the knife can produce any number of shapes in the base. It is also possible to cut different layers in a base such that you could make four identical bases with a certain shape at the same time for uses which will become apparent in the present invention.

For adhesive materials, the use of stronger adhesives can compensate for a reduced surface contact area. It is possible for the design of the rotary cutter or laser cutter to produce a pattern where a larger area of material with less open areas remains on the original backing liner while a smaller area with a correspondingly open area is transferred to a second backing liner or the reverse.

Figure 50B:
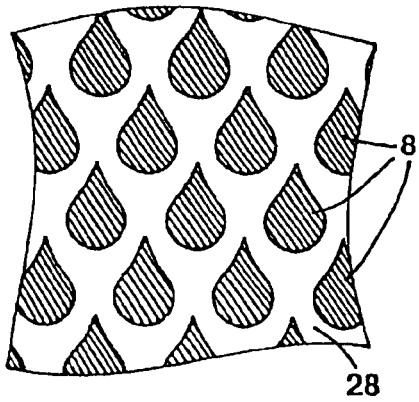
Figure 50C:
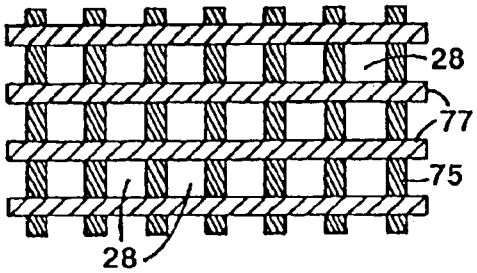
Figure 50D:
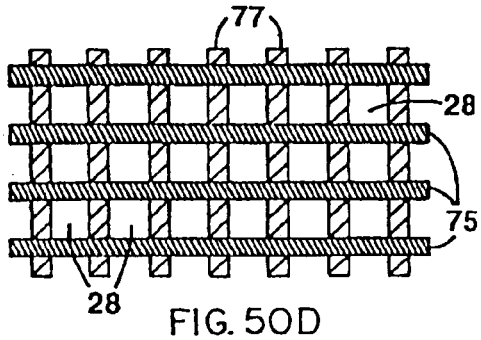
Figure 50E:
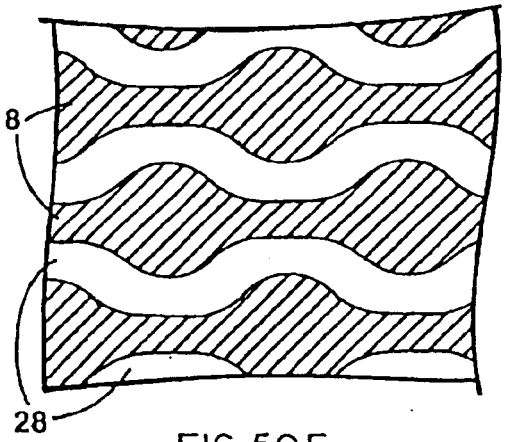
Figure 50F:
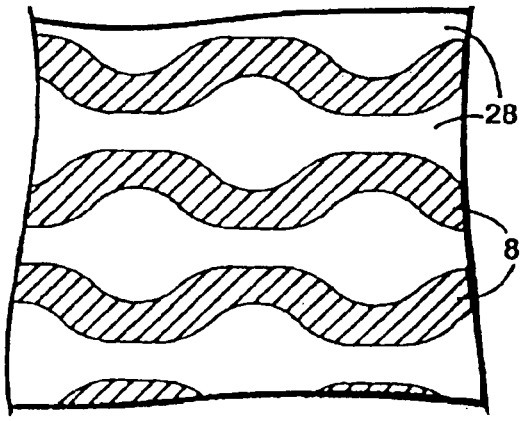
Figures 50G, 50H:
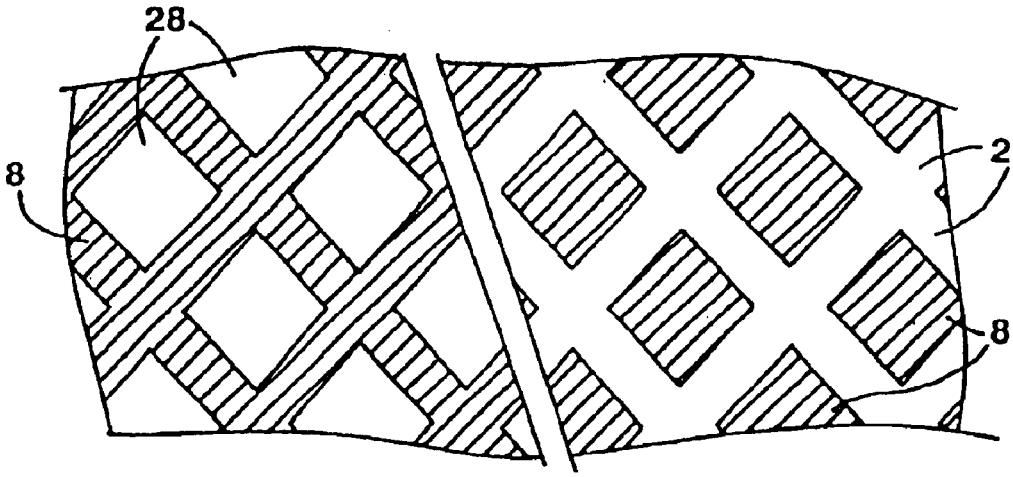
Figures 50I, 50J:
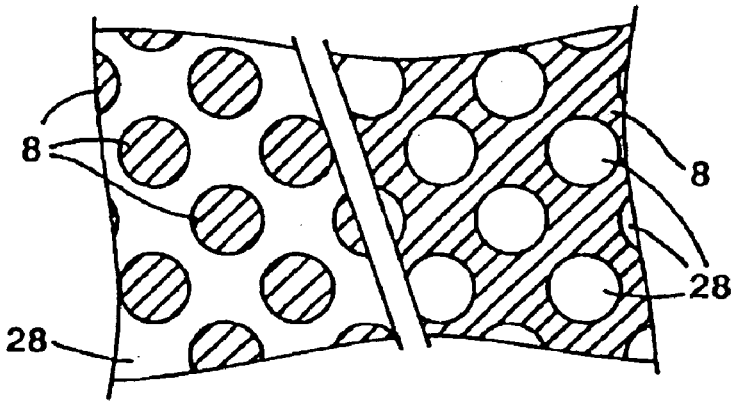
Figures 50K, 50L:
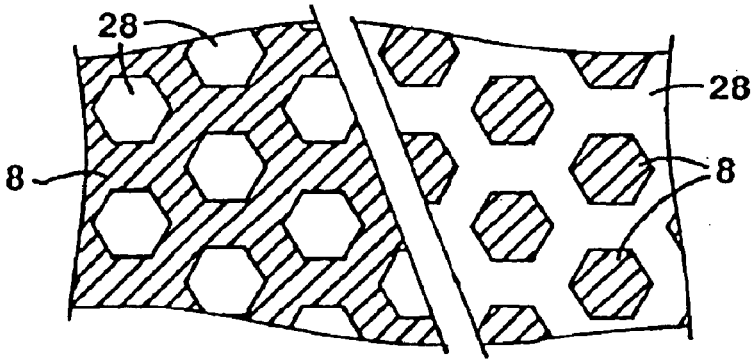
Figure 50M:
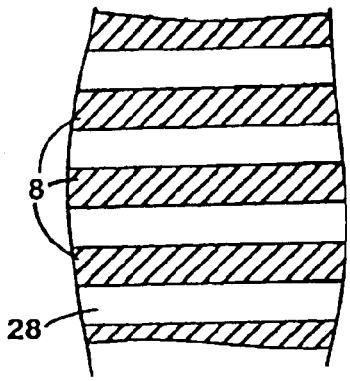
Figure 50N:
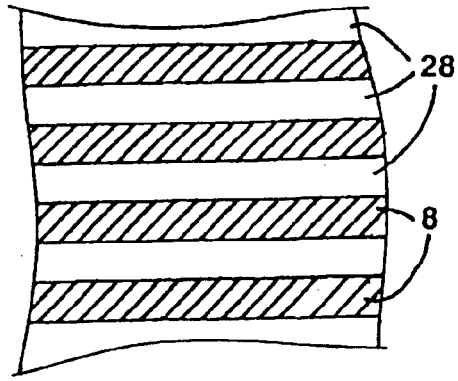

To maintain alignment when getting two materials, such as shown in FIG. 50M and 50N, from one structure, take the separated material and weed it out as close as possible to the weeding out roller so the original carrier web and the web to which the weeded out portions are being transferred, will keep the now separated material correctly positioned.

Alternatively it is possible to attach holograms which, by being cut, can product security images when matched to the piece that was subsequently removed. The printer prints normally over the entire area similar to the perforated product, but the image is unique.

Figure 5A:
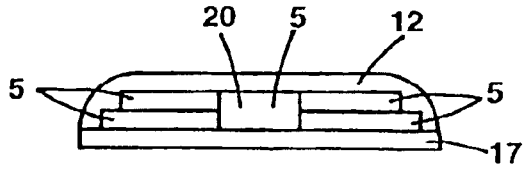
FIG. 5A is a cross section of the base with two coatings and a recess filled with another coating, covered with a complete over-sealing coat.

FIG. 5A shows a structure designed to conceal the presence of one or more coatings of one or more types, it is useful to apply an overcoating 12 as shown in FIG. 12, such as to conceal the coatings 5 contained therein including a possible substance or gas in the cavity 20 to the surface 17.

It is possible to have documents or coatings which make matched pairs or three or more, whereby some bases have a portion of the base removed and are overlaid on a different base or bases. For example, one base may be overcoated with one or more coatings over it's entire surface area. Then a second base with part of the base removed, such as to create a hole or partial area without coatings is then overlaid on top of the coatings of the first base. This coating procedure continues and the second base acts as a mask to stop coatings from getting applied to the coatings of the base beneath it. However, the coatings are applied over the available surface of the second base and are added to the coatings on the first base exposed through the gaps in the second base. This procedure can be continued with more than one base such that when the coatings are transposed from the two or more bases, a precise alignment is possible because the coatings applied were made at the exact same time on more than one base. Uses include application on one or both sides of see-through surfaces or for security purposes to make matching pairs of imaged material, such as documents, where those pairs can be brought back together and exactly matched as a set. Paired structures may be left on a surface or used for combining with a partially aligned surface overlaid with a transposed surface and/or an over-laminated protective surface.

It is also possible to align two or more bases in an unusual pattern in and abutting the joining or overlapping relationship such that when the coatings are applied and have dried, the bases can be separated from each other and each one makes a unique portion of the whole. If two or more bases were overlaid, and a unique cut was placed across their overlapping area, such as by a programmable laser, the bases could then join precisely on the cut line. This would produce a unique edging and two or more bases with a unique edge would provide identification and/or authentication on results reproduced from those now separated bases.

Variable edge positioning may be also accomplished by exposing a base to an energy source to cause expansion and contraction.

Multiple layers of documents may be created from multiple bases each made from the same master, or made by being placed on top of each other so that the perimeters of one are the same as the perimeters of all. Any deliberate variations, imperfections, or other minor differences in the master will carry through the reproduced masters and thus carried through the series to provide identification which is unique to one master. Imperfections may include: deliberate marks on the edge of the coating area in an unusual and not easily visible pattern.

Radio Frequency welding may be used to selectively weld some layers together in any pattern, or at a perimeter.

Figure 13A:
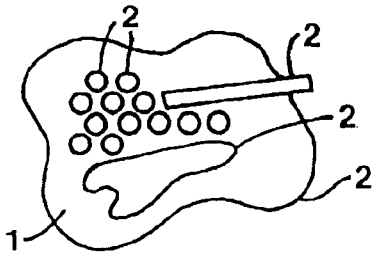
FIG. 13A is a plan view of a structure made of a combination of edge perimeter shapes including circles, parallelograms, continuous irregular shaped perimeter, all on an outer base perimeter with the parallelogram overlapping the main base perimeter.

FIG. 13A shows a plan view of a composite series of edges of various shapes whereby the base 1 has an external perimeter 2 and additional perimeters 2 have been prepared on the base 1. Examples of these include circular holes in a round staggered pattern, a parallelogram, and a randomly shaped structure. The design, choices of shapes, choices of one or more coatings and the like are all changeable such as to provide unique, yet repeatable patterns using any combination comprising one or more edge. Also, the examples may be at one or more levels of a base, and the same visual appearance as shown in FIG. 13A may be understood to be the appearance of coatings after transposition to another surface. It is possible that the coatings were made up on different base and transposed to the example base, or that the example base where the base 1 was the receiver of coatings prepared on other bases of appropriate shape and texture.

Figure 13B:
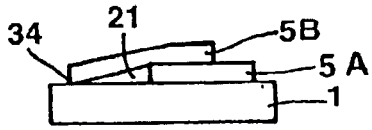
FIG. 13B is two coatings overlapping each other on a common base and encapsulating air, gas, or liquid in the cavity thus formed.

FIG. 13B shows a base 1 together with a previously applied or transpositioned coating 5A against the base 1 and a second upper coating 5B which was coated typically on a second base and transpositioned on top of the original coating and base combination so as to create an encapsulated area 21 which would typically be an air or gas chamber. By allowing adhesion at the contact point 34, the encapsulated air or gas chamber 21 becomes sealed and if the upper coating were transparent, it would be possible to see into, or through, that cavity.

Figure 13C:
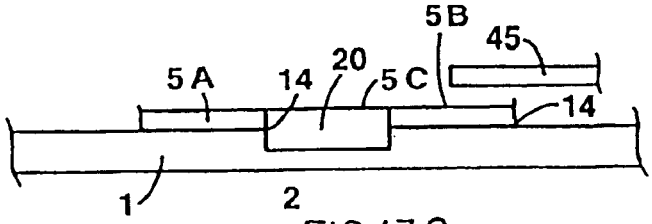
FIG. 13C is a side elevation of two coatings applied on the opposite edges of a cavity together with the addition of an overlaminate sheet over portions of the coatings.

FIG. 13C shows a combination structure where base 1 has three coatings applied in sequence as follows: the coatings 5A to the left and coating 5B to the right of the cavity 20 are initially applied on the edges 2 of the base 1. Subsequently the cavity 20 may be filled with a substance such as any coating 5C. As an additional step, a laminate or other cover material 45 may then be positioned to cover one or more of the coatings to provide a protective seal or for other uses. If the coatings are separated at the separation point 14 from the base 1 and transported after attachment to the over laminate 45 the cavity 20 will become a protrusion of the coating layers on the intermediate or final surface after transposition.

Coatings may be applied using any of the well known methods, such as lithography, offset printing, screen printing, inkjet printing, paint jet printing, hand applied with brush, roller or spray, vapor deposition, metalized surfaces, hot foil stamping, electrostatic transfer, digital printing, or transfer and any past or present technique which allows for the placement of visible and invisible coatings onto one or more surfaces, including onto or in proximity to other coatings. The term "invisible", "not visible", or similar, as used herein, includes, but is not limited to, substances not visible to the natural eye or which remain substantially transparent or clear where it is substantially invisible to the natural eye of people and animals and yet may be discernable by artificial or other sensory means such as ultrasonic or other devices which can measure the presence of a coating which is not readily visible in the spectrum of visible light. Invisible may also mean wherein the coating is hidden under at least one other surface and which, if on the surface of the material, would be visible. Examples include metalized coatings which are beneath non-metalized coatings such that the metalized coatings are invisible to the natural eye but are detected by means such as X-rays, magnetometers, metal detectors, and other electronic or artificial means of detection. Artificial means of detection can include any present or future measuring means or other means of detecting or reading nonvisible substances. Invisible may also mean indicia, which is visible when viewed from one position, but which is invisible when viewed from another such as lenticular lenses or prism type constructions, or multi-prism type constructions. There are also multi-faceted lenticular type lenses in use, such that an image visible from one direction and visible from the other can reverse where another image becomes visible from the second direction whilst the image from the first direction becomes invisible, thus creating multi-image capability, well-known in the art. The term "read", "reading", "readable", "reader", or similar, as used herein, includes, but is not limited to, any coating or reflection of coating or partial or full image which can be see by any method both natural and artificial, including the natural eyeball, scanners, magnetrometers, electronic sensors, X-ray devices, microwaves receivers, energy reflecting or absorbing measuring equipment, magnetic resonance imaging and any other present and further method of detecting the existence of a coating or coatings on or within one or more layers, whether by reflectance, absorption, transmission, or any other means or combinations of means and whether partial or completely.

Coatings produced with precise perimeters may be used to act as reusable or disposable templates to check tolerances of manufactured parts and when formed on a transparent surface, such as a poly type plastic, may be overlaid on large areas of parts to provide a preliminary check of approximate tolerances or maybe used as a transparency to project the pattern with or without enlargement or reduction onto a part such as to check approximate size and shape. It is also possible to produce patterns on transparent surfaces which are then formed on a common mold to provide an overlay for checking tolerances on formed parts.

It is envisaged that materials exist or have yet to be invented which will enable changes of visibility or composition or physical properties during the addition of an outside effect or force. Current examples include thermochromic inks which provide an opacity or transparency under different temperature conditions; polymers or liquid crystals which, when aligned in one direction cause a general opaque effect, whilst when aligned in a different direction causes a substantially transparent effect. It is expected that coatings would be developed which would provide short term transparency or opacity or color change or energy in radiation response. A simple example could be a coating which when wet becomes transparent and when dry becomes opaque. Other examples could be coatings which inhibit transparency under certain radiations, x-ray, microwave, and the like and which are opaque in normal environmental conditions.

Coatings which are easily removable, for example, coatings commonly called "Scratch Off", can be applied to any portion of the material and can conceal identification marks which upon removal become visible and provide some form of indicia for a purpose. Alternatively, the coatings may be along the sidewall of one or more coatings such light, upon removal, they reveal the layers of coatings can then be identified to prove the authenticity of a particular material. Alternatively, materials which are very difficult to remove can be applied to any portion of the coatings, include sidewalls, such that removal will destroy part or all of the underlying coating or coatings, such as to make the material, document and the like unusable and unidentifiable. This could be used when it is desired to not have somebody be able to identify the underlying coating or coatings and they become destroyed upon removal of the surface coating, thereby concealing or destroying the original structure, to make it unrepeatable by another maker. Multi-layer "scratch off" coatings may be combined.

With multiple coatings, it is possible to cover an edge with the last coating, such as a flood coat, to conceal the underlying layers and after removal of this protective coat, to re-expose the coatings for analysis for typically authenticity to avoid counterfeiting.

Coatings which are viscous, flowable or solid at different temperatures and which return from a viscous to a solid state or vide versa upon changing temperatures can be used.

A coating which is susceptible to fading in ultraviolet light, such as sunlight, can be placed on the surface or, more commonly, within the layers of coatings, such that the main area of the coating is protected from ultraviolet light by coatings applied so as to be between that coating and the source of ultraviolet light, such as the sun. However, on the perimeter edge of the coating, an otherwise protected coating will have that portion exposed to sunlight, subsequently fade and provide identification of the presence of that coating, which would not have been apparent to the naked eye at the movement of printing or coating, but which will have changed gradually over time with exposure to sunlight to become apparent. In the same way, partial cover coats, offering UV protection, may be placed in a unique pattern over the surface of coatings, such that the uncoated areas will fade more rapidly than the UV cover coat protected areas of coating. This will produce unique patterns. Of course, the entire area may be covered with a cover coat or laminate or UV protective, graffiti protective and other uses. In the same way, energy absorbing or reflective coatings can be applied earlier in full, or over partial areas, to restrict or prohibit energy such as x-rays, scanners, MRI, and the like from penetrating behind those coated areas.

Coatings which will melt under radiation, or at certain temperature points well above ambient temperatures, may also be used for identification purposes. For example, when a document or imaged material is placed in an environment of say, 100 degrees Centrigrade or 212 degrees Fahrenheit, that coating may melt and dissipate or may expand or have another selected reaction. If it was a meltable coating concealed within the layers but which reached the edge, then the coating would melt out through the edged layers and become apparent. Alternatively, an expansive coating encapsulated within the layers would expand under heat and become apparent. Such an authentication method is very desirable for valuable documents, for identification of software, such as on the labels of software disks, and other anti-counterfeit or other devices intended to protect legitimate owners against duplication or copyright infringement and the like.

Certain coatings, energized by various forces including contact, heat, light and the like may release smells, such as scent, or may have a surface texture to provide unique feel to the touch or may have a modest surface electrical charge to discourage contact in areas of the surface or structure, may absorb light or reflect light in certain portions or have encapsulated cavities which are responsive to certain radiation. Encapsulation may include air, specific gases, liquids, flowable solids.

Thermochromic inks may be individually applied in a certain pattern so a to have part of the pattern change color at the appropriate temperature.

Illuminatable layers or light responsive layers or combinations thereof, for example, an electroluminescent layer energized from a portion or from the edge of the material or a UV sensitive coating, which will become visible under ultraviolet light or infrared coatings sensitive to different light or radio frequency spectrums combinations thereof or any new technology for sensing or reading the existence or presence of a particular material.

Coatings may be sealed within laminates of other material, or multi-layer laminates with different materials or coatings between different layers that are transparent or opaque or partially one or the other. Whether it be one coating positioned in a precise position once or one coating repeated on one or more occasion, or one or more combinations of coatings built up on one base or one or more combinations from identical bases or one or more combinations from different bases or whether the coatings are applied or encapsulated in any number of ways, the edge or edges of perimeter coating alignment determine the position and perimeter of one or more coatings.

Coatings may be partially metalized or reflective over some section or sections of the area, such as reflectorized behind the key word of an advertisement or company logo, so as to be reflective under light, under sunlight or artificial light at night.

Some layers may be impervious to certain substances or radiation, may be absorbent to some outside action or may be transmissive to radiation, chemicals, light, and the like, or may be dielectric layers with vias as a conductive method for any purpose.

Edge material may be dipped into liquid layers and withdrawn to carry coatings to a surface.

Structural integral and self supporting structures, examples of which could be speaker cover grills whereby the material is coated onto a base either in one thick coating or in successive coats to build up suitable layers, such that physical holes exist in the structure. This would be an alternative to molding plastic, or mechanically perforating sheets or plastic to create sound passages.

Figure 5B:
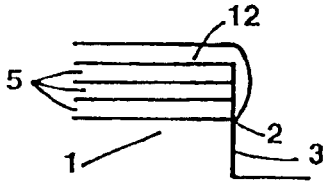
FIG. 5B is three layers of coating on a perimeter with an overlapped concealing coat or sealing coat over the three layers.

FIG. 5B shows where the coatings are designed to be concealed on their perimeter edges 3, a cover coat 12 may be applied along the edge 2 of one or more coatings. By producing precise patterns and then coating on top of a precisely patterned base, or by modifying existing coating bases it is possible to produce the unique structures including documents which become difficult if not impossible to duplicate whether singly or in production, thereby producing an identification which resists counterfeiting or other non-authorized production or duplication.

Figure 6:
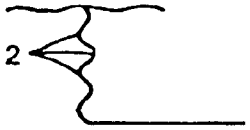
FIG. 6 is a plan view of an edge comprising a unique shape ready for coating.

FIG. 6 is a plan view of an example of an edge or base of unusual shape, whereby the edge 2 was produced because the base beneath the coatings was of that shape, or alternatively may have been modified after production by laser or some other method, to produce a unique shape. A laser can be used to provide precise edge cutting but can be set or selected so as to not be capable of cutting through a variety of different coatings such as metals, heat reactive coatings and the like without causing some damage or distortion of the surface. The term "refractive coating", "reactive", "changeable coating", "modifiable" or similar, as used herein, includes, but is not limited to, a substance or coating or material which can change or become modified in any manner for any reason including the use of an outside force such as radiation, reaction with other coatings, changes caused by contact or proximity to certain substances such as chemicals and the like, reaction between two different coatings where the one is reactive or both are reactive independently or with or against each other, or any other material which effects change in its texture, surfacing, color, size or in any other manner due to any cause. A laser is useful to deliberately modify a previously edge aligned layer of coatings for identification purposes, by maneuvering the laser at a variety of angles to create distinctive patterns in conjunction with selective coating orientations. The use of laser or other radiation is often desirable, because it can be precisely programmed to change both angle intensity, speed of movement over the surface, and other factors to provide a difficult if not possible to replicate pattern, unless the user knows the original control software for the laser.

Figure 7A:
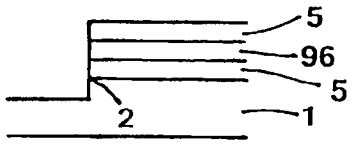
FIGS. 7A, B, C are cross sectional views of an edge with three coatings which are modified after coating.

FIG. 7A shows a reactive coating 96 has been placed between two other coatings 5 using edge alignment from an edge 2 formed on a base 1.

Figure 7B:
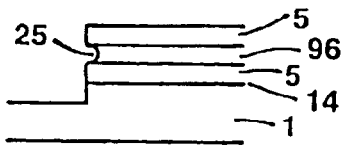

FIG. 7B shows the reactive coating 96 has become a recess 25 on the perimeter aligned with the edge. This may have been caused by a variety of factors, including external treatment, natural shrinking after coating due to dehydration or other reactions or causes, the effect of a treatment or application of heat or cold, or any other means which would cause a coating to shrink, or reduce in size, or change shape, whether or not the coating 96 is used in conjunction with other coatings 5 or not.

Figure 7C:
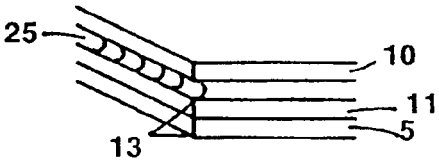

FIG. 7C shows a perspective view of the recessed coating 25 together with other structures including at op coating surface 10, a reactive coating, a lower coating 11, and another coating or any type 5, for example. The corner 13 is the use of an alignment edge which would have had the same shape on a base. The coating 25 was only modified on the left hand side of the angled corner 13 because the coating was only exposed to some outside force on that side and not on the side to the right hand side of the corner 13.

Coatings with special additives which harden or soften when exposed to certain conditions or which may have been mixed with another composition, such that a portion of material which is not being thoroughly mixed will swell up upon exposure to light and create unique patterns in the surface of the coating. Such coatings could be polymer reactive coatings added randomly to conventional coatings such that when they read, molecules are grouped together in sections and are not thoroughly mixed together the entire coating and therefore show up as a differential pattern, when exposed to some external energy source, such as light, heat, and others.

When the side wall of the coatings is subjected to identification scrutiny, the orientation of the previously invisible layers would show the relevant layers and for example, an ultraviolet layer would show as a fine line, under UV light, on the perimeter of the edge treatment an by placing one or more ultraviolet layers, the spacing of these layers can be further identification as to the ownership of the document. The ultraviolet layers would show, and could look similar to the lines of a bar code according to their thickness and/or spacing. Because the layers can be extremely thin, it would be possible to coat various structures to provide positive identification as a device to restrict forgery, or to provide proprietary identification of any product, for example, software which might otherwise be prone to illegal duplication or replication.

Figure 8A:
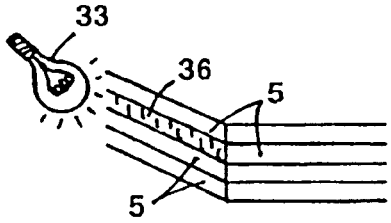
FIG. 8A is one coating reacting to an outside source, such as light, to change the composition or appearance of that coating.

FIG. 8A shows the use on an energy source 33, such as a light, to cause a surface reaction 36 on a particular coating which was reactive to the energy source. Other coatings 5 were of a different type, and therefore did not have the reaction 36.

Figure 8B:
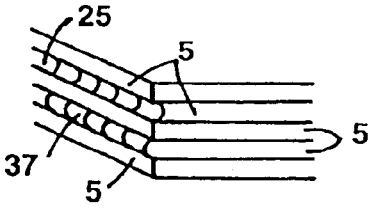
FIG. 8B is one coating layer contracted to form a recess and another coating layer expanded.

FIG. 8B shows the use of two different types of reactive coatings, and illustrates an expansion effect 37 and a contraction effect 25 on one side of the structure. It is possible that different coatings were used and exposed to a common energy source or natural reaction. An alternative is that one coating was selected and was exposed to one source and the second coating was selected and was exposed to a different energy source on a different occasion to produce the two different results, namely expansive of one coating and contraction of another, while different types of coatings 5 were unchanged.

Figure 9A:
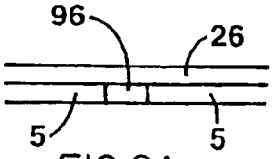
FIGS. 9A, B, and C illustrate a series of cross sections of a concealed portion of coating reacting to an outside energy source, such as light, to cause expansion of the lower coating, and subsequent distortion of the upper surface.

FIG. 9A shows an encapsulated reactive coating 96 contained between two adjoining layers of any coatings or coatings 5 together with an overlaid coating 26. Coating 26 may be transparent, opaque, or otherwise, as required. The coatings 5 may have already been transposed from a base, in this example.

Figure 9B:
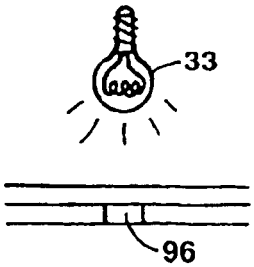

FIG. 9B shows the exposure of a reactive coating 96 to an outside energy source 33, such as a light, to cause coating 96 to react to that energy source 33.

Figure 9C:
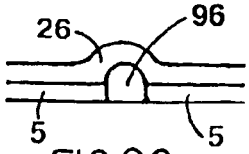

FIG. 9C shows the results after energy exposure whereby substance 96 has now expanded and caused distortion of the upper coating 26 such as to create a deformation in the upper surface. Coating 26 could also be a film laminate or other material which was added later and need not necessarily be an applied coating. Such films could be of the poly type and be transparent or opaque or metalized or any other type of material able to change its shape from the force exerted by the now expanded coating 96, and coatings 5, which were used to provide a containment means for coating 96 may be affected or unaffected by the expansion of substance 96.

Figure 10A:
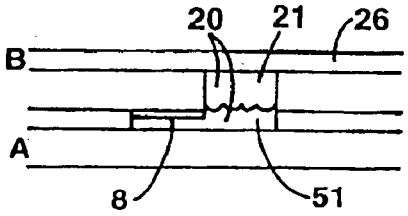
FIG. 10A is a partially filled cavity within coating layers, together with a space for gas or air, and submerged indicia.

FIG. 10A shows a structure which incorporates a cavity 20 which comprises an example of structures whereby the cavity 20 is partially filled with a liquid 51 and at least partially filled with a gas, such as air 21. The gas need not be present and a vacuum or substantial vacuum state could also occupy the space 21. Indicia 8 has been applied to the lower surface of one of the structures. One side of the structure has been denoted by the letter "A" and the other side of the structure 26 may be transparent or opaque and has been destroyed by the letter "B".

Figure 10B:
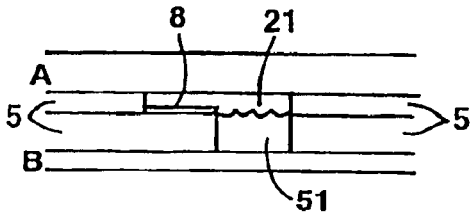
FIG. 10B is the same construction as FIG. 10A but inverted upside down such to cause the liquid to move to another portion of the cavity to reveal indicia, previously hidden under the liquid.

FIG. 10B shows the structure as shown in FIG. 10A, which has been turned upside down such that the liquid 51 is now occupying the previous air, gas, or vacuum portion 21 of FIG. 10A and the indicia 8 which was submerged in FIG. 10A is now visible in FIG. 10B because the quantity of opaque liquid was chosen to occupy the volume of the cavity in this manner. In this example, it is possible that structure "A" may be transparent and that the liquid 51 may be substantially opaque. This would preclude visibility of the indicia 8 in FIG. 10A, but provide for the visibility of the indicia 8 in FIG. 10B. It is also possible that structure "A" is opaque to the visual spectrum, but that the indicia 8 may be "read" or visible, by alternative means as disclosed herein. The structure may be a combination of materials, cut materials, and coatings 5, see through surfaces, plastics, or any other type of material to provide this concealment and subsequent revealing of the previously hidden indicia 8. The term "see through surfaces", "window", "glass", or similar, as used herein, includes, but is not limited to, materials which are partially or substantially transparent, translucent or otherwise capable of at least some light transmittance and may also be in combination with a degree of light reflectance. Examples include windows, made of glass, plastics and other transparent materials with a flat surface, a simple or compound curve, or shapes or combinations thereof, including glass which has been molded or formed to one or more shapes, rigid plastics with the same treatment, flexible plastics such as films, inflatable walls of material, elastomeric substances including rubber and the like and any other substance or combination of substances which permits some light transmission. See through surfaces can also be any combination of materials which provide at least partial transparency. In addition to glass and plastics, laminates of glass and plastics, or multiple laminates of glass bonded by plastic type materials or multiple layers of plastic bonded by adhesives or other plastics to form multiple layers are included. These layers could include films to at least partially restrict transmission of light to partially or completely reflect transmission of light such as tint coatings or film, or may contain gradiated or varying light transmission portions in any of these materials, in stand alone or combined usage. The term "light passages", "holes", or similar, as used herein, includes, but is not limited to, spaces, air/gas chambers, or cavities where visible light spectrums and other forms of visible and invisible radiation may pass partially or completely through the materials, air, gas, or spaces in areas where there is no cooling, or may partially pass through areas of coating such as translucent or semi-transparent coatings or materials. Light passages may have multiple apertures in one section of material or may be one large aperture. Different types of light passages may occur where completely transparent passages are located in proximity to light passages of different transparent capability such as to provide a readable pattern to the eye or on sensing equipment, such as scanners or other measuring equipment. The light passages may also form a pattern, which may also be visible or invisible to the naked eye, but visible to other sensing devices to an identifiable pattern such as a security code or other image which becomes visible only when the density of the light transmission is factored into the "reading" or testing of the surface. Light passages may be made with a complete circumference of perimeter edging or edges may be open at one section or another. For example, the letter "U", has one portion open and one or more portions of the light passage may have openings and may be also combined within the inner perimeter or outside the perimeter of other shapes of light passages.

One or more layer or layers which have been previously printed onto a particular base or intermediate base can be transposed in any particular order onto other intermediate bases or directly onto intermediate or final surface material in any particular order, one on top of the other, deliberately aligned, or misaligned, as the case may be, and may also be used, if needed, to encapsulate cavities of air, gas or other materials.

Once a previously made coating group has been transferred to a final surface, it is possible to repeat that step with identical or different coatings such that one set of coating is transposed on top of an existing coating or set of coatings previously applied. It is also possible to encapsulate air, gas, specific liquids, and the like, during this stage and this step may be repeated numerous times to build up complex structures, with or without hidden indicia or other identifiers.

Various adhesives, well known in the art, can be applied to one surface of the coatings for subsequent attachment to a final or intermediate surface or as a transportation means from the base to another surface and then subsequent removal of the adhesive due to the differential surface contact between the transfer media and the final surface such that the adhesive will separate on the coatings level while the coatings are retained on the final surface. The term "intermediate surface", "transposition media", "media", "secondary base", "transfer tape", or similar, as used herein, includes, but is not limited to, one or more intermediate surfaces to which the coatings are transposed as part of the process. The intermediate surface may be used to reverse the orientation of the coatings during transportation or transposition, or may be used to combine several separately created layers together into one final structure or may be used for storage, transportation or other uses prior to installation on a final surface. An intermediate surface may also be a charged plane to temporarily hold coatings in place until the charge is reversed or ceases, which then releases the coatings. Also, coatings commonly known as "release" coatings, can be used for this purpose.

Diffusion gratings, dielectric layers and combinations of these may be used to provide perimeters and conductive layers.

It is possible to transpose levels of certain base coatings, while leaving other levels on a premade separation point which may not be parallel to the surface of the base. When transposing, Radio Frequency and Ultrasonic transfer means may be used.

Figure 11A:
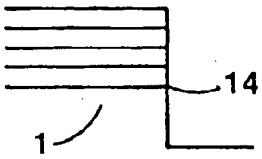
FIGS. 11A, B, and C illustrate the steps of coatings separating at a release point and carrying the coatings, independent of the base, to another surface.

FIG. 11A shows a structure with four example coatings A,B,C,D attached at a release point 14, and aligned on a base 1.

Figure 11B:
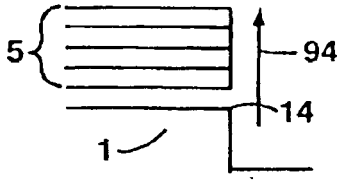

FIG. 11B shows the coating structure 5 has been removed from the base 1 in a removal direction 94 such that the coatings separated from the base 1 at the separation point 14.

Figure 11C:
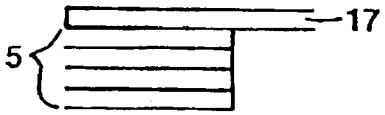

FIG. 11C shows the coatings 5 being handled independently of the base or intermediate or final surface until transposition to an intermediate or final surface 17, or to another structure. Because the coatings have adequate integral strength, it is possible for a base to be used to manufacture identical structures in a repetitive manner by following the steps of FIGS. 11A–11C. It is also possible to build up complex structures from a common base by repeating the steps of FIG. 11A and FIG. 11B, and attaching each successive series of coatings to the preceding series of coatings, all of which will match or line up because they were made from a common master base 1.

The term "solid liner", "impervious liner", "solid backing", "backing liner", or similar, as used herein, includes, but is not limited to, at least one partially continuous or impervious layer or one or more locations of a structure, or base which provides numerous advantages, including for example the ability to retain a vacuum to lift and or transport a base through various printing techniques, or to catch over-spray from a painting or ink jet type application or to act as an insulator or conductor or restrictor for radiation or electrical current, other beam or exposure methods; to prevent the ingress of dust or other undesirable particles into the print area or coating area, to act as a overflow receiver when using flood coats and also as a separator for multiple layers or for transportation of stacked bases or coatings together with many other uses.

Figure 14A:
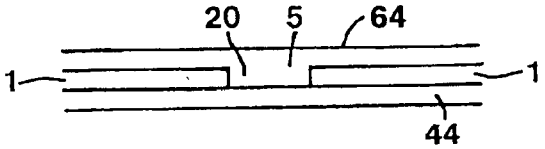
FIGS. 14A and B are cross sections of a base comprising edge aligned coatings, recess filling coatings and the addition of a protective laminate or other coating on the upper surface.

FIG. 14A teaches a base 1 to which is attached a solid backing liner 44 such that the solid backing liner 44 may be transparent or rigid, inflexible or semi-flexible, and is designed to act as a base or for certain printing processes where holes exist in the bases, to hold a vacuum on printing pressure or spray coatings are applied on the bases with holes in them. The solid liner 44 may act to catch over spray and protect material beneath the solid liner 44. Coating 5 has been used to fill the cavity between the two bases 1 and additional coatings could be applied on top of that coating. The upper surface 64 of the coating 5 is substantially horizontal and includes that coating 5 may have been a liquid or flowable solid which was allowed to flow and fill the cavity 20 where the cavity 20 was formed by the two bases 1 on either side of the cavity 20.

Figure 14B:
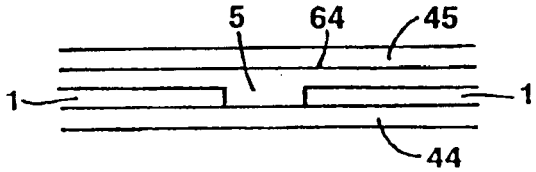
FIG. 14C is a cross section of a base with two thick coatings and four thin coatings on either side of a cavity such as for a light passage.

FIG. 14B shows the same construction as FIG. 14A with the addition of, for example, a laminate 45 or other substance attached to the top of coating 5 at the upper surface point 64.

By printing or coating particular types of layers in certain sequences it is possible to use various identification means to determine if the particular coating was printed by the person or organization who has an interest in the coated object. For example, one particular coating may be overlaid with a coating which is visible only in ultraviolet light which may be followed, for example, by a metallic coating of a certain type, silver, gold, aluminum or other material which may be followed by a phase change or other thermochromic or Photochromic ink and other coatings, as desired.

When the side wall of the coating is subjected to identification scrutiny, the orientation, of the previously invisible to the naked eye layers, would show the relevant layers. For example, the ultraviolet layer would show as a fine line when exposed to a UV light source on the perimeter of the edge treatment and by having one or more ultraviolet layers, the spacing of these layers can be further identification as to the ownership of the document. The ultraviolet layers would show, and could look similar to the lines of a bar code according to their thickness and/or spacing. Because the layers can be extremely thin, it would be possible to coat various structures to provide positive identification as a device to restrict forgery, or to provide proprietary identification of products, such as software, which might otherwise be prone to illegal duplication or replication.

Figure 14C:
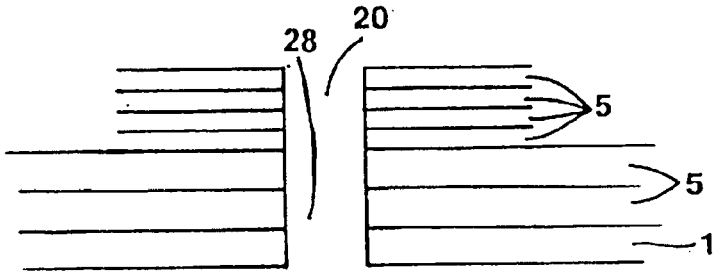

FIG. 14C shows an alternative structure without a solid liner whereby the base 1 was used to apply six additional coatings of any type or duplicates of more than one of the same type 5 whereby two thick coatings were applied above the base followed by four thinner coatings, all of which created a cavity 20. The cavity 20 could also act as a light passage 28 in certain embodiments or could be retained as a cavity on an intermediate or final surface. The cavity 20 could also be covered with a laminate or other sealing means on one or both sides of the coating construction to form encapsulated compartments, or filled with a substance before or after transposition.

Figure 15:
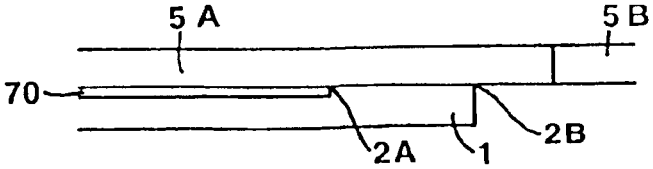
FIG. 15 is a cross section view showing a thin metallic or other thin film layer recessed or heat melted into a base together with an overlaid structure.

FIG. 15 shows a base 1 which has an internal edge 2A forming a depression or cavity to hold a layer such as a metalized layer 70 together with subsequent application of an additional coating 5A. The coating 5A and the base 1 together with its metalized coating 70 may have been manufactured separately and transposed into close proximity as a subsequent step. Edge 2B may have been formed by having a second base in alignment with base 1, and subsequently removed to cause the existence of edge 2B or coating 5A may have been transposed after creation or the base 1 together with its coatings 70 may have been transposed against the surface of coating 5A as one of several steps of the process. Coating 5B may have been previously attached to the perimeter of coating 5A or added subsequently There are numerous options of construction steps of which FIG. 15 is one example.

Figure 16:
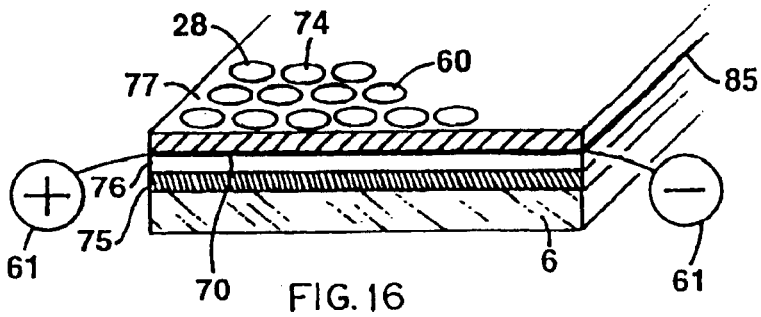
FIG. 16 is a cross section of coating layers where one coating is electrically conductive, whether metal or conductive coating, which may have been applied via vapor deposition, hot or cold, foil stamping, transfer or other means.

FIG. 16 shows a perspective view of am multi-layer construction attached to a see through surface 6 where by a black coating 75 has been placed against the see through surface 6, a white coating 76 has been placed against the black coating 75, a conductive coating 70 or conductive layer 85 which may have been either a conductive ink, a diffusion grating pattern, a metal material applied via vapor deposition or foil stamping or other means and an upper indicia surface 77 which can provide other visible information. The light passages 28 may penetrate through all the coating layers such that the see through surface can be used to view from one side or the other through the light passages 28. It is also possible that the upper surface material 77 may be transparent or use transparent inks, or use inks such as fluorescent inks or electroluminescent coatings or phase change coatings, any of which can be changed by the existence of an electrical current passing between the contact electrodes 61. The current may be AC, DC, or static electricity, or other energizing means, and the coatings may, depending upon the coating applied, become illuminated by the flow of current such as electroluminescence; may become opaque such as liquid crystal or polymer 60, which would rotate in a certain electrical state to prevent visibility through the material; may be partially opaque to reduce the light, heat, or radiation through the surface of the material, such as for energy or heat control; may be used to illuminate coatings at night, may be used to produce heat from the resistance to electrical current flow, such as to cause thermochromic type inks to change color during the period of increased or decreased heating or cooling, and many other uses. It is possible to combine coatings such that each light passage 28 may be filled or partially filled with one or more coatings 74. All of the holes or some of the holes may also be filled or partially filled with the same or different substances to create a readable pattern. An example of this would include the use of a electroluminescent substance in some holes to form the shape of visible letters, which only become apparent when the current is flowing through the conductive layer, whilst other holes containing other substances may respond to the same current flow by changing color, and other examples. There are numerous possibilities including use of the light passages 28 as cavities which can have coatings individually applied into each cavity or where all the cavities are used for one coating or combinations for precise purposes, including the creation of patterns which only become apparent when external force such as radiation exists. It is also apparent that the addition of some external lighting source on the opposite side of the see through surface 6 to the coating side could, when illuminated, transmit light either through the light passage 28 or if the black coating 75 were not present, it could provide illumination through the coatings or other substrate materials on the see through surface 6 such as to illuminate all areas so chosen. In that situation, a coating may become opaque when the current was applied, or transparent when the current was applied, as applicable. It is possible to create areas whereby the rear illumination would not transmit through those sections, and that would also create a unique pattern. The choice of photochromic inks or other coatings susceptible to that light source could also be used together with fluorescent inks or other materials which absorbed and created an apparent brilliance from the coatings whether they be in the main surface 77, or as a coating, or encapsulated within layers of transparent or partially transparent materials such as inks or plastic films, or are deposited selectively in one or more holes or light passages.

For example, an electroluminescent layer energized from a portion or from the edge of the material of a UV sensitive coating which will become visible under ultraviolet light or infrared coatings or other coatings sensitive to different light, or radio, frequency spectrums including combinations thereof or any new technology for sensing or reading the existence or presence of a particular material.

Polymer materials, similar to liquid crystal, which can be electrically charged in different layers using via to take the current to the appropriate levels, and therefore create changing patterns. A dual construction whereby one layer is energizable and another layer is separately energizable such that you can have the combinations of both layers off, which means you would see through the entire surface. Both layers on would mean the surface was opaque, one layer on the other off would mean that you would see through the percentage according to the layer turned on and off if, for example, they were 50% each, then you would have 50% visibility when either one was on or off and if the percentages were adjusted, you would be able to have, for example, two thirds on, one third off and the reverse.

If metal or conductive ink coatings form part of the coating on a see-through surface, such as glass, and if the glass is broken, either by accident or in a burglary, then a current which was passing through the conductive layer, will cause an alarm signal to sound but the burglar may not be aware of the existence of the metallic or conductive layer and will be unaware that the alarm has been triggered.

Figure 17A:
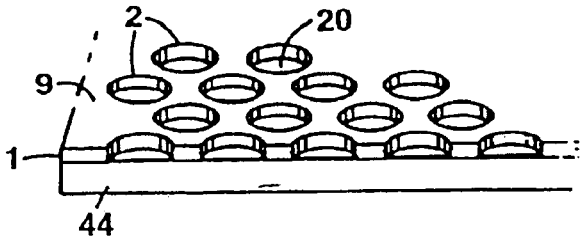
FIG. 17A is a perspective view of a base, ready for coating, including pad or transfer printing.

FIG. 17A shows the construction of a material comprising a series of edges 2, in this example round holes in a repeating pattern, built as part of a base 1 which has been attached to a solid liner 44. The holes 20 to create the edges 2 may have been produced in the material by well known art including perforating, punching, die cutting, laser cutting and the like. The use of a solid liner 44 could facilitate handling of the base 1, containing holes 20. The purpose of the liner 44 could include holding a vacuum on equipment or handling the base for coating, or to add strength to an otherwise flexible or fragile base which would have lost rigidity because of the presence of the holes 20, or to catch excess coatings from and stop excess coatings transiting the cavities 20 during spraying or application means, or to act as a separating device such that the sidewalls of the holes could be coated deliberately with, for example, metal from vapor deposition, sprayed coatings of liquids, or if the base 1 were of a metal construction, magnetically or electrostatically applied or responsive coatings. The sidewalls of the holes 20 could be deliberately coated in this manner, and the the upper surface of the material could use a portion of the teachings of the present invention to apply coatings to a coating surface 9. As any sprayed or other applied coatings would also touch the solid liner 44 within the area of the holes 20, separation of the two structures would mean that the solid liner 44 could carry away any residual coating which was on its surface, and leave the base 1 with coatings on the sidewalls of the holes 20 in addition to precisely align coatings on the upper surface 9. The structure as shown in FIG. 17A can also be used as a temporary base for repetitive reproduction and transposition of coatings from its surface to an alternative surface, by including release points, coatings, or similar in any location.

Figure 17B:
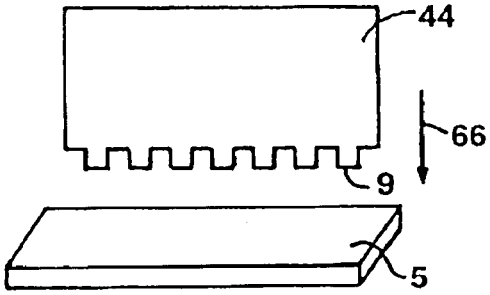
FIG. 17B is a perspective view of a base receiving a coating for transposition.

FIG. 17B shows a side elevation of such a structure 44 together with the coating surface 9 being placed, in directions of movement 66 against coatings 5 and then having one or more of the coatings 5 built up on the coating surface 9 ready for transposition to another surface.

Figure 17C:
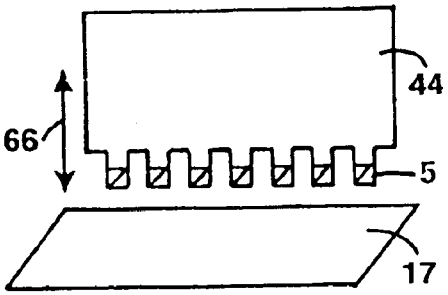
FIG. 17C is a perspective view of a base, now coated, transposing a coating to another surface.

FIG. 17C shows the presence of the coatings 5 on the structure including solid liner 44 and ready for transposition downwards to an intermediate or final surface 17. It is possible that the surface 17 could be a base which will be used to build up multiple layers of coatings using the master as symbolized in FIG. 17A so as to produce the same pattern.

Figure 18:
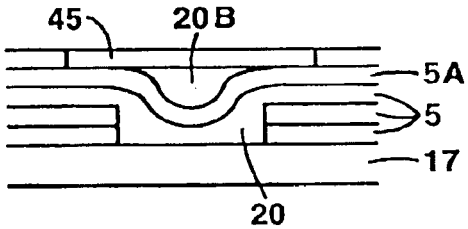

FIG. 18 shows a construction with an intermediate or final surface 17 together with transposed coatings 5, showing where coatings SA has partially deformed or sunken into the cavity 20. The cavity 20 may have a coating partially filling the hole to which the cavity 5A has been applied over the surface. A second cavity 20B has been formed in the area above coatings 5A and the entire structure has, for example, been covered with another coating such as an over laminate 45 or may have also been covered with clear coatings or any other structure whether transparent or opaque. The purpose of this construction is to be able to provide encapsulated materials sealed within structures clearly defined so as to be readable by any means, as defined herein.

A product may be made using the same master for two or more occasions and when the subsequent transposition occurs it is aligned to be above the first transposition, This can be done using locator pins or other alignment means to improve accuracy such that it would become mathematically improbable to have a part of a document with the same edge treatment or deliberate fault directly aligned above another, with a clearly different visible layer in the middle.

Figure 19A:
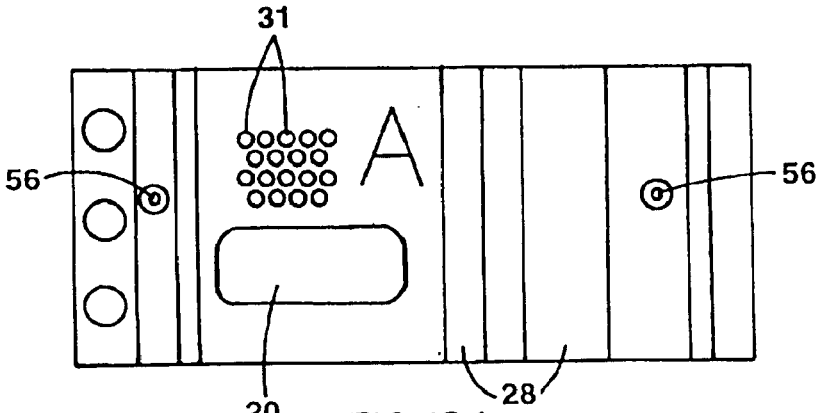
FIG. 19A is a plan view of the result of placing several bases or transposed coatings formed from different bases designed to have at least some cavities in common.

FIG. 19A shows a plan view comprising the use of two locator pins 56 as one example of a method to align coating layers prepared on one or more bases where the bases would have had a common reference point, such as locator pins. There are obviously numerous ways of aligning, including a corner registration method, and many others. The example shows an indicia A, a series of holes 31, a large cavity 20, a series of light passages 28, and opaque and transparent sections are possible. Numerous possibilities where one or more of the coatings of any type or combination of types may be used to produce unique results. For example, it would be possible that the upper surface has the cavity 20 but that surfaces below the upper surface do not have the same cavity, and indicia would be visible on the lower level visible through the cavity 20. Also, light passages 28 may permit light through the entire structure, or through one or more layers of the structure until obstructed by another layer in the multi-layer structure envisaged.

Figure 19B:
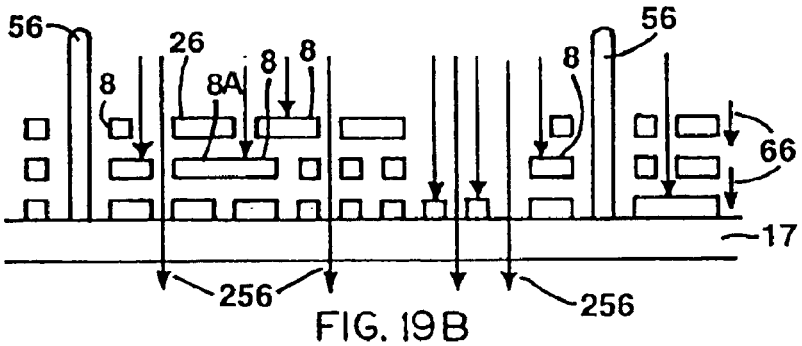
FIG. 19B is a cross section view of three structures being placed over alignment pins for specific purposes.

FIG. 19B shows a side elevation showing an intermediate or final surface 17, although this may be an intermediate base with the locator pins 56 which are either subsequently removed, or which is used to build up the construction, and then the entire construction is transferred to an intermediate or final surface. In this example view, three individual layers of coatings are being applied, with the lowest coating already attached to the surface 17, and the second and third layers are being transposed downwards in direction 66 so as to bring all layers into contact. Transmitted radiation 256 is shown transiting the multiple layers being applied. Reflected or absorbent surfaces, for example indicia 8, are apparent in different positions. It is also possible for part of a layer to be transparent 26 such as to permit visibility through the transparent layer 26 to the indicia 8A of a layer beneath the transparent layer, at least in one portion of the construction.

Figure 19C:
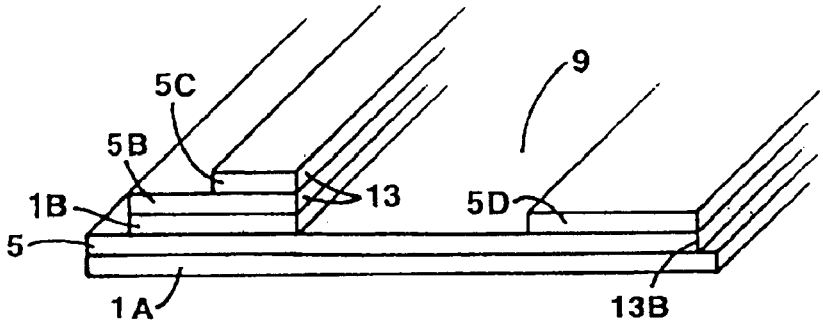
FIG. 19C is an end perspective view of options available for edge alignment.

FIG. 19C shows a base 1A which incorporates a coating 5 attached thereto. On top of the coating 5 on the left hand side is a second base 1B and this has applied coatings 5B and 5C respectively, all sharing a common sidewall or alignment edge 13. Between the multi-layer structures to the left and right can be a possible coating surface 9. On the right hand side is a secondary alignment edge 13B to which has been added an additional coating of any type 5D. Such a construction can be used to provide complex, but repeatable and identifiable structures for numerous uses.

The third alternative is to leave the surface of the material untreated but to have one or more of the coatings to be an expansive substance which expands upon certain effects such as heat or light such that it will expand after coating and that the coatings in the cavity will enlarge and rise above the surface level of the top of the base. This then means that you can bring these new plateaus into contact with the final material or an intermediate material as part of a transposition step to a final material and transpose the cylindrical shaped or other shaped dot coatings to the final material.

Figure 20A:
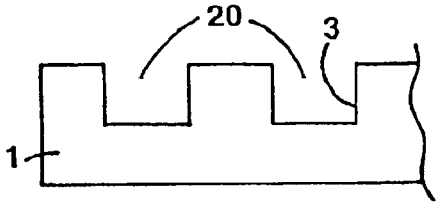
FIGS. 20A, B, C, D, and E illustrate the steps of cavity edge filling followed by coating expansion transpositioned to an immediate or final surface, removal of the base and the final view on the surface.

FIG. 20A shows a cross sectional view of a base 1 showing two cavities 20, each with respective perimeters 3.

Figure 20B:
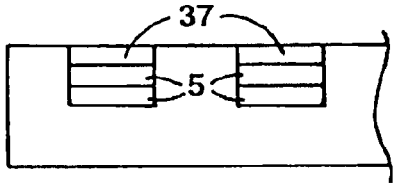

FIG. 20B shows the cavities of FIG. 20A now filled with initially two coatings 5 of any type or purpose together with a top coating 37 which may be an expansive coating such as to cause thickening of that coating in certain conditions.

Figure 20C:
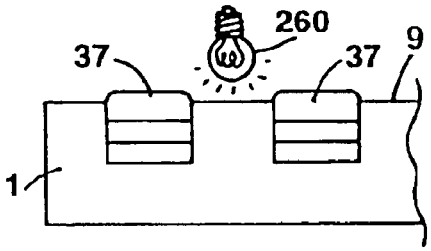

FIG. 20C shows the construction of FIG. 20B together with the addition of a source of radiation such as actinic radiation or light 260 such as to cause the coatings 37 to swell or expand and produce above the upper surface or the possible coating surface 9 of base 1. In an alternative embodiment, it is possible that the now elevated surface on top of expanded coatings 37 may in turn provide a base for subsequent coatings or may provide a receiver level, such that other materials may be brought into intimate contact with the upper surface of coatings 37. Alternately the expanded coating 37 may form a perimeter for coatings applied on surface 9 between the existing coatings 37. Examples of these other materials could be rigid or semi rigid materials including laminates, plastics, glass and the like, or may be additional coatings individually applied to the upper surface.

Figure 20D:
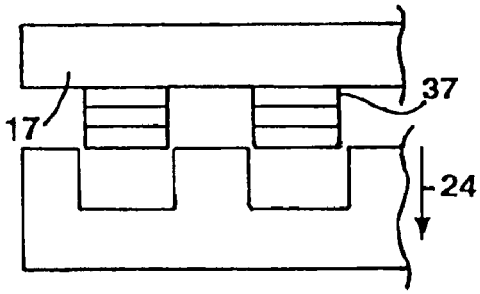

FIG. 20D shows the coatings now transposed such that coatings are now attached to an intermediate or final surface 17. This was possible because the coatings 37 protruded above the surface of the base and allowed transposition via any method such a heat or pressure, without causing the base 1 to contact the surface 17 whilst the heat and or pressure or other methods were being applied. This caused the coatings 37 only to contact the surface 17 and allow release of the base 1, in direction 24.

Figure 20E:
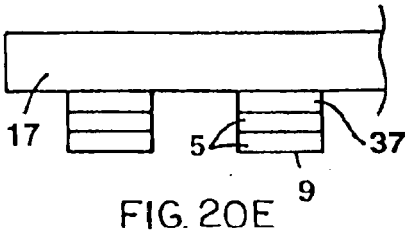

FIG. 20E shows the now transposed coatings 37, 5 on the surface of material 17 and the coatings may be for any purpose, and the spacing, if any, between the coatings may also be for any purpose. It is also possible that the expanded coatings 37 of FIG. 20C could themselves become the new boundaries for other coatings applied to coating surface 9 in FIG. 20C such that the entire coating structure had a common upper surface approximately an alignment, similar to the teachings of FIG. 18. This would mean that upon transposition to a surface 17, the coatings on the upper surface 9 of FIG. 20C would also be transferred to surface 17 and provide for unique effects.

Figure 21A:
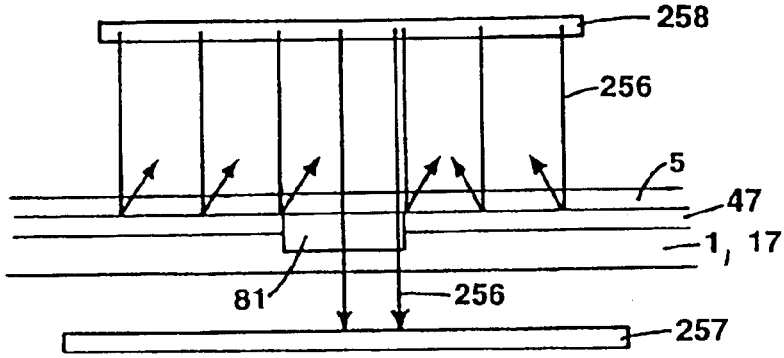
FIG. 21A is the use of perimeter edging to produce reflections from an energy source such as x-ray, scanner and the like, where one section of the coatings are transmissive through to a receptor on the other side.

FIG. 21A shows a construction which could be used for scanning identification. An example structure, either a base 1 or a final surface 17, comprises a partial area of reflective coating 47, together with a transparent coating or section 81, and a form of coating 5 which, for example, may be opaque to the visible spectrum. Therefore, the coating or compartment 81 is not visible to the naked eye. A source of radiation 258 would transmit radiation 256 towards and/or through the surface of the material such that a receiver 257 of radiation would accept radiation only in that portion of that surface which aligned with the transmissive section 81. A reflective coating 47, such as metal, would reflect back other radiated beams and not permit their transmittance. Two methods of sensing are apparent. The first is the radiation transmitted to a receiver in a measurable pattern, position and shape. The alternative is to measure reflected, rejected, or absorbed radiation in other portions. It is also envisaged that partial transmittance of radiation through control of type or thickness of coatings, would also increase the security aspects of such an identification method, and produce a definable pattern or partial pattern, of a particular shape.

A more efficient interior reflecting surface can be providing to reflect heat back into the oven whilst still retaining visibility through the glass of a typical oven door insulative properties can also be put into the coating to reduce heat transmission through the glass in addition to the heat reflective coating facing the interior of the oven. The ability to reflect heat back into the interior of the oven, combined with visibility through the material into the oven, provides the benefits of a glass panel without the disadvantage of heat dissipation through the glass.

Figure 21B:
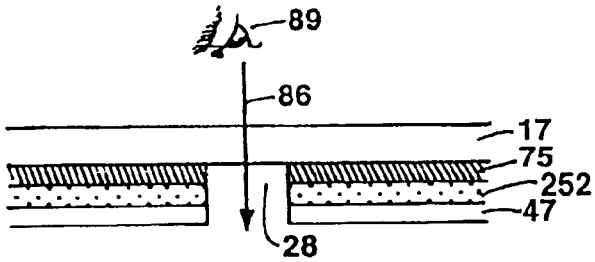
FIG. 21B is a cross section view of a see through surface comprising light absorbent, insulative and heat reflective coatings.

FIG. 21B shows a cross section of an inspection port for numerous uses including ovens, heating units, laboratory equipment, autoclave, furnaces, and many other applications where control of radiated energy, including heat, is required in conjunction with some degree of visibility. The structure 17 has had applied a black coating 75 to which, for example, has been added an insulative layer 252 together with a reflective layer 47. The observer 89 would see through the direction of observation 86 through the light passage 28 to see the view on the other side of the material. It is equally possible to have the coatings with the same orientation on the opposite side of the material. For reasons of protection of the surface material 17 from radiated heat, it would be normal to have the coatings on the side of the material 17 which faces the heat or radiation source. This would provide better reflectivity of heat energy from layer 47. The benefit of this structure is that, for example, in a home cooking oven, the reflective coating 47 would be some form of metalized or other reflective surface to "bounce back" radiated heat energy into the cooking area, and thus reduce energy consumption and reduce loss of heat through the surface 17. It is envisaged that the structure would comprise numerous patterned light passages 28 such as to provide an all over view into the heated area, such as the oven. A partially reflective, yet transmissive coating may also be used as a coating to add to heat reflectivity.

Figure 22A:
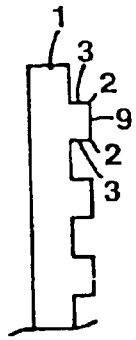
FIGS. 22A, B, C, D, and E is a series of views illustrating plateau perimeters receiving coatings being transposed to an intermediate or final surface and the multi-layer coatings remaining attached to the final surface.

FIG. 22A shows a base 1 prepared with a surface treatment, such as a release coat, ready for the reception or application of coatings on the edge 2 to define the perimeter 3 for a coating surface.

Figure 22B:
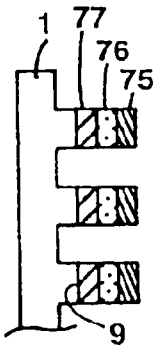

FIG. 22B shows an example when three coatings have been sequentially applied to the coating surface 9. For example, these coatings may be a black coating 75, a white coating 76 and a colored indicia 77. Alternatively, the colored indicia 77 may be a mono color, reflective coating, reactive coating and any of the three coatings may be of any type, combination of types, or may even be multiple levels of the same coating, in any embodiment, or example, herein.

Figure 22C:
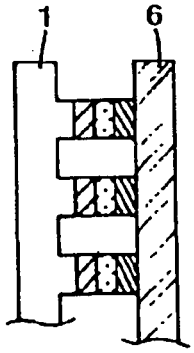

FIG. 22C shows the now coated base 1 brought into contact with a see through surface 6, such as glass, for transposition of the three example coatings to the surface of the see through surface 6.

Figure 22D:
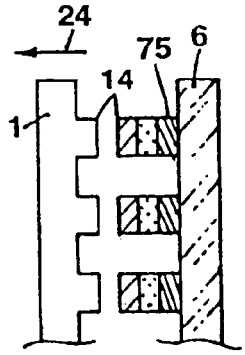

FIG. 22D shows the transposition step 24 whereby the base 1 has been removed at the separation point 14 from the coatings which are now applied to surface 6. There are numerous well-known methods in the art for causing separation of layers at different points under different situations and, by way of example, it is possible that release point 14 may have been an adhesive of a lower adhesion peel strength than the adhesion between the coating 75 and the see through surface 6. If no adhesion is used, it is possible that coating 75 may incorporate a material which melts or otherwise responds to heat and/or pressure to cause adhesion to the see through surface 6 or any other example whereby there is a release occurring. It is also possible that separation point 14 may be a substance which dissolves in water or other substances or separates in exposure to light, or other well-known methods in the art.

Figure 22E:
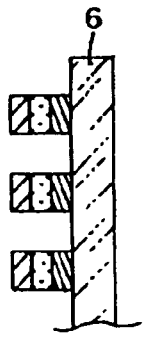

FIG. 22E shows the final result of a see through surface 6, together with its now attached coatings. These coatings may remain as located or alternatively the see through surface 6 may be further processed via temperatures to fuse the coatings into the surface of the material of the see through surface 6, such as ceramic ink fused to glass. The coatings may be treatable in some method, such as actinic radiation or heat or other methods to insure improved bonding or adhesion to the surface 6, or alternatively the coatings may be easily removable from the surface 6 via the exposure of any energy source, radiation, and the like to cause separation between the coatings and the see through surface 6, to facilitate removal.

Sector control can be used to provide electrical current flow as an example, through different sections of a material such as, for example, a see-through surface where portions of the see-through surface are opaque or transparent, or partially one or the other, as required at any time. The control may be automatic from some form of sensing device. Such as a light sensor, which determines daylight and darkness, or a manual control means such as switching such that sections of an overall larger surface react according to a pre-designed construction. By using perimeter edge alignment very precise limits to each sector can be obtained, and overlap between one sector and another can be avoided.

A second example of sector control can be a rear window of an automobile, which has section with defined perimeters where a portion can be heated as a means of removing condensation, ice and snow, or alternatively a particular portion can be made opaque to keep overhead sunlight off the back of passengers in the rear seat.

Another example is see-through surfaces of homes where it is possible to activate sectors of a window such that as the afternoon sun becomes lower in azimuth in the sky, successive sectors of a window can be made opaque using teachings of this invention and other known methods in the art, such as liquid crystals and player coatings so as to provide a sun shield from heat and glare progressively through an afternoon.

In radiation shielding, many uses exist where angles of radiation may wish to be permitted to transmit or restricted from transmission, such that the radiation path is controlled. By limiting the perimeter of one or more sections, it is possible to achieve these objectives. Uses can be made in laboratories, medical facilities and industrial applications, or protection for safety of employees, patients, and others.

Figure 23A:
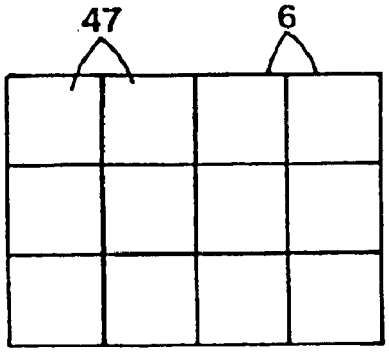
FIG. 23A is a multi-segmented see through surface with all segments in a transparent state.

FIG. 23A shows a see through surface 6, such as a window, which in this example, shows twelve panels which may be individually controlled or controlled in combination to control light or energy transmittance in defined sectors, to provide a sector control as defined herein and where the sectors are not apparent when all sectors are in the same state. In FIG. 23A, all sectors have been activated to be reflective 47 such that a viewer on the one side does not see through the material to the other side and depending on the degree of reflectivity, may see their own image in the manner of a mirror.

Figure 23B:
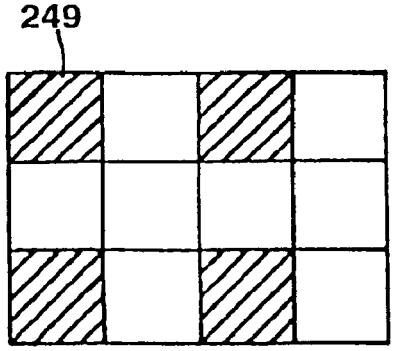
FIG. 23B is four of the segments energized to an opaque condition.

FIG. 23B shows four sectors which have been changed to an opaque state 249, whilst the remaining sectors are reflective.

Figure 23C:
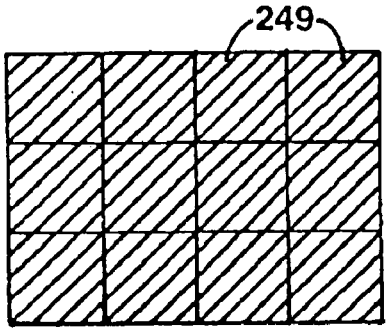
FIG. 23C is all segments energized to an opaque condition.

FIG. 23C shows all sectors in an opaque state 249 such that visibility is not possible in either direction.

Figure 23D:
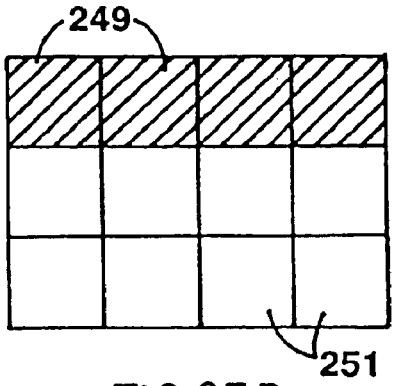
FIG. 23D is the top section of segments energized to an opaque condition, for specific purposes, for example, as a sun-shielding method for overhead sun protection, at certain times of day.

FIG. 23D shows the top section as opaque surfaces 249 and could be used to stop sunlight entering a building when the sun it at a highe azimuth, to provide shading from overhead sun. The bottom two more of sensor may be transparent 251 or translucent to allow visibility in and/or out of a building.

Figure 23E:
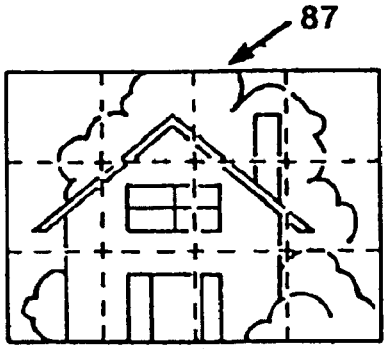
FIG. 23E is all segments in the transparent condition to see a view through the see through surface to the other side of the window.

FIG. 23E shows a view of an outside scene 87, in this example a house, where visibility is possible through all sectors. The dotted lines are shown in the figure to locate the joints in the sectors, which would not be otherwise visible.

Figure 23F:
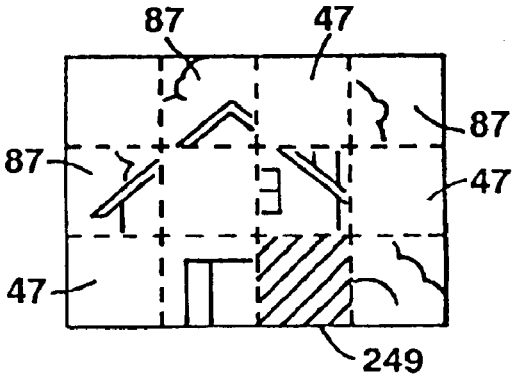
FIG. 23F is four segments in an alternative opaque condition to restrict visibility through those segments.

FIG. 23F shows a variety of options of control such that certain sectors show an outside view 87, certain sectors show a reflective response 47, whilst one sector shows an opaque sector 249. It is unlikely that these combinations would be used in the example of FIG. 23E. Combinations of these sector controls could be used to control heat, glare, light, provide privacy, or other uses on a see through surface which may also be used for surveillance purposes or for directional light or energy control in one or more of the embodiments and examples of the present invention.

When it is wished to define the perimeters of ink layers in one or more layers of coatings or one or more panels each panel containing individual coatings or combinations of coatings on each and every panel, it is essential to align the edge of the perimeter of the print such that no distribution of color occurs when the image is illuminated from behind such as in backlit sign boxes.

Figure 24A:
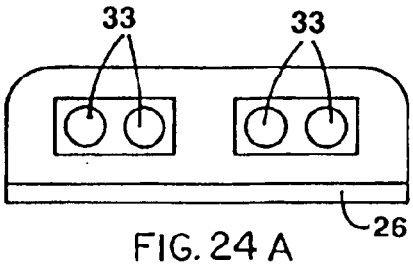
FIG. 24A is a cross sectional view of a typical building overhead lighting fixture.

FIG. 24A shows a cross sectional view of a typical lighting fixture containing four light sources 33, for example, fluorescent tubes, such as might be found in an office, commercial, or home environment, which transmit light through the transparent material 26.

Figure 24B:
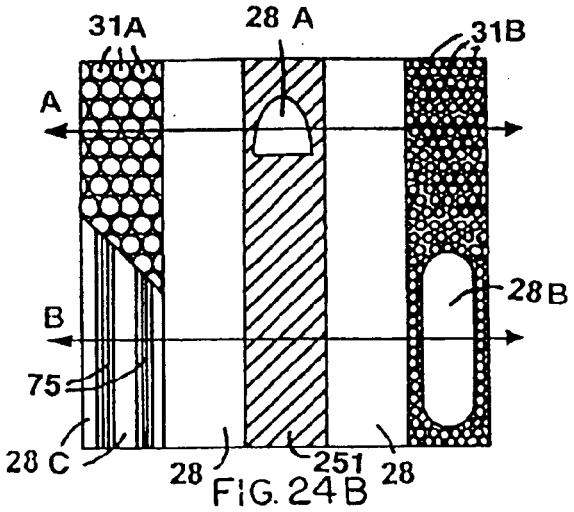
FIG. 24B is a plan view of the cover over the lighting source providing examples of different methods of lighting control.

FIG. 24B is a plan view of the lower surface of a cover over such a light fixture and demonstrates examples of some possible patterns to provide control of lighting direction. The holes 31A may be large as shown on the left, or of a different size 31B as shown on the right, such as to permit partial light transmission, from the fluorescent tubes, through those holes. The large light passage 28 can allow complete light transmittance from the light source. The different shaped light passages 28A and 28B permit controlled light in a particular shape. The strip light passages 28 permit strips of light to transmit the material 26. A black coating 75 stops transmission of light through certain sections between light passages 28C. A partially light transmissive section 251 allows a controlled passageway or quantity of light to transmit that area. Using the present invention, it is now possible to produce a mono or multi colored image on the printing surface of material 26 and yet to have in perfect alignment a reflective surface on the opposite side, facing the illumination source. An upper reflective surface can be used to reflect light from opaque or partially opaque sections of the material, which is illustrated in this plane view, so as to maximize the reflected light in the lighting compartment above.

The term "light transmissive", "light transmission", "transmissive", or similar, as used herein, includes, but is not limited to, the capacity for visible light or invisible light spectrum radiation, for example, infrared light, to be at least partially transmissive from one side of a material to the other or from the exterior to the interior of a structure and the reverse. A coating or layer of coatings may have variations of light transmissiveness from one position to another portion, or portions, of the material to produce a different light transmissive pattern on the second side. Light transmissive may also refer to invisible spectrum radiation, such as ultrasonic radio frequency, electromagnetic and other forms of invisible radiation which may be transmitted from one side of a coating or coatings to another, or reflect off of a portion of at least one coating, or reflect or refract within or through one or more coatings.

Figure 24C:
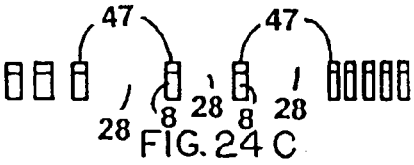
FIG. 24C is a section A—A of FIG. 24B.
Figure 24D:
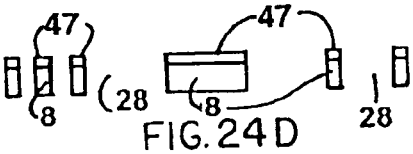
FIG. 24D is a cross section B—B of FIG. 24B.

FIG. 24C shows the cross section A—A from FIG. 24B and shows the reflective coating 47 perfectly aligned with a mono or multi colored coating 8 such as to present, for example, color coordination with the room below. FIG. 24C and 24D show cross sections through the coatings, not including the material, typically transparent or translucent, to which the coatings 8, 47 have been applied, to leave light passages 28.

FIG. 24D shows the cross section B—B of FIG. 24B showing the cross section of the coatings with the same reflective coating 47 on the upper surface and light passages 28 and indicia 8.

Figure 24E:
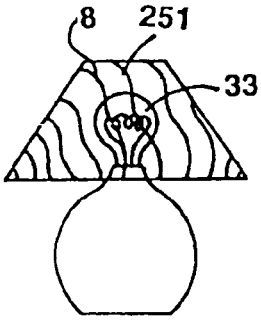
FIG. 24E is a typical lampshade for light control.

FIG. 24E shows a typical lamp shade with a light source 33 and a partially translucent or transmissive surface 251 with an indicia 8 concealed behind the panel whereby the lamp shade may be coated with a variety of coating choices including photochromic coatings such that the lampshade becomes opaque upon activation of the light source. Alternatively, the lamp shade may present a decorative pattern which only becomes visible when the lamp is turned on by combining a translucent coating and light passages which are not apparent when the lamp is not turned on, and indicia between the light passages and the light source such that the light makes visible this image when the lamp is turned on. Numerous other combinations are possible, and this technique of lamp illumination is known in the prior art, but it had not been hitherto possible to register the printing accurately to create a defined edge to the printing, and therefore to present a multi colored image in registration, while controlling light transmittance and direction, without possible paint faults being apparent.

Figure 24F:
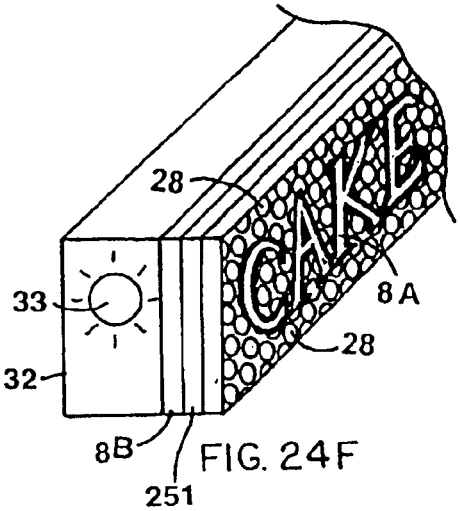
FIG. 24F is a light box for illuminated display of two images separately presentable under controlled light conditions.

FIG. 24F shows a typical light box containing a lighting source 33 contained within a light box 32. Such light boxes are commonly used for backlit advertising in transit and shopping locations and may be used for directional signage, advertising, and other uses. The term "advertising", "advertisement", "ads", "media", or similar, as used herein, includes, but is not limited to, any form of visual image, indicia, decorative pattern, or communication such as a promotional message whether in one or more colors, whether incorporating various features such as holograms, reflective portions, translucent or transparent portions or any other combination of any features of this present invention. Such advertising is intended to create awareness or promote the sale for products or services or combinations thereof in any possible location and whether visible by day or by night or both or by artificial light, by indoor or outdoor location, whether incorporating a moving portion or a static portion of a combined of both and incorporates commonly understood uses of the words "promotion", "advertising", "billboard", "poster", "sales", "promotion", "announcement" and other commonly used phrases to convey messages to potential users or buyers of products and/or services. By using the present invention as the printing means, together with light box constructions known in the art, it is possible to crate a dual image which is visible according to the light differential between the front of the light box and the inside of the light box 32. The indicia 8A "CAKE" can be printed on the front material which contains light passages 28. If the light passages comprised about 50% of the surface area of the front material, then when no light is available on the front of the light box, such as in darkness, and the light 33 of the light box was illuminated, then a second indicia 8B "OPEN" which was printed on a material, and usually separated from the front indicia 8A via a partially transparent or translucent material panel 251, it is possible that the word "OPEN", as an example of indicia 8B, would be apparent through the light passages 28 of the front panel, and the word "CAKE" as an example of indicia 8A on the front would not be visible when a brightly illuminated front of the sign box was in darkness. By controlling light, such as with a timer to turn the light on and off such that the front is illuminated when the light box is off, and the reverse, it is possible to have an alternating image. It is also possible to convert one message to another via this method. For example, a message for emergency activation, such as an earthquake alarm or exit signage can become visible when the light box is turned on, particularly at night. Thus one sign can have two purposes.

Figure 24G:
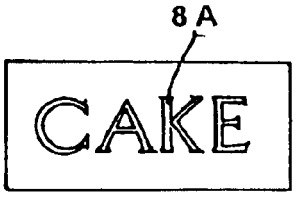
FIGS. 24G and H illustrate two different messages both separately visible under different light conditions.
Figure 24H:
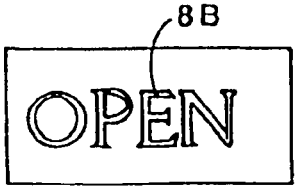

FIG. 24G shows a front view of an example indicia 8A "CAKE".

FIG. 24II shows the example indicia 8B "OPEN" which would be printed together with any one or more colors as required, as a graphic image on the material closest to the light source and may be a typical transparency, well known in the art. It is possible, by processing a structure as shown in the present invention, to produce a transparent indicia on the upper surface such that indicia 8A shown in FIG. 24G will transmit light from the light box when illuminated, as well as reflect light from the front surface. Such products are commonly known as transparencies.

When using a common base to produce the front panel, it is then possible to produce opaque coatings 8B on the inner surface but only behind the light passages 28 as shown in FIG. 24F, and as shown by way of example in FIGS. 49A–E, such as to produce dual imagery from a common base and to let light transmit through between the indicia 8B when the light source is illuminated. Alternatively, the inclusion of part or all of the teachings as shown in FIG. 16 may be incorporated, such that electroluminescent or other coatings may be controlled via electrical current flowing through a coating, such as a conductive coating 70 shown in FIG. 16, to provide other unique effects in conjunction with the teachings of this embodiment, together with any other example or embodiments of the present invention.

Figure 25A:
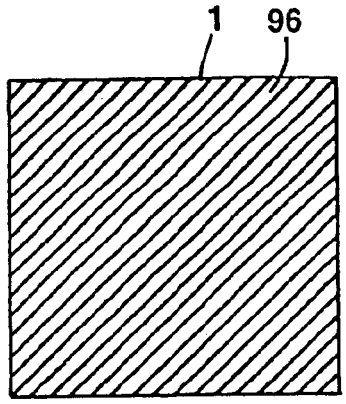
FIG. 25A is a plan view of thick coatings applied to a base.

FIGS. 25A–D teaches one method as an example of constructing a base with an elevated print or coating area. There are numerous methods for creating bases, such as to have two or more levels and these including molding a base in a prepared mold, milling or otherwise mechanically removing portions of a material including metal, etching or embossing of plastics under heat and/or pressure or other means, stamping, die cutting portions which are then placed against a non-die cut base, and many other well known methods of the art to create materials with more than one surface or level. In addition to the above mentioned methods, FIG. 25A shows the use of a thick coating 96 on a base 1 and as an example, may be a reactive coating which causes the cross linking of polymers, as an example of materials well known in the art, such that exposure to actinic radiation causes cross linking of the polymer in the shape of an artwork, stencil or other negative or positive, which was placed between the light source radiation 33 and the coating 96 in FIG. 25B.

Figure 25B:
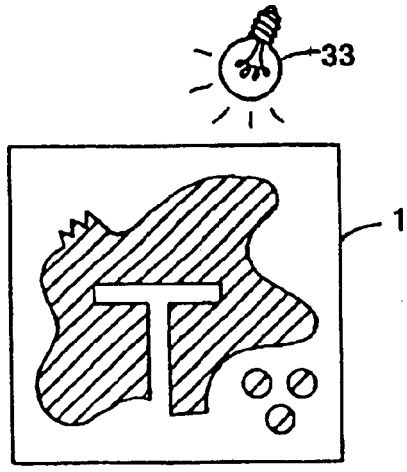
FIG. 25B is exposure of coatings sensitive to an outside source, such as light.
Figure 25C:
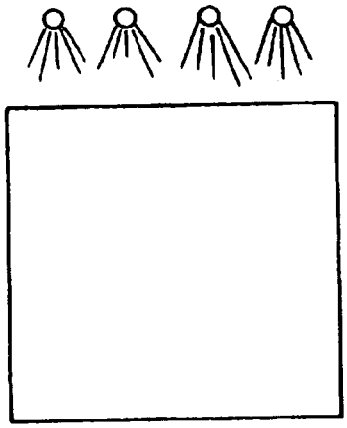
FIG. 25C is exposure of the material to a removing device.

FIG. 25C shows an example of a removal process, such as a washing process such as to remove the coating exteriorly of the shape given as an example in FIG. 25B, and set by radiation.

Figure 25D:
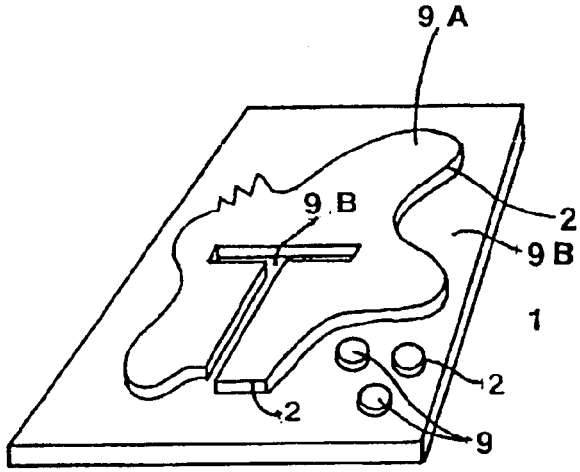
FIG. 25D is the end result of a two level base ready for application of coatings.

FIG. 25D shows the base 1 such that there are numerous edges 2 to various parts of the substrate and, in this example, the material has two levels namely the base 1 with a potential coating surface 9B and an upper coating surface 9A whereby the interior of the example letter "T" has its base at the level of the base 1 and has a common coating level 9B to the coating level 9B on the base 1. Cylinders are shown as an additional example, and they have an upper coating surface 9 for reception of one or more coatings. It is possible to create more than two levels on a common base structure during one process by selecting different materials which either crosslink or degrade according to their chemical composition, whereby a portion of the artwork may have one reaction because it was coated with a particular material, whilst another portion may have a quite different reaction because that section of the base was coated with or made from a different substance. Their rates of expansion, shrinkage, or hardening all determine where individual layers may be produced, and in what shape.

When transparent ceramic cookware is used, perimeter printing may provide for visibility into the cooking pot to inspect the progress of the food being cooked while allowing for a decorative pattern on the outside. Additionally, the use of inks which change color at certain temperatures, may be incorporated into the coatings such that a pot can have a coating which changes color when, for example, the temperature is approaching boiling point. Such a coating would allow the chef to be aware that the cooking substance, for example milk, is approaching boiling point and also provide visibility into the otherwise transparent cooking pot, saucepan, and the like, to see the commencement of bubbles rising through the food. Laboratory and other commercial and industrial uses also apply.

Figure 26:
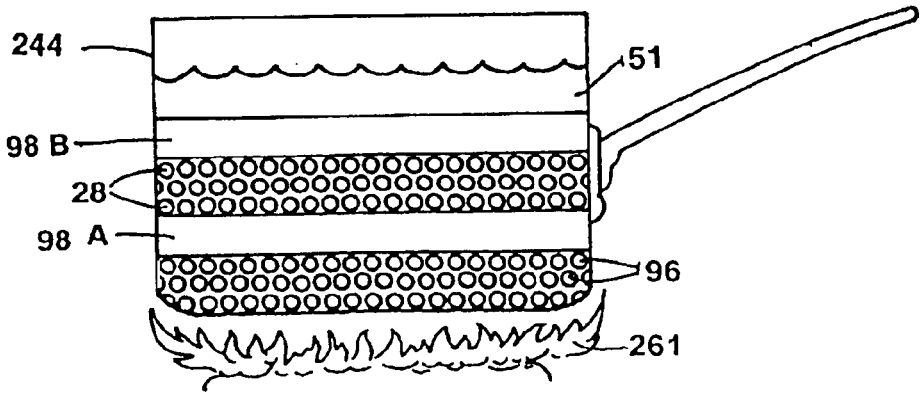
FIG. 26 is a typical cooking utensil, in this case saucepan, coated with a combination of one way vision indicia, and bands of thermochromic coatings. Combinations of coatings may be applied and or fused to the glass cookware.

FIG. 26 shows an example of a cookware item such as a saucepan of glass construction which would permit visibility into the saucepan or other cooking utensil, including oven baking dishes, casserole pans, and any other form of food preparation structure such as doors of ovens, grills and the like. In this example, it is shown on a cooking stove with a heat source 261. Examples of possible construction show a liquid 51 inside the saucepan, and the structure of the saucepan is glass 244. Two layers of a particular coating, for example thermochromic coatings 98A and 98B are applied in bands around the cooking utensil, such that these coatings would change color at predetermined temperature levels, for which the construction of such inks are well known in the art. By being able to print multi color inks with a common perimeter, it is possible to provide precise bands of color or decorative patterns as an optional construction. As an example of a useful purpose, whilst retaining ink registration, it would be possible in thermochromic inks to provide indicia such as the word "HOT" which could be in a red color, which would become apparent as the surface temperature of the cooking utensil reached a predetermined point which was chosen via the construction of the thermochromic coating. This would mean the cooking utensil would provide a visual warning when hot, and that the visual warning would disappear as the temperature dropped below the preselected thermochromic ink color change threshold. In the lower area of the saucepan, dots may be a reactive coating 96 such as to change color with heat or an energy source, and may have light passages 28 between the dots 96 to facilitate visibility into the cooking utensil. In an upper portion, a reverse embodiment can be used whereby light passages 28 are printed into a material, and one or more colored indicia may be placed between the light passages 28. Thus, a manufacturer can produce attractive decorative patterns, while still retaining visibility into the cooking utensil. Although glass was given in this example, the material may be a metal and whilst not being transparent, could still be produced with a carefully registered printing of indicia and coatings which have various responses to, for example, heat and light, such as to change color when the temperature of the food increases with a predetermined response at certain temperatures.

Stretchable materials are those which can be expanded either temporarily or permanently in their dimension, such as balloons, inflatable, balls, toys, umbrellas, 3-D banners and other dimensional structures. Where the perimeter of the printing is not clearly aligned, any variations or misregistrations in the printing will become enlarged due to the expansion of the material and relatively minor faults become larger and therefore very visible.

Figure 27A:
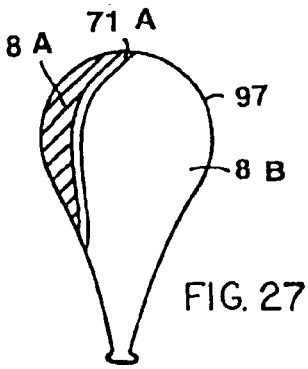
FIG. 27A is an uninflated balloon with a mis-registered printing fault.

FIG. 27A shows an expandable material such as an uninflated balloon 97 with indicia 8A and 8B where a registration fault 71A exists along the perimeter between indicia 8A and indicia 8B. The term "expand", "expanded", "expandable", or similar, as used herein, includes, but is not limited to, structures which are either permanent or changeable in shape, by expansion, and includes structures which are formed or formable, as defined herein, but also include structures which are stretchable or elastomeric such that they can expand their surface area and have changeable surface shapes and areas as required. The term "one way vision", "two way vision", or similar, as used herein, includes, but is not limited to, means to see through a surface or material from at least than one side. Visibility may vary from one side to the other or in a multi-sided structure may vary from any one side more or less than any other one or more sides. It may also incorporate visible indicia on any or all sides or portion of any or all sides and may incorporate indicia all over one side and have a black coating on the other side or all other sides, usually with at least one light passage or pattern of light passages.

An example would include a balloon, inflatable structure, shapes which change shape for different reasons including inflation by air or gas, expansion caused by heat or contraction caused by cold, or any other method where the surface area and/or texture is stretched or changes shapes or can have its shape changed for some reason. A vacuum may also be applied to one side of such a service to cause it to deform and./or mold or for some other reason, whether the result remains permanent or it utterly temporarily maintained. It is also possible to have an expandable surface produce a repetitive or changeable pattern of expansion. An example would be an elastomeric shape of a heat which may be beating where one beat is an expansion of the structure and a second beat is a reduction in the size or change of shape of the structure.

Figure 27B:
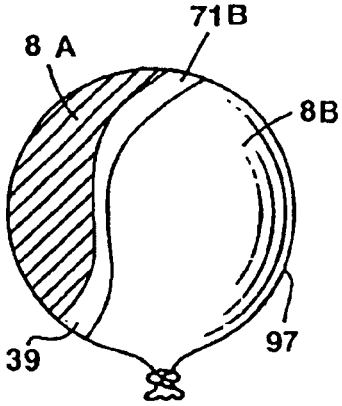
FIG. 27B is the same balloon inflated where the small fault expanded and became more visible.

FIG. 27B shows the same balloon in FIG. 27A now inflated such that the registration fault has now grown to become a substantially larger fault 71B along the perimeter between the indicia coatings 8A and 8B of the balloon 97. This is undesirable and the present invention solves this problem such that a correctly registered result is producible as shown in the next figure. The registration fault 71B may also be considered to be a stretched coating 39 When the balloon of FIG. 27B is expanded with inflation or deflation, the registration fault 71B will expand or contract accordingly.

Figure 27C:
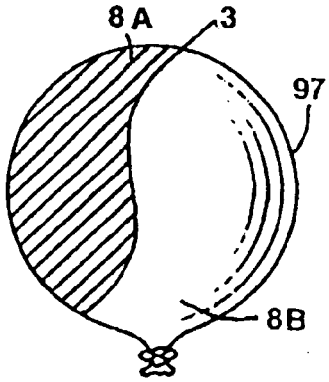
FIG. 27C is the result of perimeter printing to avoid registration problems.

FIG. 27C shows the same balloon 97 provided using the techniques and processes of the present invention such that a clean perimeter line 3, without any misregistration, separates indicia 8A and 8B and produces an acceptable result. When the present invention is used, it does not matter whether the balloon is inflated or deflated, as a misregistered color does not exist and does not become more or less apparent at any inflation level.

In addition to expandable, stretchable, and inflatable structures, it is also possible to use the present invention to solve problems in formable structures, as follows.

Formable shapes are improved when the perimeters of the print area are aligned even when multi-color printing is used, especially over large areas where registration becomes harder to maintain with large format printing techniques. The fact that the perimeter edge of the printing is perfectly aligned means that when the material is expanded in the act of forming, the edge of the image also remains constant in the stretching process during forming. Previously, one or more colors may have been misregistered on the edge of the point area and this small misregistration would then expand as the material stretched in the forming step. For example, if the color yellow of a 4 color process artwork or line work was to produce past the edge of the defined print area, due to misregistration, then this visible color would stretch and the fault would become more apparent whereby a wider line of yellow would become visible after expansion caused by forming, inflation, stretching and the like.

One way vision masks, such as worn at Halloween, can be produced using this process to provide black facing the viewer while on the exterior of the mask the onlooker sees the one or more colored image presented on the mono or multidirectional or three dimensional mask shape. Such uses would be in Halloween, sports, parties, entertainment, role play and many other uses. Naturally, it is necessary to leave large air passages around the periphery of the mask to provide for air circulation for the person wearing the mask. The visual effect is that the mask character is printed on the outside of the mask, and is not visible from the inside of the mask, nor is the wearer visible to the outside onlooker.

Figure 28A:
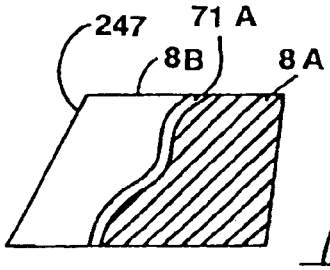
FIG. 28A is a flat sheet of formable material with a small registration fault.

FIG. 28A shows a formable material 247 to which examples of indicia have been applied such that indicia 8A is different from indicia 8B, and a misregistration fault 71A exists at the perimeter of either one or the other coating, or if indicia 8A is a coated substance and indicia 8B is an uncoated or non-imaged material, then a registration fault 71A still exists on indicia 8A.

Figure 28B:
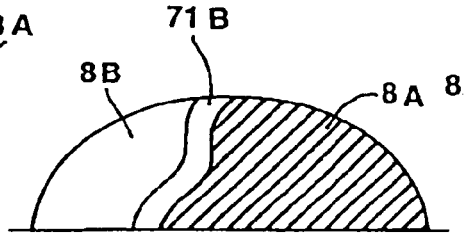
FIG. 28B is the formed material now expanded with an expanded fault.

FIG. 28B shows the results after forming of the material into the shape of a curved structure, as an example, and illustrates the expansion of the misregistration fault to become a larger misregistration fault 71B thereby being more visible and less attractive. Uses of formable materials such as this may include, amongst many other uses, attachment to see through surfaces such as windows. It is possible that section 8B is transparent because the original formable material 247 was transparent, and indicia 8A and registration fault 71A were the only coatings applied, and applied to produce light passages as a chosen pattern.

Figure 28C:
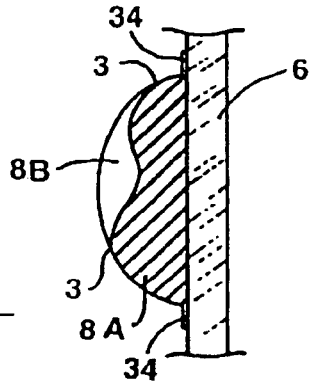
FIG. 28C is a cross section of a formed see through surface with a perfectly registered pattern, with no fault visible.
Figure 29A:
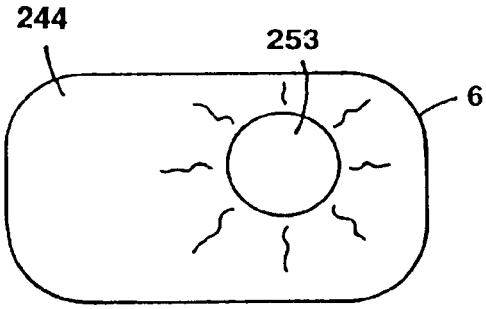
FIG. 29A is a see through surface such as an automobile sunroof from the inside looking out.

FIG. 28C shows the formed structure applied in some manner or attached in some method at contact points 34. Examples could be adhesion, or other means of attachment. The example in FIG. 28C was produced using the present invention, and does not have a misregistration fault, but has a correct perimeter 3 to the indicia coatings 8A or 8B as the case may be. It is naturally possible to use this construction for many uses which include those related to see through surfaces 6, and one way vision:

FIG. 29A is an example of a see through surface 6 such as glass 244 as may be used in a building or vehicle, such as the sun roof of a vehicle, whereby the occupants could look out through the sunroof and in daytime observe a scene outside, such as the sun 253. The term "vehicle", "vehicles", or similar, as used herein includes, but is not limited to, automobiles such as cars; transportation vehicles such as buses, trams and trains, airliners, helicopters, motorcycles, boats and ships, space travel vehicles; underwater vehicles such as submarines; recreational vehicles such as motor homes, caravans and trailers; emergency vehicles such as police, fire, and ambulance; military vehicles such as trucks and jeeps; security vehicles such as armored cars; goods transportation vehicles such as vans, delivery vehicles, light and heavy trucks and the like. Currently, sun roofs and other surfaces of vehicles often have a of coating on them, and typically a sunroof may have a ceramic frit type ink of one color, which has been screen printed on the glass prior to tempering or other safety treatment. The reason one color is used is that it is desirable to filter out some of the heat from the sun, and a grid or grating or silhouette pattern, either of dots or holes in the printing, is used to reduce transmitted heat while still providing visibility out through the sunroof. Typically these coatings are black, to improve visibility through the print pattern to the outside. Because it has not been previously possible to provide reliable print registration of such patterns, only one color has been typically used. Although it is possible to obtain some overlay registration of more than one color, particularly in small areas, it is not been reliably produced. The cost of the glass and wastage caused by misregistered printing have made the use of one color the most common technique. Using the teachings of the present invention, indicia such as that shown in FIG. 29B become possible.

Figure 29B:
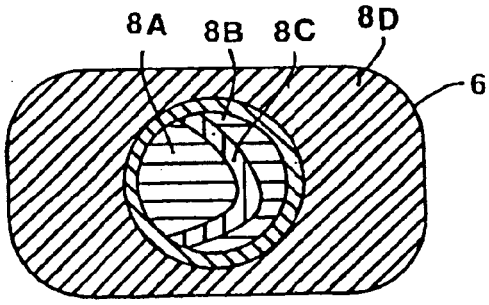
FIG. 29B is a multi color image on the opposite side of a see through surface with, for example, a automobile manufacturer logo.

FIG. 29B shows an example of four different indicia applied to the example sunroof of FIG. 29A such that indicia 8A, 8B, 8C, 8D may be of different coatings, colors, indicia, logos, background colors; multi colored artwork, logo of the automobiles manufacturer, or any other image or identity for any purpose, including color coordination to the color of the car or to graphic treatments of the vehicle, in this example. The term "identity", or similar, as used herein, includes, but is not limited to, logos, mono or multi colored signage effects to convey recognizable shapes which are the recognized name or symbol of a company, hotel, retail, restaurant, family name at a residence and the like and in commercial use may include a corporate logo or color treatment of any size, and in residual use may include a message, or to identify the resident. In a commercial environment, identity could indicate the name and other information of the business occupying the building or the business or others who own or use vehicles, buildings, documents, or other readable structures, upon which the identity is located. From the outside of the vehicle, a viewer would see a multi colored artwork, as exampled in FIG. 29B, on top of the see through surface 6. Occupants inside would see through the light passages printed in the material, and have the view shown in FIG. 29A. In addition to sunroofs, it is possible that part of the front, rear or side windows of vehicles may be treated with the present invention to produce a variety of indicia in one or more portions of a see through surface such as a window, and yet to retain visibility through that window from the other side.

By creating a pattern on the back windows or other windows of motor vehicles and incorporating a coating of metalized material, such as by vapor deposition, it would be possible to have a substantial area of a window evenly heated from a layer embedded in the coatings. From the inside of the vehicle, you would see between the black coatings through the light passage and from the outside there could be one or more colors including a decorative image. Between the coating layers and in the layer in close proximity to the window would be a metal conductive surface or a series of partial surfaces on one or more electrical circuits, connected to an electrical source to generate heat, which is conducted to the glass for the heating of the glass to remove ice, snow, condensation, water vapor and the like. The same structure could be used on see-through surfaces of buildings, such as glass atriums in offices, restaurants, homes and the like.

Automotive vehicles, including rear windows, side windows, sunroofs, striping or sections across windshields, and for camouflage for glass on military vehicles, can incorporate inks that can change color with heat or electrical current. On any application such as offices, homes and any other surface, either see through or not see through, an image or wall mural can be printed in sections to change color with perfect alignment of the colors underneath the top layer.

Figure 30A:
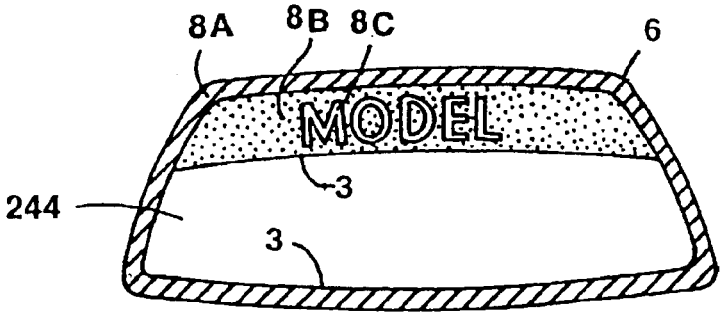
FIG. 30A is an exterior view of a see through surface, such as an automobile window comprising glare control on the top surface, multi-color or one color indicia, and perimeter treatment.

FIG. 30A shows indicia 8A which is a perimeter treatment of one or more colors, a gradiated indicia 8B whereby the degree of sun protection across the top of, for example, a windscreen or windshield of a vehicle, or other see through surface 6 uses, such as buildings, would permit reduction of the glare from the sun while still permitting visibility and from the inside. The tern "gradiated", "graduated", "screened" or similar, as used herein, includes, but is not limited to, any variation or variations in the density or area of coverage of coatings, light passages, structures, or effects from one part of a base or material or surface when compared to one or more other parts of the material or adjoining material. Examples would include windows or other see through surfaces whereby it is desired to have a greater coating coverage in a bright sun area and a reduced coverage of coating in areas requiring greater light transmission, heat transmission or visibility. Indicia 8C can be the identity of the automobile manufacturer, or any other visual indicia including color treatments, logos, or any other visible form of coating. The remainder of the window glass 244 may be uncoated, and therefore the perimeter 3 of and between indicia 8A, 8B, and 8C are in alignment with no misregistration faults, even when indicia is multi color within the areas of indicia 8A, 8B, and 8C.

Figure 30B:
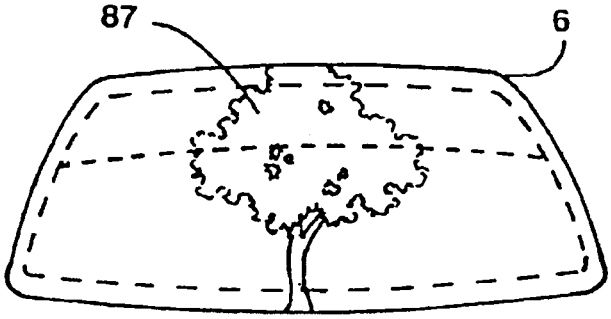
FIG. 30B is the visibility through the same surface of FIG. 30A without obstruction despite different colors and densities of coating.

FIG. 30B shows the view through the see through surface 6 of FIG. 30A such that an observer inside the vehicle may see view 87 of the outside world, in this example a tree. The dotted lines in FIG. 30B are there to indicate a location of the indicia shown in FIG. 30A although a viewer on the inside would see through that indicia, using light passages, the constructions of which are taught herein and the uses for which are well known in the art. To provide a multi colored image on glass, such as vehicle windows, it is possible to print multiple layers of ceramic ink in any order, such as for one way vision or other uses, or as substantially opaque coatings whereby each of the coatings are applied in turn. This means that from the inside of the vehicle, you would see the coating intended to face in that direction, whilst from the outside of the vehicle you would see an entirely different coating, and the perimeter of these multiple coatings would be in the perfect alignment if the transfer paper technique, as taught herein, were used and where the shape of the edge of the coating was cut after the coatings were applied so as to create a precise edge. Alternatively, if the edge of the transfer material has a release coast as shown in FIG. 38C, then the coatings could be applied on the coating surface, and subsequently release to be applied to the glass using any technique. Usually, ceramic frit type inks are used in this application to provide durability on tempered glass—however, other coatings are usable. The same technique could be used to print a band of at least partially opaque coatings on see through surfaces to restrict angles of sunlight.

Figure 31A:
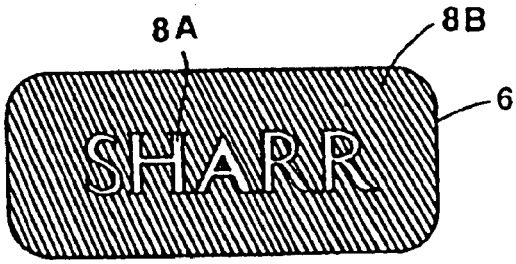
FIGS. 31A and 31B illustrate two sides of an inspection use for see through surfaces, such as a microwave oven or cooking oven door, so that the manufacturers logo is visible in FIG. 31A and 31B demonstrates small light passages to permit inspection of the contents of the oven.

FIG. 31 A shows a view of one side of a see through surface 6 such as might be used for an oven door, microwave door, and the like, where the manufacturers logo 8A "SHARR" may be visible against a background indicia 8B whilst still permitting visibility through the layers through one or more light passages into the interior of the oven. FIG. 31A symbolizes a view from a distance in front of the oven, such as to not make the light passages apparent until the viewer comes close enough to identify the shape and location of the light passages. When the oven is illuminated, such as when operating, the food inside will become visible through the light passages.

Figure 31B:
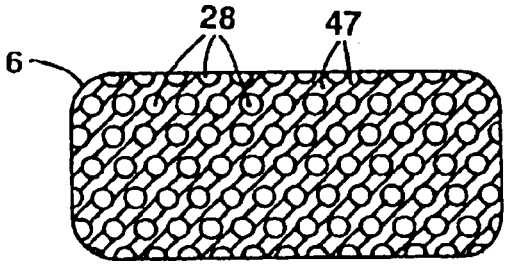

FIG. 31B shows the opposite side of the surface of FIG. 31A whereby the see through surface 6 has been coated with a coating 47 such as to leave more than one light passage 28 to facilitate visibility from the other side. A reflective coating may be used to be reflective to radiation, such as microwave, or may be heat reflective such as to retain radiant energy back into the oven, while still permitting visibility through the light passages 28.

Figure 32A:
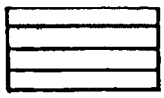
FIG. 32A is a see through surface made up of four segments.

FIG. 32A symbolizes sector control whereby a surface may be made up of more than one section, in this example four sections, and be controllable in numerous ways for numerous uses. Included in the control methods can be electronic or electrical current flow, temperature, and other factors which may make one or more sections change color, become substantially opaque or substantially transparent, change colors with temperature, either ambient or radiated, and become fully opaque at one extreme or fully transparent at another, and numerous other possibilities. A particular use would be coatings which can be used to conceal indicia, such that the indicia becomes visible when the coating becomes substantially or at least partially transparent, could be used in conjunction with windows and other see through surfaces, and can be used to temporarily or permanently conceal other coating layers. FIG. 32A shows a structure comprising four sectors.

Figure 32B:
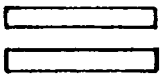
FIG. 32B is two of the four segments in one state, for example, either opaque or transparent.

FIG. 32B shows two of those sectors, in this case the highest sector and another sector.

Figure 32C:
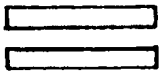
FIG. 32C is the other two segments in a particular state.

FIG. 32C shows the second sector from the top and the lowest sector activated.

Figure 32D:
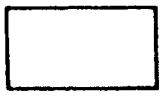
FIG. 32D is all four segments in a transparent state.

FIG. 32D shows all sectors transparent. For example, it may be useful that under certain radiation, sectors may respond or change their characteristics according to the external energy or force for a variety of reasons, or may be programmed to automatically change in some regular or random order to produce visual eyecatching effects where outside control is used to cause these changes.

Figure 33:
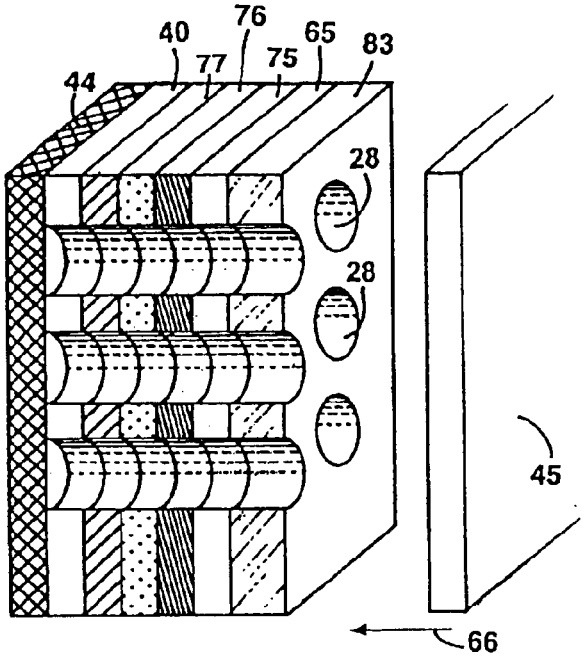
FIG. 33 is a multi-layer structure with a solid liner on the back of the base and a protective over-laminate or transfer medium being added to the right hand surface of the multi-layered coatings.

FIG. 33 shows an example of a multi layer or multi coating structure which could have been manufactured in numerous ways, such as where the coatings were applied on a base, were then transpositioned to the solid liner 44 for handling and relocation. FIG. 33 also shows a transparent laminate 45 being moved into contact with the surface of the multi layer coatings in the direction of movement 66. The coating construction comprises at least one light passage 28.

An example of coating orientation, for a specific purpose, is where coating 40 may be an adhesive coating which will separate from the releasable solid liner 44 for subsequent transposition to another surface, such as a see through surface. Mono or multi colored indicia 77 has been applied on top of the adhesive liner followed by a white coating 76 and a monochromic or black coating 75. It is equally possible that the black coating may be placed against the base, and the coatings build up in reverse order with the adhesive 40 and solid liner 44 being a combined structure which has been prepared from the same base. Other coatings such as a coating 65 may be applied for any purpose and, for example, may be an opaque white coating, a transparent coating, or a reactive coating, and other coatings may be further applied such as a reflective coating 83, a vapor deposited coating of any thickness including partially transmissive and partially opaque coatings. It is possible to have numerous combinations of coatings placed in any order on any one or more levels of a structure of a base, such that the possible combinations are too numerous to teach individually in this present application.

With expandable structures, it is possible to have structures which may be changed in their dimensions via commonly known methods such as inflation, or other methods of causing expansion and when making such structures, it is possible to incorporate features of precision printing such as to permit more than one light passage in at least part of the structure to permit indicia visible from one side whilst it is possible to see through the light passages created via printing, coating, or transposition on the other.

Figure 34:
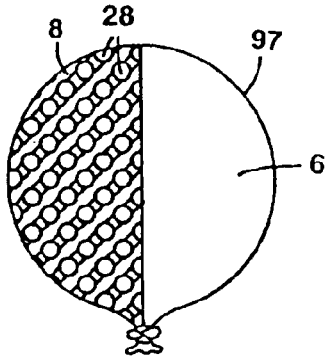
FIG. 34 is an inflated balloon where one side of the balloon was printed prior to inflation so that one half of the balloon has one way vision light passages facing one direction while the other half of the balloon is fully transparent. This allows one way vision from one direction and the viewing of a multi-color image from the other direction.

FIG. 34 shows an example of an inflatable structure such as a balloon 97 comprising a see through a substantially transparent surface 6 on the right hand side, whilst on the left hand side there is a printed indicia 8 together with at least one light passage 28 as to permit visibility through the interior of the balloon 97 when viewing from the right hand side through the transparent or see through surface 6 to see an object on the left hand side of the balloon. When viewing the balloon from the left hand side, visibility is not readily apparent, and the viewer would see the indicia 8 which occupies the coating or print area. The indicia could be the promotion of a product, identity, greetings, messages, or any other visible graphics or images which may be utilized on such a surface. Whilst printing of inflatable structures such as balloons is well known in the art, it has not been hitherto possible to provide such accurate registration of expandable surfaces so as to provide for numerous small light passages 28 whilst retaining indicia 8 between the light passages such as to make a one way vision result. It is equally possible to have indicia which is visible on the inside of the balloon printed on the reverse of the indicia area 8, such that when looking from the right hand side through the substantially transparent portion 6 the indicia appears to be inside the balloon in some part or whole of the coating area. Although construction or combinations are apparent to provide an effect whereby as the balloon rotates different messages become visible from different sides and the viewers can see through parts of the balloon but not other parts. Although a balloon is shown in this example, any expandable, inflatable, flexible, or rigid material may be used to create these effects.

In addition to stretchable or expandable structures, it is possible to produce formable structures which, after forming, remain substantially rigid or semi rigid in their construction, and are not easily expandable or contractible, as in the balloon example.

Typically the product is a transparent material to which color images are transposed, or applied directly to embossed material either to the surface that faces outward from a store, home, office or vehicle window, or other application; or the surface that faces inwards. The material is normally printed in the flat sheet prior to vacuum forming. The technique of distortion or deformation printing is used to provide an image which, after forming, is correct and pleasing to the eye.

The coating edge pattern is designed such that after vacuum forming, any expansion of the material in the molding process will provide an approximate 50% open area as light passages. In addition to preprinting the material, there are other methods of digitally imaging the material including ink jet printing, prior to forming.

Alternately, after forming, an unprinted material could have an image transposed or applied. The product after vac forming can then be attached or placed in close proximity to a see through surface of a vehicle or building, using a variety of attachment means, including transfer tape, double sided adhesives, spray adhesive, suction cups, suspension, tape or other mounting methods. When the product is installed, the viewer on one side of the product can see through the thousands of light passages to the other side. When the viewer on the opposite side looks at the product, they see the surface with the image and see the appropriate advertisement or other indicia.

Figure 35A:
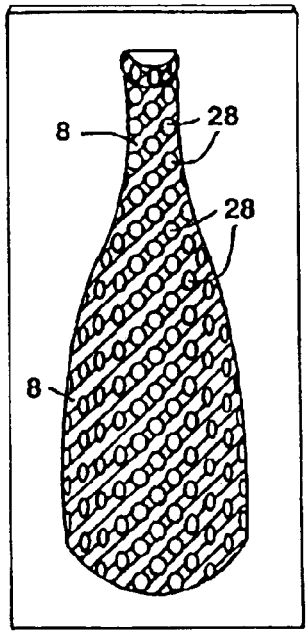
FIG. 35A is an imaged and molded shape of a one way vision formed bottled for use on see through surfaces or suspended or supported in mid air.

FIG. 35A shows an example of a structure such as a bottle, which is comprised of numerous light passages 28 and between the light passages provides for indicia 8. The structure is formed in at least two or three dimensions, and the indicia could be a brand name or packaging identity for, in this example, a beverage or other product. Naturally any shape for any purpose may be created, and yet still retain light passages such as to permit easy visibility from one side of the structure to the other side. After forming, the structure may be applied to any number of surfaces such as a see through surface or window, and also may be installed in a variety of locations for specific purposes including suspended or supported on some sort of frame or system to permit visibility from one side whilst reading the indicia from the other.

The one way image material can be either printed in a variety of patterns onto the formable object before, or after forming and may also incorporate the attachment of perforated material or materials constructed under a variety of prior art methods.

Figure 35B:
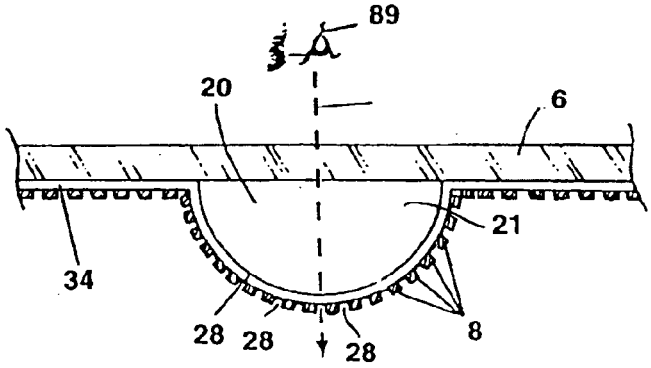
FIG. 35B is a cross sectional view of a formed see through object attached to a see through surface with the coatings on the outside of the formed object.

FIG. 35B is a cross sectional view of the shape as exampled in FIG. 35A now installed on a see through surface 6 such as a window. An observer 89 is able to see through the window, through the cavity 20 between the window and the formed structure, and through the light passage 28 so as to be able to observe the view on the side of the window opposite so that of the location of the observer. The formed structure may be attached to these through surface at a contact point 34 and attached via adhesive, tape, electrostatic attraction, suction cups, and many other means, creating an air chamber 21. The indicia 8 would be coatings formed either on the final structure which had been prepared by a process of the present invention, or which had been transposed to the formable material after coating. As the material was formed, as shown in the examples FIGS. 28A, B, C, there would be not misregistration faults in the coating surfaces due to the present invention. It is hitherto been impossible to print coatings containing numerous edges such as to create light passages in registration repetitively, particularly in larger sizes. The present invention makes possible such structures. The image 8 may also be printed or transposed as dots and light passages 28 would be the space between the dots.

The second problem with perforated structures is that due to the mechanical requirements of perforating it is commercially more practical to create an even identical sized hole pattern over the entire sheet of material. This does not allow for the desired optics on the extremities of producing typically anticipated to be constructed for this use. Dimensional formed window displays have been manufactured from solid materials, without the benefits of one way vision for a considerable time. The problem with the traditional molded dimensional shapes is that due to the coverage of the image over the area of the three dimensional shape visibility from the inside of the window has not been possible.

Figure 35C:
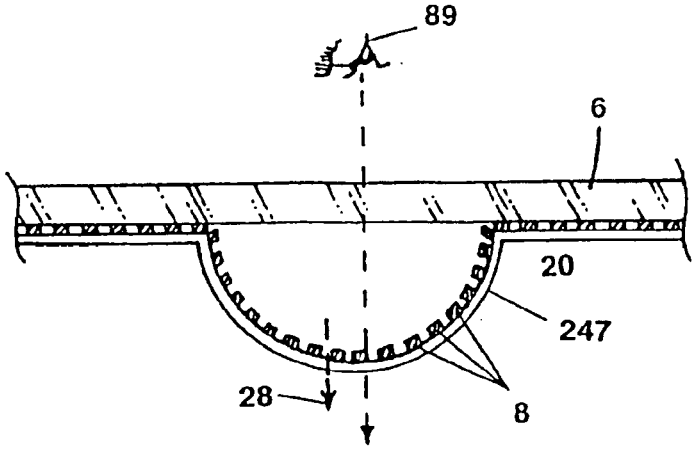
FIG. 35C is the same as FIG. 35B except that the coatings are inside the transparent formed material.

FIG. 35C shows the coatings of FIG. 35B positioned on the opposite side of the formable structure 247 such that the same light passages 28 exist, and the observer 89 can still see through the see through surface 6 and the cavity 20. The coating indicia 8 may be reverse printed so as to retain readability for viewers on the side of the window opposite to the observer 89, and a black coating would be closest to the observer 89 to facilitate improved visibility through the structure. It is known that a secondary image may be placed on the side facing the observer 89 in part or all of the coatings and indicia 8. The formable structure 247 may, after attachment to the see through surface, for an air chamber 21 which may be sealed in its perimeters. To accommodate expansion and contraction of the air or gas 21 due to temperature variation, a small hole may be located in a non obvious part of the formed area, typically at the bottom, to allow condensation to escape and to provide for changes in air pressure. Using the present invention, it is possible to have the indicia on part or all of both sides of the formed structure, or have the indicia on one side of the formed area and on the opposite side of the flat area, which remains in direct contact with the glass over at least part of its structure. The one way vision imaging has been applied to the interior of the formed object, for the purpose of providing vandal or graffiti protection so that the exterior material cannot have the image scratched off or removed, and can be easily cleaned.

Figure 35D:
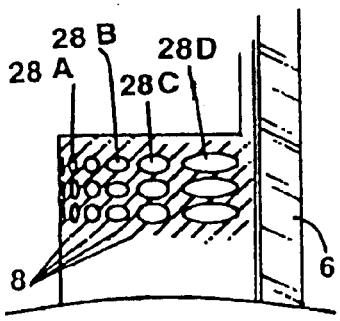
FIG. 35D is a side elevation view of a formed object on a see through surface with different light passage patterns to help maintain equal visibility when viewed from one side.

FIG. 35D is a side view of a formed structure attached to a see through surface 6 such as a window whereby the light passages 28A are circular at the front of the curved material, and deliberately made to be of a different shape according to where the final location on the formed surface will be. The indicia 8 remains in the background between the light passages 28A,B,C,D so as to produce a contiguous image area. Light passage 28B shows a slightly oval shape, 28C a larger oval, and 28D a more elongated oval.

Figure 35E:
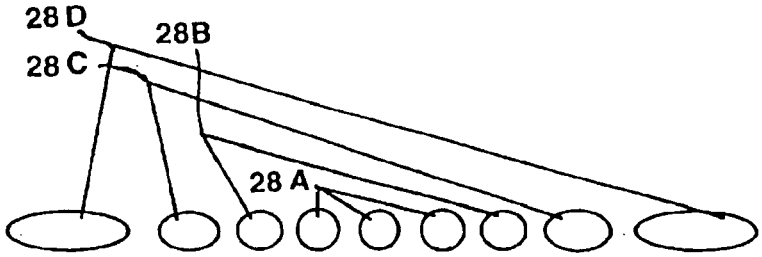
FIG. 35E is a plan view of the various shapes of light passage patterns on the formed material shown in FIG. 35D.

FIG. 35E shows a plan view of the light passages 28 A,B,C,D of the structure used in the example shown in FIG. 35D. The reason for changing the shape of the light passages is because with perspective, it is necessary to have light passages which, when viewed from the right hand side of the see through surface 6 in example 35D, become circular to the eye, and provides an apparent uniformity of light passages from one portion of the semi-circular, in this example, formed structure. It is known in the art that a perforated material may be machine made with repetitive hole patterns, but this machinery is unable to accommodate progressive changes of hole sizes in a repeating production process, whereby the present invention can have a base constructed of this pattern which may even be reusable to transpose coatings to other surfaces for this purpose and many other purposes. Another example is to combine translucent printing of a flat surface and form that surface into a formed structure and, with the additional of illumination, to demonstrate the advantages of having the edge of the print area and the adjoining translucent or transparent areas in exact alignment and registration.

Some examples of forming are: flat glass which is formed in either simple or compound curve typically using heat and/or pressure; thin and thick plastics, examples of which include constructions such as polyethylene, polypropylene, polyvinyl chloride, polystyrene, polyester, and the like. Other materials could be elastomeric construction or combinations of constructions, or materials which, upon softening can be deformed and which when hardened retain the new shape. Vacuum heat and/or heat and/or pressure are commonly used to obtain forming of previously flat or non-formed materials.

Three or more dimensional plastic, glass or other materials added to or part of windows would provide a three dimensional image on one or both sides of the glass while retaining correctly aligned print edges.

Another example would be a globe of the world which was translucent or partially transparent such that it could be illuminated from within to show the relevant positions of the earth oriented to the sun at any particular day, to provide a light and dark selections of the globe to replicate the position of the sun and which parts of the earth were in sunlight and which part of the earth were in darkness at any particular moment.

Figure 36A:
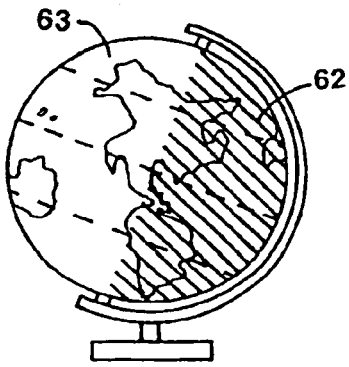
FIG. 36A is a globe of the world which was formed from a flat printed surface, usually in two halves, and internally illuminated such that portions of the printing were made on edged bases and are partially transparent or translucent, to show the day and night positioning of the sun on the earths surface.

FIG. 36A is a symbolic example of a globe of the world whereby a shaded area 62 may be affected due to internal rumination such that part of the earth of the globe would be a non shaded area 63 or luminated area 63 where illumination is where from an internal source. In this example, the land mass is printed to be partially opaque, and the ocean is printed to be a translucent blue color. The area of illumination can be controlled within the globe, and the globe would typically be made in two halves, each of which was printed flat, formed under any method, and joined together to form the final product. By choosing translucent materials, the perimeter where the oceans and the land masses join would remain in perfect register during the forming and expansion effects of the forming process so as to remain in alignment, and to not have any misregistered printing visible when the internal illumination was turned on.

Figure 36B:
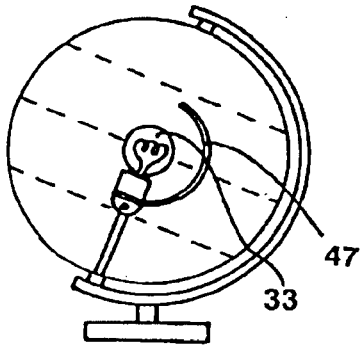
FIG. 36B is a cut away section for a lamp and reflector which are controllable by internal or external mechanism to change position according to the rotation of the earth and alignment of the earths axis to the sun.

FIG. 36B shows the same global in a partial cut away revealing a light source 33 together with a reflective surface 47 which would be manufactured to cast a shadow over part of the globe and not the other part. A control mechanism of electronic or mechanical means can be used to rotate the earth or the internal light source so as to cast a partial shadow, symbolic of the earth on any day of the year and time of day, showing the area of the earth illuminated by the sun at that moment of time. Such a mechanism could also include angular adjustments so as to replicate the axis of the earth relative to the position of the sun through the seasons, and therefore provide a replication of daylight on the surface of any part of the earth at any time. The use of such internal illumination to provide a useful effect is achievable with the teachings of the present invention.

With the use of automobiles in close proximity to homes and offices, it has become necessary in many parts of the world to provide some sort of sound/noise reducing barrier to reduce the noise of traffic. However, in many situations, it has also been desirable to not lose the view from the office, residence, commercial building, and the like. In some situations, brick or concrete block or other similar sound absorbing constructions have been used to reduce the noise. It is known that in certain parts of the world these walls have obstructed scenic views and have therefore reduced both the pleasure for the property and the value of the residential or commercial property due to the loss of the view. The present invention allows treated glass such as toughend or tempered glass, rigid plastics, laminates or combinations thereof, or other materials to be used whereby the sound-proofing benefits are retained and yet viewers on the other side of the autobalm, motorway, autoroute, freeway, highway, and the like, do not lose their view. A secondary benefit is that the coating pattern also reduces the distraction of the drivers from the freeway because they generally find it more difficult to see through from that side of the sound barrier.

To produce a material with a defined edge or edges with one or more colors in exact registration for ceramic frit ink transfer to glass, the steps are:

1. Prepare the base with the desired pattern, for example, the pattern could be a band for use across a car windshield, a pattern comprising a plurality of intended light passages such as round holes in a staggered pattern, parallel stripes or any other shape or shapes. The base may be produced by cutting, perforating, removal of a portion of an original coating, and the like. The preferred embodiment is to have a precoated paper with a release coat.
2. The coatings are then applied to the base.
3. For water transfer, the paper, together with it's coatings, would be soaked in water and then the coatings could either use the waterslide technique to be transferred to the see through surface, in this case, glass, or using the water transfer technique, may be applied against the surface of the glass, and the base, in this case, paper, would be removed by peeling back or sliding it from the surface of the coatings.
4. When the water transfer inks with their cover coats have been reasonably dried, the glass, together with cover coatings now attached would be placed in a tempering furnace, also known as a toughing or tempering oven, and processed in the normal way, to fuse the ceramic ink coatings into the glass.
5. Upon removal from the tempering furnace, the image has now become fused into the glass and is permanent. It is possible to fuse the ceramic inks into the glass and is permanent. It is possible to fuse the ceramic inks into the glass without tempering the glass, but it is assumed in many applications it would be normal to do both functions at once.

FIG. 37A shows a perspective view of a construction whereby a solid liner 44 has been located behind a base 1. As an example, base 1 may be a paper of a water strength type used for production of and transfer of ceramic inks and other inks to glass, coatings, plastic, or ceramic surfaces. Papers known as water slide or water transfer have been used in the ceramics industry for many years. By processing the paper in the teachings of the present invention, so as to create a series of perimeter edges, it is possible to produce a construction, as an example of configuration, as shown in FIG. 37A. Holes 31, being round and in a staggered pattern, provide approximately 50% of the surface area as coating surface 9 and the remaining 50% of the surface as light passages 28. The liner 44 may remain with the base 1, or be easily removed or separated before or after coating or imaging.

FIG. 37B shows a base 1 a cross section through the joined materials of the liner 44 and the base 1 or may alternatively be a prepared base 1 with some form of release coating suitable for this type of process. As examples of the numerous coating combinations which are available, there could be a black coating 75 applied to release coatings on the paper base 1, followed by a white coating 75 and one or more indicia or colored coating 77. For water slide transfer, a cover coat, such as an organic coat 80, may be applied on top of the material. If the coatings 5 were of ceramic frit or ceramic ink type constructions, then it is normal in this well know process to have the ceramic ink in intimate contact with the glass surface prior to firing, tempering, or fusing. The coatings may be oriented in any particular order, according to the visual results required on the glass or for water transfer or other direct transfer methods. The image and indicia may be printed in reverse or mirror image, and additional coatings applied as required such that after transfer, the orientation of the image on a particular side of a piece of glass reads correctly. As an alternative embodiment, it is also possible to construct the coatings in any combination, and to create the edges with precise cutting methods such as laser, die cutting, or other mechanical known methods in the art, in any pattern whatsoever, including holes, stripes, and other irregular patterns, of which a few examples are shown in FIG. 50, such as to cut through coatings 5 which may be of differential type, thickness, or viscosity, after drying of the coatings and prior to the transfer step. If a paper is used as the base, it is known that paper is absorbent, and that the cover coat commonly used in this well known process may be absorbed into the paper, and not provide adequate release. It is also possible to print the coatings on a suitable base, and to transposition the coatings from a non porous base, as an example, to a coated paper known as waterslide or simplex paper whereby the coatings made on the base do not penetrate the coatings previously applied to the waterside papers and thus do not bind to the paper fibers, and thereby are not restrained in their transposition via waterslide or water transfer to a glass or other material. When transposition is being used, the coatings would be selected and images obtained according to the steps to produce the correct orientation of image on the finished product. As an alternative example, it is possible to produce paper bases with perimeter edges which may then be oversprayed or separately coated with release coatings to seal the paper fibers, to prevent the paper from coating into direct contact with one or more of the coatings.

FIG. 37C shows the example construction 1 of FIG. 37B being soaked in water 41 as a well known step, to prepare for release of the coatings from the base paper.

FIG. 37D shows the known techniques of water slide, whereby the paper base 1 is being removed from under the multi layer coatings 5 in the direction 66, and any residual water 41 is being left in the holes 31 and may be squeegeed out or evaporated out prior to firing or tempering. The ceramic ink structure has then been transferred to the surface 17 of a sheet or pane of glass 6 to form a see through surface such that when the water 41 evaporates out of the holes 31, the holes 31 will become light passages 28 in the coatings 5 on the surface 17 of the glass 6. This technique is known in the industry as "water slide transfer", and the teachings of the present invention offer enormous advantages over the current art. The holes in the material provide numerous print edges in this series of figures, but the perimeter of the coating area may be any shape and for any purpose. Areas of the coatings where print is not required can become open areas in the coatings, whether or not the purpose of the process is to create a one way vision or two way vision effect, or not, such that water evaporates readily from large areas of material via the holes, and does not get trapped under the surface of the coatings. Water, air, and other substances trapped under coating layers can expand as rapidly when the glass is being fired, fused, or tempered, and cause damage to the coatings and/or reduce their fusion and adhesion qualities into or onto the surface of the glass. If hole patterns are not the desired choice, but a pattern comprises a large solid area, then perimeter printing can still be used to orient the coatings to the edge and the perimeter may be made by having an existing perimeter on the base, or alternatively creating a base via other means such as cutting or using more than one level to only permit the required portion of the coatings to come into direct contact with the glass as part of the steps prior to tempering, fusing, or firing, such that the ink or other coatings may from a defined edge. Uses would include printing coatings around the exterior portions of vehicle windows, and many other uses.

Figure 37E:
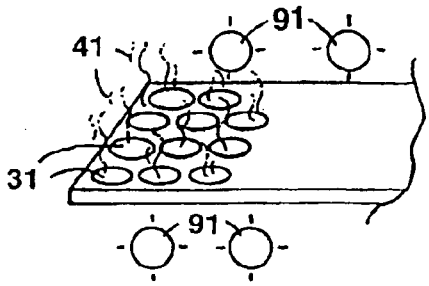
FIG. 37E is the coating transposed onto a see through surface such as glass and being fired or tempered in a furnace causing evaporation of the water through the holes.
Figure 37F:
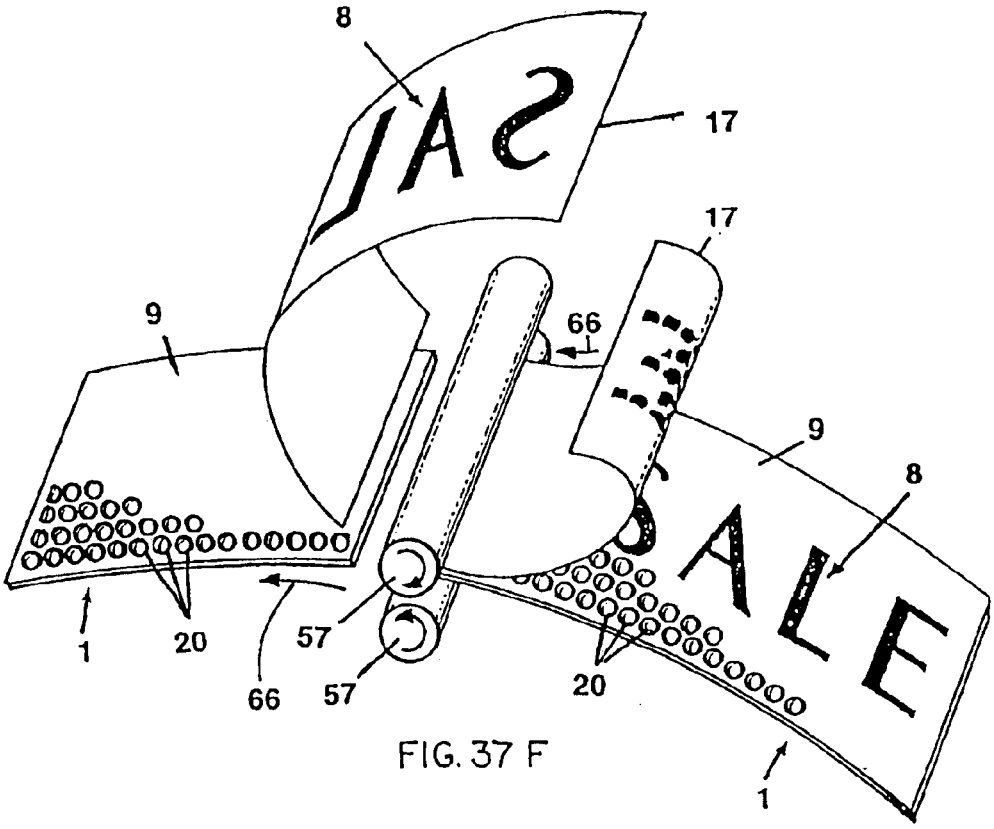
FIG. 37F is a typical hot roller method of heat transferring indicia from a base to an intermediate or final surface.
Figure 37G:
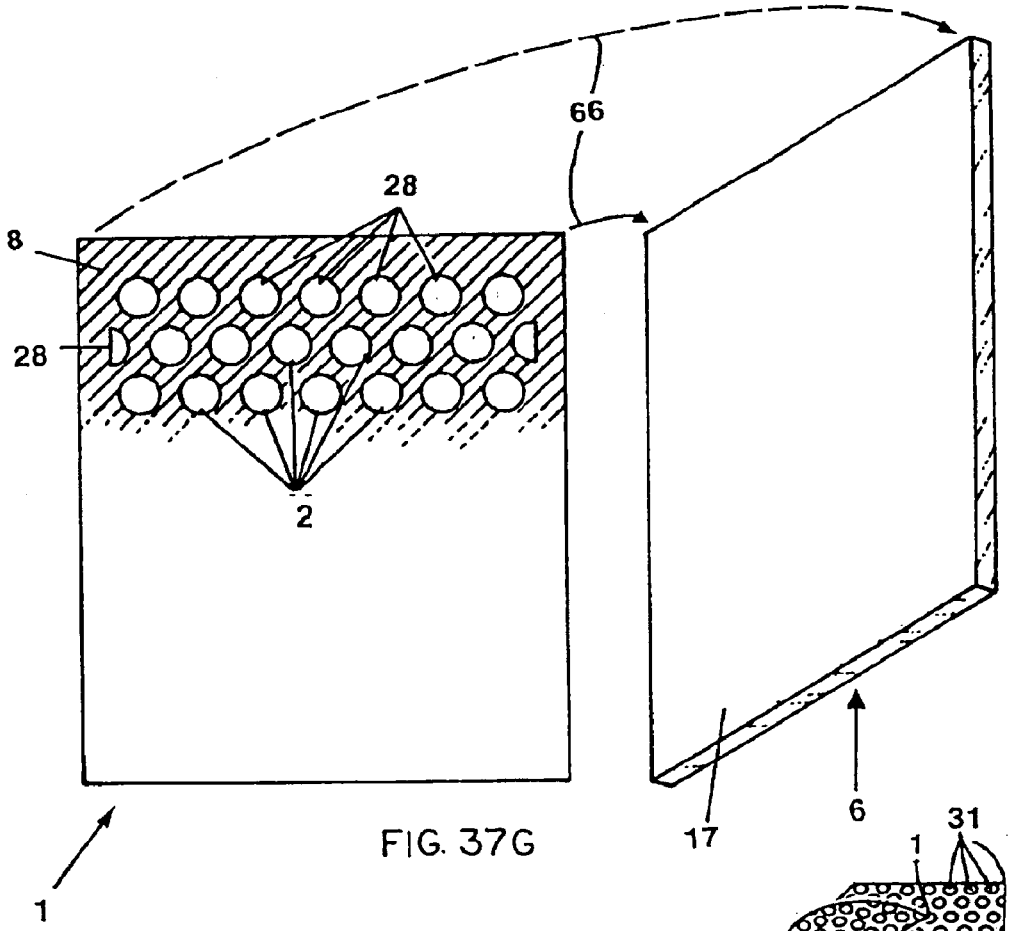
FIG. 37G is a direct or contact transfer step to show coatings applied to an alternative surface.

FIG. 37E shows a processing step well known in the art called tempering or furnace firing which is commonly used in fuse ceramic ink into glass, with the improvement of the ink which had previously been transposed in the teachings of the step in FIG. 37D or as shown in FIGS. 37F and 37G such that water which would have been present in the water slide technique shown in FIG. 37D will evaporate through the holes 31 in the coatings, and thereby solve a problem inherent in the prior art. The heating sources 91 produce heat which causes fusion and in tempering ovens, also acts as a tempering or toughening procedure, well known in the art, for tempering glass. The holes 31 or other cavities in the inks provide a release area for water to be removed from the surface, or from within the perimeter edge of the coatings to evaporate off as stream 41. This evaporation aids in providing large expansive areas of coatings and permits improved adhesion between the coatings and the glass surface, which generally require to be in intimate contact with each other to aid this process. This is an improved embodiment of the techniques of the known prior art, and provides for a one way or two way vision result, if needed. Large areas of glass may require the use of multiple adjoining transfers because glass can be made in sizes larger than popular printing press sizes.

When the present invention is used on see through surfaces, and where partial visibility is obtained from one side, regardless of the coatings on the other surface, true renderings of color are available to the viewer assuming the see through surface itself is generally color free. For example, there has been a fashion for providing reflectorized windows for buildings as a means of reducing radiated heat from the sun and therefore to save on air conditioning costs. The tinted glass and/or reflective type treatments also provided a degree of privacy for the occupants of the building regardless of the wish to control heat from the sun.

By using the present invention, it is possible for the occupants to see between the areas of print regardless of the pattern chosen for these transparent portions and to enjoy the correct color of the outside world and not having that color affected by the tinted window or tint film added to clear windows or combinations like that. From the outside, it is possible that the building may still look reflectorized because a reflectorized coating can be used in the coatings. A color or colors can be used to allow an architect or builder to coordinate the color of the glass to the color of the building, or any other treatments, such as the company's logo which could be printed on the exteriorly visible side of the glass while the occupants see through it and are totally unaware of the existence of their companies logo on the outside of the window. This could be used in high rise city office buildings, hotels, or any other types of building whatsoever.

The same concept can be used on vehicles, such as company vehicles, shuttle buses, public transport buses, where advertising or corporate identity or any other visual and/or energy control message is desirable.

Real color can now be visible from one side while the viewer sees through the see-through surface to the area on the other side of the glass or see-through surface such that the colors rendered to the eye are natural and visually correct.

FIG. 37F shows a heat and/or pressure transfer method for coatings whereby a base 1 which may have holes 20, indicia 8 on a coating surface 9 is being fed through rollers 57 such that an intermediate or final surface 17 will receive the indicia via transfer techniques, where such techniques are themselves well known in the art, but the use of a unique base 1 provides for the creation of a unique image or indicia 8 on intermediate or final surface 17. It is common in such methods that the transfer or transposition of coatings from the base to the other surface is conducted via either heat, pressure, contact, or combinations of these, but also may be accomplished by other methods such as magnetic attraction and repulsion from one surface to the other, or electrostatic attraction or repulsion, or with coatings which are reactive from the base to the intermediate or final surface such that upon close proximity or contact they have chemical reactions that cause transposition of the coatings, and many other methods. After transposition, the indicia 8 is now visible on the intermediate surface 17 and it is possible in this example that the reverse image visible on the intermediate surface 17 could then be transposed to another surface be it a base or final surface, such that the print orientation becomes correct. The use of holes 20 causes the creation of light passages in the printing and in the indicia 8 on the surface of the material 17. The direction of movement 66 is to allow the rollers 57 to perform the transfer function of this example.

FIG. 37G shows a prepared base 1 comprising indicia 8 coated so as to leave light passages 28, formed by the edges 2, ready for transposition to the surface 17 of a see through surface 6, such as glass. The coatings and indicia 8 may be prepared with some form of adhesive or other means to temporarily or permanently attach the indicia 8 to the surface 17 after bringing the base 1 in the direction of movement 66 so as to place the two materials in intimate contact. After transposition, the base 1 would normally be removed and either reused or discarded. Alternatively, base 1 may be itself an intermediate or final surface, such as a film of transparent or other structure, and may be adhesive or otherwise fixed to the see through surface 6 so as to remain temporarily, semi permanently, or permanently in place. The term "semi-permanent", or similar, as used herein, includes, but is not limited to, coatings which remain fixed in normal use but which can be relocated by transposition, or removed with special cleaners, scraping action, mechanical removal, removal by the application of heat or cold to cause dissolving or release of the coating, radiation, heat, or other means of causing the removal of the coating whether done by liquid, powders, air abrasion, water jet, chemical, light beams (such as laser) or radiated sound waves, such as ultrasonic and the like, and includes adhesives so described. Base 1, after transposition to the window, may become a surface to which overcoatings may subsequently be applied or to which other substrates or materials may be applied, assuming base 1 was made from a master or whereby base 1 was reused to reprint additional coatings of the same configuration and the same light passages 28 to provide multi coating capability on the surface 17 of the see through surface 6.

Figure 37H:
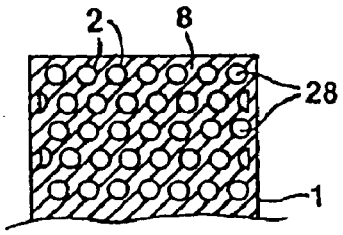
FIG. 37H is a plan view of coatings.

FIG. 37H shows a base 1 prepared with light passages 28 comprising edges 2 to all the light passages, and an indicia 8 over the remaining surface of the material. It is possible that an identical repeating pattern is placed over the entire base area or over a portion of the area, or to have different patterns on different portions of the base according to the required design. Assuming the base and its indicia included a coating such as adhesive to permit attachment to the surface, then the step of transposition would make that occur. Alternatively heat, pressure, or other means may be used to ensure attachment op the indicia 8 coatings, and other coatings which may be beneath the indicia or not easily visible. It is possible for a second indicia to be in direct contact with the base 1, and this indicia, which is currently not visible in FIG. 37H, would become visible on the upper surface after the transposition step to the surface of the glass. Other uses include retail stores, both for food and other consumer items, where it has become common merchandising practice for manufacturers of goods to negotiate with the store owner for certain positions on the shelving in the stores which, it is believed, gives the manufacturer an advantageous position relative to the consumer. In supermarkets this would be the end caps at the end of each aisle, and positions along the central height of the shelf which are most visible from the average height of adult shoppers. As a further means of reinforcing the manufacturers rights to this shelf positioning, it would be possible to use glass shelving of the present invention whereby it is possible to have the brand identity of the product on a shelf, particularly when the shelf angles downwards toward the consumer and yet retain visibility through that shelf to the shelf below. A simple example would be the sale of athletic shoes whereby the typically white shoes would be placed on the black side of the material and allow the consumer to see down through the shelf to the shelf below. Large expanses of shelf areas can be so treated and also using printing facing in the same direction. Printing can be superimposed against the black background to portray the corporate logo and brand identity of the product that should normally be displayed on that particular shelf.

Figure 38A:
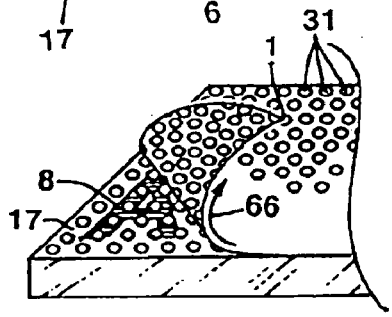
FIG. 38A is the removal, after transposition, of a base for one way vision purposes, where the base used round staggered hole patterns to align the perimeter edged coatings.

FIG. 38A shows an alternative method of transfer which can either be a direct transfer using adhesive, or other methods known in the art or disclosed in the present application, or may be a continuation of the steps shown in FIGS. 37A, 37B, and 37C, whereby the base 1 has, together with its coatings, and holes 31, been brought into contact with a surface 17, such as glass, such that the coatings are in intimate contact with the glass surface and the base 1 is being removed in the direction 66 to leave the indicia 8 on the surface 17.

Figure 38B:
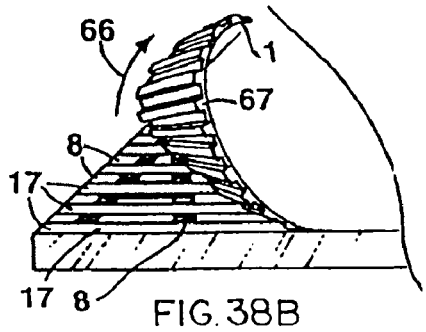
FIG. 38B has a similar function to FIG. 38A, but using an alternate pattern, in this example, parallel stripes, alternating between image and light passages.
Figure 38C:
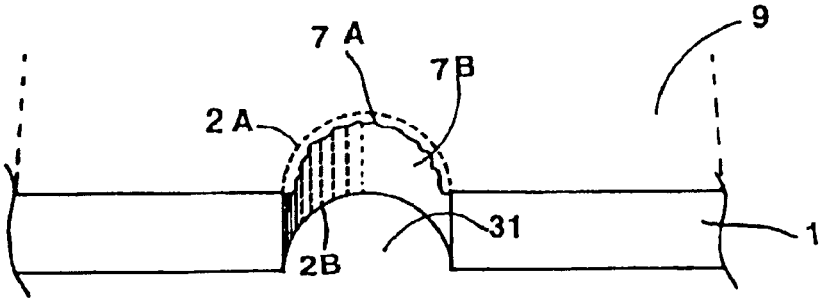
FIG. 38C is a perspective view of an edge and perimeter wall construction, with a release coating applied on the upper surface and on the perimeter surface and around the edge material to provide releases for coatings which occupy both the upper and perimeter surfaces.

FIG. 38B shows a similar process to FIG. 38A but the base 1 is being removed in direction 66 after transposition of indicia "A" and other visual images 8 onto the surface 17 of a material. The images were formed on paralleled striped ridges 67, in this example so as to provide a partial coverage of image on the surface 17. There are many uses for this technique including one way vision, combinations with previously or subsequently applied coatings, for energy or light control or to form air or gas cavities between the coating areas when the coatings are brought into intimate contact with a solid surface.

FIG. 38C shows a perspective view of a base 1 with a hole comprising an upper edge 2A and a lower edge 2B such as to define the walls of the hole 31. Because some bases, such as paper, are retentive or absorbent of coatings, it may be necessary to preapply a release coating 7A on the upper coating surface 9 and to cause that coating to penetrate over the edge of the hole 31 such that if sealing coats, cover coats, adhesive coats, or others, or deliberate application of coatings over the edge of the holes 31 occur, or are intended, that these coatings will subsequently release from the coating 7A. At the upper edge, an exaggerated irregularity is shown to identify the existence of the coating, but to visual inspection, it would normally look smooth.

Figure 38D:
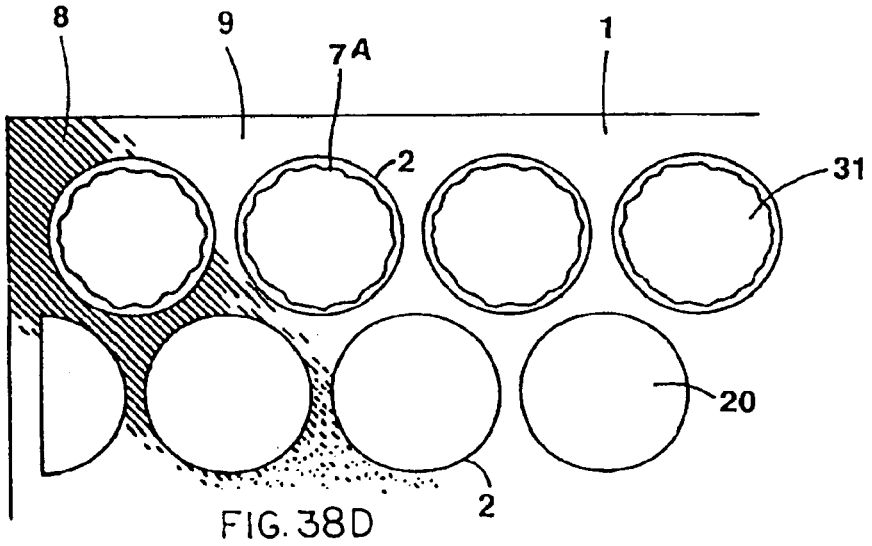
FIG. 38D is a plan view of these release coatings occupying the wall of the perimeter or side walls of holes to facilitate easy transposition.

FIG. 38D shows a plan view of a typical base which has indicia 8 on the coating surface 9 of the base 1, and the exaggerated appearance of the coating 7A overlapping the edge 2 to carry the release coating 7A into the hole 31 or if not a through hole, then it may be a cavity 20, which may be completely lined with a release coat 7A aligned and overlapping the edge 2 to permit release under any of the embodiments of the present invention or other methods of transportation to provide for effective release of coatings from the base.

One way vision may best be understood by those not versed in the art using the example of when a person dons a pull-over or sweater and where the pull-over has open weave fabric. As the sweater is pulled over the head downwards and the interior of the sweater is in darkness, the intending wearer can see through the weave of the fabric to the room outside. An observer in the room can not see the face of the person putting on the garment but could see the colored or decorative pattern on the front of the garment. The person inside is in a darker area and sees through it. Numerous examples exist in the prior art including: Frey U.S. Pat. No. 1,199,882, Herschmann U.S. Pat. No. 3,451,877, Hill U.S. Pat. No. 4,673,609, Dunklin U.S. Pat. No. 4,358,488, Richard U.S. Pat. No. 4,261,649, and many others. One way visual effects are best demonstrated when a person pulls an open weave sweater over their head. At that moment, you have a substantially darker interior area inside the sweater, and typically a brighter ambient light condition outside the sweater. The wearer can see through the open weave of the garment and see objects in the room. However, another person can't see through the fabric to the person pulling the sweater on or off. The effect is obtained because relative dark ambient light levels within the garment and higher ambient light levels outside. The degree of visibility is obviously dependent upon the openness of the weave.

Although no patent has been found to describe this, it was common since the 1930's to use a one way vision screen on stages of live theater as follows. A dark open weave material would have a colored image painted or printed on one side. This would form a decorative backdrop to the front part of the stage when the material was placed vertically or lowered from overhead, into center stage. The front of the material would be lit by stage lighting, and the play or musical show would continue on the front of the stage. Behind the curtain, that area of the stage would be kept substantially dark, and the stage hands would change the set whilst the show continued on the front. All that was necessary to bring the rear of the stage into use was to turn down the stage lights at the front of the stage, thereby making this colored decorative image not visible, and putting the backstage lights on bright, and the audience would see right through the material to the back of the stage. Simply by turning the lights on and off, they could make the back of the stage visible or not visible. The stage hands, actors and the like at the back of the stage could see through this material to the front of the stage and the audience beyond. This demonstrated that a similar pattern would produce decorative patterns which would have changing visibility as the lighting changed from one side to the other, making one side decreasingly perceptible, while the other side became increasingly perceptible. Such a well known result has been given different names and different patents and one of the more recent is the Hill U.S. Pat. No. 4,673,609 patent which calls this open weave "silhouette pattern".

Hershmann, U.S. Pat. No. 3,451,877, discloses the visual effect in greater detail and also teaches the relevance of light and the difference of visual effect according to the lighting on one side and on the other side of the material. In Richard, U.S. Pat. No. 4,261,649, Richard teaches the use of a perforated material with a pressure sensitive attachment, together with a decorative image, for the purposes of seeing through the material from inside an automobile or building while reflecting sunlight and reducing vision into the vehicle together with the use of a decorative pattern which would have the obvious purpose of advertising, messages, or other visual indicia.

Other materials for one-way vision have existed whereby perforated plastic films, with and without adhesive backing, were producing using round holes. Perforated black vinyls, with colored images have been used for advertising and other purposes.

In the Hill U.S. Pat. No. 4,673,609, Hill teaches the printing of dots on the surfaces of glass, but this technique had been previously disclosed by Neilsen and Wood in U.S. Pat. Nos. 4,102,101 and 4,167,839, and further examples exist in Whitehead U.S. Pat. No. 4,321,778. Additionally, the silhouette pattern ratios for optimal vision of printed data are disclosed in Cass U.S. Pat. No. 4,591,525.

Perforated film, such as vinyl, offers advantages over transparent films covered with discrete dots, in that the view through the see-through surface is substantially unobstructed and the viewer sees a quality of optical clarity identical to that of looking through the plain glass except in the areas where the material is not perforated.

The manufacturing problem with perforating is that it is an expensive and time consuming process, particularly using the necessary technique to produce holes in a material with or without an adhesive backing. The photo stencil process is expensive, limited in ink choices and labor intensive, is complex in manufacturing and produces optics which of necessity are inferior to the natural glass because an observer must see through the adhesive and or plastic material, upon which the printed image is placed. The photo stencil process requires the application of an etch-type material upon which the subsequent images and color background are printed and then require washing off with a high pressure water blasting technique. These extra steps involve cost in additional material and labor.

With regards to fabric type structures, there exists a series of products made of fabric or woven screens with an image or one side and a gap in the woven fabrics to produce light passages with the resulting ability to see through the gaps in the fabric. The fabric material does not adhere well to see-through surfaces and does not produce a good optical clarity, both problems being solved by the present invention.

The need exists for creating products which offer flexibility and effectiveness of light control and are suitable for the effects of partial or complete one-way vision, and the present invention solves the problems of the prior art.

It is one purpose of this embodiment to produce a new and unique product which provides effective one way vision without the inherent cost and problems of the existing art.

The present invention provides for the ability to manufacture a varying relationship between the area of printed image on the front surface of the invention and the area of light passages available for viewing through the material from the opposite side. Also, the coatings adhere well to a see-through surface because the preferred process has a continuous material surface and yet enjoys superior optics and far reduces processing compared to the etch-based printing methods.

For motor vehicles the perforated films on the outside auto back windows produces some difficulties where the holes will partially fill with water during rain and thus reduce rear visibility unless a protective laminate is applied over the material. This does not occur with the present invention. For printing, the present invention can use established techniques such as litho, rotogravure, offset, silk screen, and the like and can be printed by printers using a variety of quality and technique levels. The unique constructional concept allows for two or more levels of upper surface on the material where the rear surface is intended to be placed against a see-through surface.

For interior mount construction, or for transportation, the base would be first printed with a black or substantially dark monochromic coating, and for print reasons this would normally be covered with a white coating to provide a suitable background for the multicolor coatings, the one or more colors of image are applied to the surface. This means that when attached to a see-through surface the viewer would see through the light passages between the areas which appear black to the viewer. From the opposite side, typically the outside of the see-through surface, the viewer would see the colored image on the front and enjoy the phenomenon of having very minimal view through the material, particularly when the exterior light is brighter than the light behind the image.

For exterior mount construction, or for transportation, the construction would be a reverse printed one or more colored image, next would be applied a white color to provide a background for the colored image, next would be applied an opaque black coating. The material would be attached to the inside of the see-through surface and the viewer would look from the black side and see through the light passages to see the view outside the see-through surface. From outside the see-through surface, the viewers optics would be through the glass, through the adhesive, if present, to see the colored inks which were printed onto the surface in reverse image at the time of printing.

It is also possible that a liquid ink could be allowed to flow in the lower area of the base assuming the material were held in a horizontal position and coatings could then be applied in that manner. Additionally it would be possible to create a mask which would cover the upper surface areas so that a spraying or other method of applying the material such as inkjet printing, airbrush, or similar could then only reach one or more levels in the substrate. The preferred embodiment is to print via traditional methods onto the upper level of the material. It would be possible to create unusual effects by having several levels in the material and appropriately coloring or imaging different levels with different treatments. An example of this would be where the deepest level may have a gold or similar metallic type reflective material, the middle level as an example may be transparent, and the upper level with printed images. When the viewer was directly in front of the material, they could see into the cavities of the lower levels and see light reflected such as by a mirror. When at an acute angle to the plane of the material, the image in the lower cavities would be invisible and they would only see the upper surface colored images. This would crate unique visual effects in an affordable way. In another embodiment, it would be possible to selectively print part or parts of the image on the rear surface as well as, or as an alternative to, one or more levels on the front surface. This can create controlled visual conditions. Controlled angles of view could be achieved by printing, for example, a black coating in a different position on the rear surfaces as a discrete or contiguous pattern so as to provide a differential alignment of the light passages so that it was only possible to see out in certain directions. This would be achieved by offsetting the gap in the black printing so that it wasn't directly behind the uncoated area on one of the front levels. For example, by offsetting it 50 percent of a hole diameter to the right it would be possible in an material of a certain thickness to create an angle of view that was 45 degrees to the plane of the material. This could also be used to provide downward visibility whilst offering some screening effects from the overhead sun. The patterns on the front of the material can be produced so as to create a broad range of light passage and image area possibilities and several examples of these are shown in the Figures. The preferred embodiment is for a continusouly interconnected image using light passages of a circular nature at a staggered pattern whereby approximately 50% of the material is light passage and about 50% is image area.

It is possible to reverse the orientation of the material against the see-through surface such that one of levels is attached or in close proximity to the see-through surface and this would leave air gaps between the see-through surface and the lower level or levels of material whilst the external surface exposed to the air would be substantially flat. The other variations of the material could include protrudences on the front to create another level and recesses on the rear positioned in structured alignment so that light passages were created in either the upper level on the front or the lower level by selectively printing on the rear surface.

The present invention could also be composed of multiple materials whereby additional laminates could be applied over the front surface for graffiti protection or weathering reasons to provide vandal protection, ultraviolet protection from fading and the like. Also this product would be ideal for electrostatic transfer imaging and other direct transfer methods because of the relative smoothness of the upper surface level which would be receptive to toner without the problems of positioning the toner to leave light passages Further, perforated material using closely spaced holes, when mounted on the exterior of an automobile rear window, can cause visibility to be reduced in rainy conditions, where the rain drops settle into the holes on the angled window and do not always clear quickly when driving. The present invention solves the problem when the orientation of the interleave material is installed in a vertical manner, aligned from the top of the window to the bottom, so that water exits the sections without undo buildup.

Printing on both sides of the material prior to installation or printing images back to back provides the capability for people on one side of the material to see one image and people on the other side of the material to see the same or a different image according to requirements.

Further, preferred material using closely spaced holes, when mounted on the exterior of an automobile rear window, can cause visibility to be reduced in rainy conditions, where the rain drops settle into the holes on the angled window and do not always clear quickly when driving. The present invention solves that problem when the orientation of the interleave material is installed in a vertical manner, aligned from the top of the window to the bottom, so that water exits the sections without undo buildup.

Combinations of partially transparent and substantially opaque areas where the transparent area can be activated with an electrochromic coating or other method to make the transparent areas substantially opaque for privacy reasons at night. Structures which can be successfully backlit or which can be totally backlit, where only portions of the image area visible through partially transparent or not totally opaque, areas and an image is visible when one side when it is illuminated and the other side isn't. As an example, window shades, such as vertical shades, roller blinds, pull down shades and those that can be rotated to have two images facing either direction, can be produced with these features.

When used for one or two sided visibility, either partial, sectional or graduated, these structures provide precise edge alignment. In one sided structure, the black coating may also be varied across it's surface to produce different light absorbency levels to further differentiate sections or areas of visibility.

One or two way see-through vision is possible and may also be achieved on multi-sided material, such as formed material, prisms, lenticular structure, parallel sided structures, structures where one side is flat and the other is simple or compound curved, parallel but parallel in a curved manner like a car windshield. A see-through surface need not be tinted or coated but could have a tint film applied with a reflective or metalized surface or the like with or without color.

As black is light absorbent, varying the darkness or lightness of the black color will affect visibility. A paler color of black, such as charcoal or light gray, and containing greater amounts of white added to the black color would make it more difficult to see through that portion, therefore entire areas can be used with different colors of black or alternatively, through print coating control, it would be possible to have some sections as dark a black as possible while other sections are either paler black, or, may even be colored through the spectrum of colors to white, thereby making vision from that side variable from one section to another of from one part of a surface to another, or from one surface to another surface.

The lower level of the transparent material is intended to become the light passages through which the viewer from the interior, or rear side of the structure, sees through the material.

A see through surface could have one sided coated with light reflective material either for mirror or for projection of an image, such as a move, onto it while still retaining visibility through it from the inside, the uses of such structures being well known in the art.

Figure 39A:
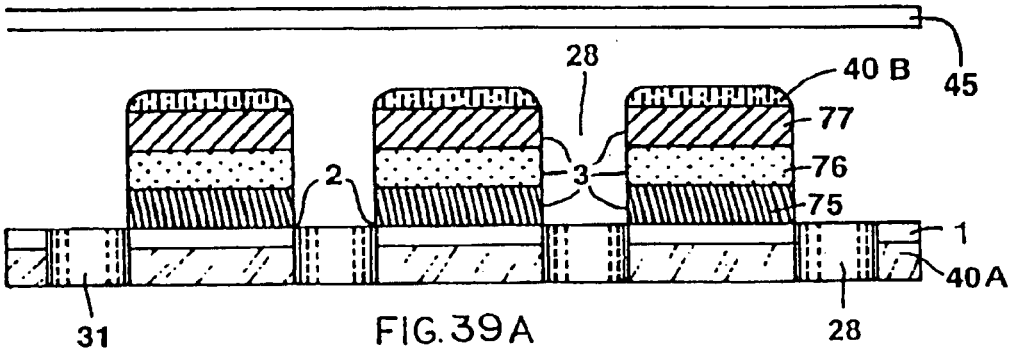
FIG. 39A is a cross sectional view of a base with light passages coatings applied to the perimeter of the available material and an adhesive coat applied as the last coating ready for direct transfer or other application methods.

FIG. 39A is a cross section base of a structure comprising a base 1, which had edges formed via having holes 31 made in the base 1 and an adhesive layer 40A which also has holes in the adhesive, where it is usual for the holes 31 to have been manufactured through materials at one time or for the adhesive to be coated later, both steps being known in the art. On the other side of the base has been applied a series of successive coatings aligned on the edge 2 so as to cause a perimeter 3. The coatings in order from the base in this example were: a black coating 75 coated in a pattern different to the position of the holes 31, so as not to cover the complete surface. With this improvement, it is possible to define boundaries to which further coatings may be applied using the black 75 coating, as an example, as a secondary base level and thus produces a graduated or differential effect for see through vision such that if the base 1 becomes an intermediate or final surface and is transparent, then the next color applied, in this example white 76, would be visible in areas not covered by the black and if this step was repeated, it is possible that from one side black will be visible where coated, white will be visible where coated and not visible when coated on top of black, and a color 77 would be visible where neither of the two previous colors were coated, but would not be visible when coated on top of either black 75 or white 76. If a release point existed between base 1 and the example black coating 75, then individual dots would be transpositioned across as part of the transposition teachings, optionally on top of the image coating 77, an adhesive 40B was further applied. The adhesive layer 40B may be covered with a release liner known in the art to facilitate transportation to a transposition site. Alternatively, the adhesive 40B may be used as a means to facilitate attachment of a solid laminate 45 which would then cause the light passages 28 to become encapsulated on that sided and after transposition, the adhesive 40A could be brought into contact with a see through surface such as a window, so that the air or gas contained in the light passages 28 is captured between the window and the laminate 45. Alternatively, the structure shown as the laminate 45 could be the previously mentioned release liner, or other materials, or even a second or more bases as part of a construction to build up multiple layers.

Figure 39B:
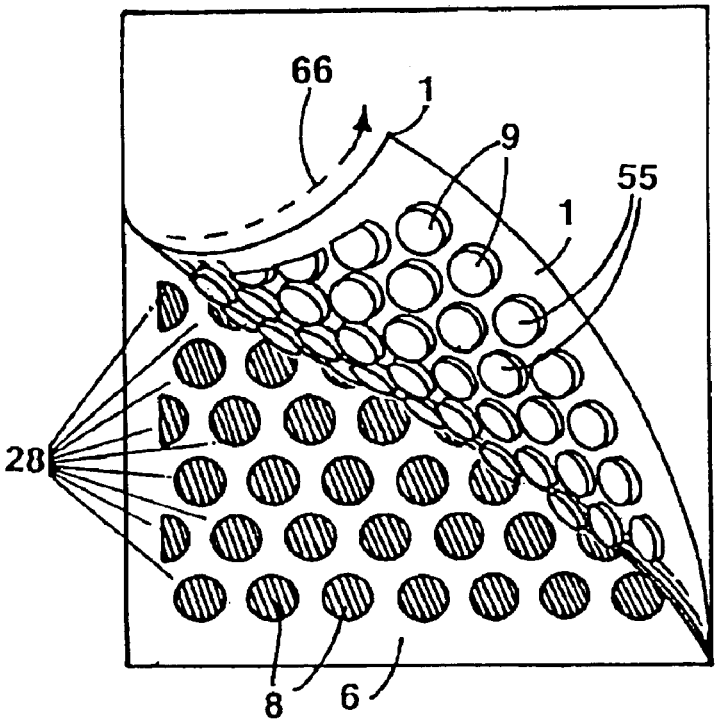
FIG. 39B shows the removal of the release liner from the surface of the coatings after the coatings have been applied to an intermediate or final surface to reveal the indicia thereon as dots.

FIG. 39B is an alternative embodiment for transposition whereby the base 1 was of solid construction, without holes, and had on its surface raised plateaus of protrusions 55 which have a coating surface 9 on their upper surface. FIG. 39B shows the base 1 being removed from a see through surface 6 in the direction of movement 66. The coatings and indicia 8, which were previously applied onto the coating surface 9 of base 1, have now been transposed to the see through surface 6 forming individual, in this example round, dots 8 of indicia such that between the dots are light passages 28. It is possible that this transposition method could add drops or other shapes or patterns of indicia 8 to a non see through surface such as to create a different pattern. It is apparent that they need not be round, regularly patterned shapes of dots, but could be any pattern which would exist on the base, or patterns existing on one or more bases prior to this transposition step. It is further possible to transpose a series of coatings made from either identical bases or different bases onto the same final surface. Therefore any pattern combination may be laid across any other pattern combination or structure to create unique effects including encapsulated air or gas chambers, partially or completely transparent or opaque sections, partially translucent portions; and any other combinations.

Figure 39C:
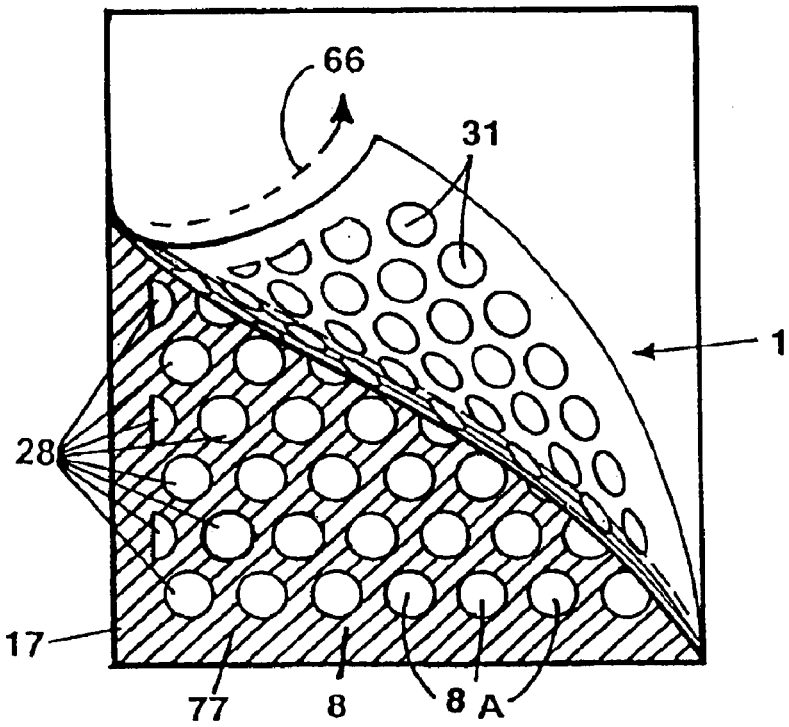
FIG. 39C is an example of a transposition step from a base to a see through surface, or to a surface to which dual images can be prepared or where the base may act as a shield to protect certain coatings, whilst other coatings are added through cavities or holes in the base.

FIG. 39C shows a typical transportation step whereby a base 1 which had been manufactured with holes 31 and coated with more than one coatings, indicia, or other visible or non visible substances such as coating 77, and transposed to the surface 17 of a material. As holes 31 existed in the base 1, so do light passages 28 exist on the surface 17. The light passages may, in fact, be alternative indicia 8 if the following steps were completed. If the base 1, which had coatings previously applied, was placed against the surface 17, and a coating of indicia 8 may have been applied by, for example, via spraying through the holes 31 to become indicia 8A on surface 17, prior to removal of the base 1 in the removal direction 66. Thus, it would be possible to have a contrasting pattern or to produce one or more portions of a final image, such as to have additional color treatment, which provides a very unique construction which is producible only from that master of base 1. While the example shown in FIG. 39C has uses as a one way vision result, it is apparent that any base edge pattern of any kind, including logos, corporate signage, and other uses, may be produced by this or any other embodiment or example of the present invention. Such a resulting indicia or combination of indicia and light passage can produce unique resulting images or, if the images are not visible, then unique identification signage is possible under the teachings of the present invention. Other combinations present with nay of the teachings herein, where a base with cavities or holes may be applied to an intermediate or final surface, coatings sprayed as in the teachings of FIG. 39C, then transposed to another surface to which additional coatings may be applied or partial coatings removed and further transpositions and combinations with other coatings, or the coatings previously applied to other bases or provide for any number of combinations of unique constructions for many purposes.

Figure 40A:
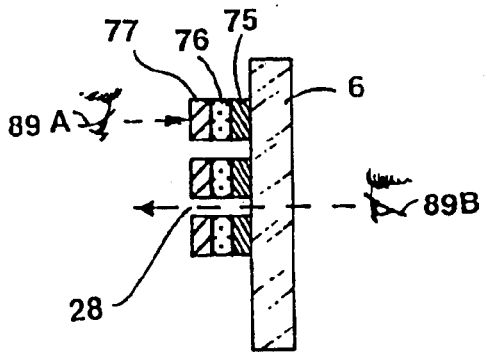
FIG. 40A is three coating levels in perfect register directly attached to a see through surface such as a glass window via the firing or fusion process.

FIG. 40A shows a three layer construction of coatings which have been transposed to a see through surface 6. In order of attachment, the coatings were: black 75, white 76, and a colored image 77. It is possible that the colored image 77 may be a monochrome color, such as a blue or any other color, and it is also possible that certain portions of the image may be one color while certain portions of the overall image may be a different color and that certain portions may be multi color within each segment. Additionally, the use of the third coating 77 may not be necessary if it is desirable, for example, to have a white color 76 as the visible color. In this example, an observer 89A to the left of the see through surface would see the image 77, whilst an observer 89B on the right hand side of the material would readily see through the see through surface 6 and through the light passage 28 created between the sections of coatings, such as to observe the view on the other side of the window opposite to the observer 89B. This is a typical construction for any one vision products, and yet provides the benefit of having aligned coatings, without needed to use the photo stencil process or other prior art. The one way vision effect is well known, but this method of preparation provides substantial benefits including the use of construction and transposition in alignment, particularly in large areas. The coatings are not to scale as shown relative to the window 6, but are intended to define coatings as separate structures. It is also possible that some of these coatings may be intermixed from other coatings, that they may be removable at one point in the coating layers and not separate at another junction point of two coatings, and many other possibilities.

Eye-glasses have been made for one way vision using two techniques. The first is produced via perforating the lens with numerous small closely spaced holes whereby a black plastic, or coating faces the wearer whilst the colored image is on the outside of the lens facing the onlooker. The other alternative product that has been made uses the photo stencil process. An advantage of the present invention is that it is possible to build safety glasses with strong durable lenses and even incorporate partially reflective coatings on the outside, such as heat or radiation reflective coatings, and yet retain acceptable visibility from the side of the wearer. Colored images are also possible, after transposition to any lens.

In certain countries road signs are of large sizes. Road signs can be sufficiently large as to obstruct vision such as when large directional highway signs are placed on poles and may obstruct the vision from, for example, residents of apartment buildings behind the signs. In some countries highway, traffic and road signs tend to be placed lower to the ground than others, and this can even cause problems when trucks and other vehicles have trouble seeing around the corner because a solid road sign is between them and traffic coming from the other direction. In certain places, traffic directional signage is placed at heights which may restrict visibility from behind the sign. This can be dangerous in some situations and the teachings of the present invention make possible a permanent multi or mono color durable image, such as "Paris→", which provide visibility from the other side. Using the present invention, either using toughened glass or rigid or durable plastics or laminates of one or more of any material disclosed herein or others, it is possible to provide effective directional signage including the use of reflectorized coatings and retroreflective and reflective materials so that the sign is more visible in headlight illumination, and yet drivers and pedestrians on the other side of the sign can see through it and identify the traffic approaching from that direction. Whether the traffic be vehicular or pedestrian, or on bicycles or other means, safety is enhanced when visibility is possible from at least one side of the sign to the other. Also, the use of reusable bases means numerous signs can be made from one master.

Alternately, other uses could include a retail display where a viewer would be walking along, not see through the dual sided printing until directly aligned at 90 degrees to the plane of the see through material and then to lose the view as they continued past the display.

Surfaces of buildings and vehicles including rear windows, side windows, sunroofs, striping or sections across windshields, camouflage for glass on military vehicles can incorporate inks that can change color with heat or electrical current on any application and on any surface, either see through or not see through. An example could be a wall or window mural printed in sections to change color width perfect alignment of the colors underneath the top layer.

Figure 40B:
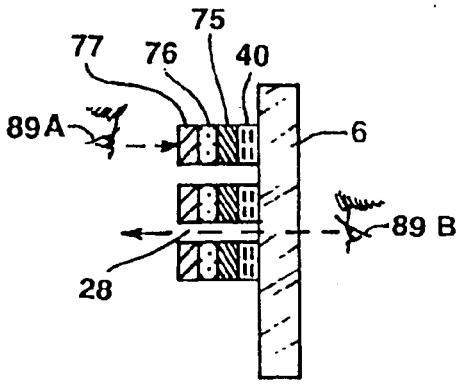
FIG. 40B is the same as FIG. 40A except the attachment method was a form of adhesive.

In FIG. 40B, we see a similar construction to FIG. 40A except that an adhesive 40 has been used as the attachment method. This adhesive may be any presently known or future developed adhesive, and may be described as permanent, removable or temporary, according to the intended application of the mono or multi coated layers.

Figure 40C:
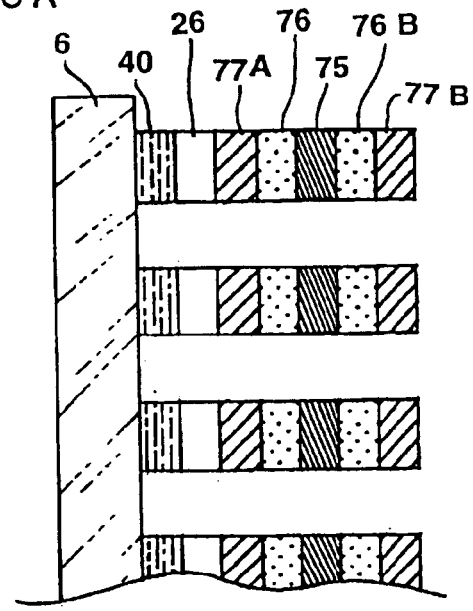
FIG. 40C is a cross section of a double sided two way vision, two way image, material attached to a see through surface.

FIG. 40C shows a double sided image attached to a see through surface 6 whereby the adhesive 40 has been chosen as the attachment means, and the coating layers may have been built up in either order. For example, the base may have initially had applied an indicia coating 77B. It is possible that the adhesive 40 was first applied to the base, not shown, and the other coatings were built up on top of that initial coating. In that case, it would be necessary to have a transfer tape or application tape, and use of which is well known in the printing and graphic arts, as a transfer medium such as to release the adhesive 40 from the original base to expose it ready for application to the see through surface 6. Referencing from the adhesive 40, a clear coat 26 is applied next to an indicia coat 77A such that the indicia is visible from the left hand side of the example shown in FIG. 40C. The white coating 76 is intended to provide a white background to the color coat 77A to provide realistic colors. The black coat 75 is intended to act as a block out, such that no light will transmit from one image through to the other, and this would in turn necessitate the addition of a white coat 76B before applying the color image coat 77B. As an alternative, it would be possible to use metalized film or other opaque material, and this technique of light block out is well known in the art. However, the present invention provides for many such complex structures and options of coating selection, while still retaining edge registered layers for purposes such as this example.

Figure 40D:
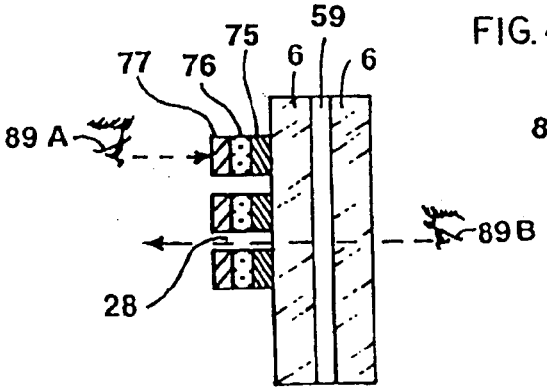
FIG. 40D is a laminate of at least two materials such as laminated glass or plastics or combinations with a one way vision series of alinged coatings attached to one side.

FIG. 40D shows a constriction commonly found in automotive windows whereby a material 59, typically PVB, has been laminated between two sheets of glass 6, well known in the art, particularly for automobile windows. To one side of one surface of one of the two sheets of glass 6 has been applied a black coating 75, together with a white coating 76 and an image coating 77, such that an observer 89A will see the colored image 77, whilst an observer 89B will look through the transparent structure and through the light passage 28 to the view on the opposite side of the see through surface. Coatings may also be encapsulated between two or more layers of a see through material or surface, such as a window.

Figure 40E:
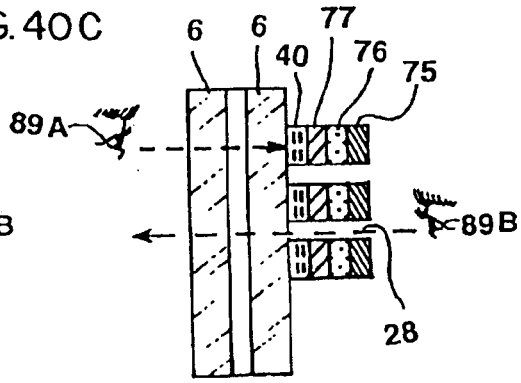
FIG. 40E is the same construction of FIG. 40D except that the alignment of the color image an the black coatings are placed on the opposite side of the surface or surfaces.

FIG. 40E teaches a similar construction using the same image orientation as FIG. 40D, but with the coatings 75, 76, 77 applied to the opposite side of the window, such that an observer 89A sees through the see through surface, through a transparent adhesive 40 to the indicia 77. An observer 89B looks through the light passages 28 and through the see through surface 6 such as the glass laminate, to the view on the opposite side.

A reversible panel or panels for any of the embodiments or examples including heat, light, sound, glare or combinations thereof, may be rotated to allow transmission of any of the above from one side to the other, for example, reflect sunlight in daylight, allow absorption of heat in early morning or late afternoon, to allow views in one direction by day and views in the opposite direction by night. A structure may be rotated on a mechanical mechanism or rotation may be simulated in effect by having changeable coatings via electric current or other means such that the characteristics change to permit light in one situation and to prevent transmission or partial transmission of light in other situations. The same structures may also provide control of heat, glare, sound, and other uses.

As an alternate embodiment, a louver may be black from one side. Coating the front and putting it in the vertical plane or the horizontal plane means people could see through at certain angles while people outside could see the image coating. If the louvers face up or down when installed horizontally on a building, the viewer could see out horizontally and upwards, or horizontally and downwards respectively, whilst an observer below would see the image.

Figure 41A:
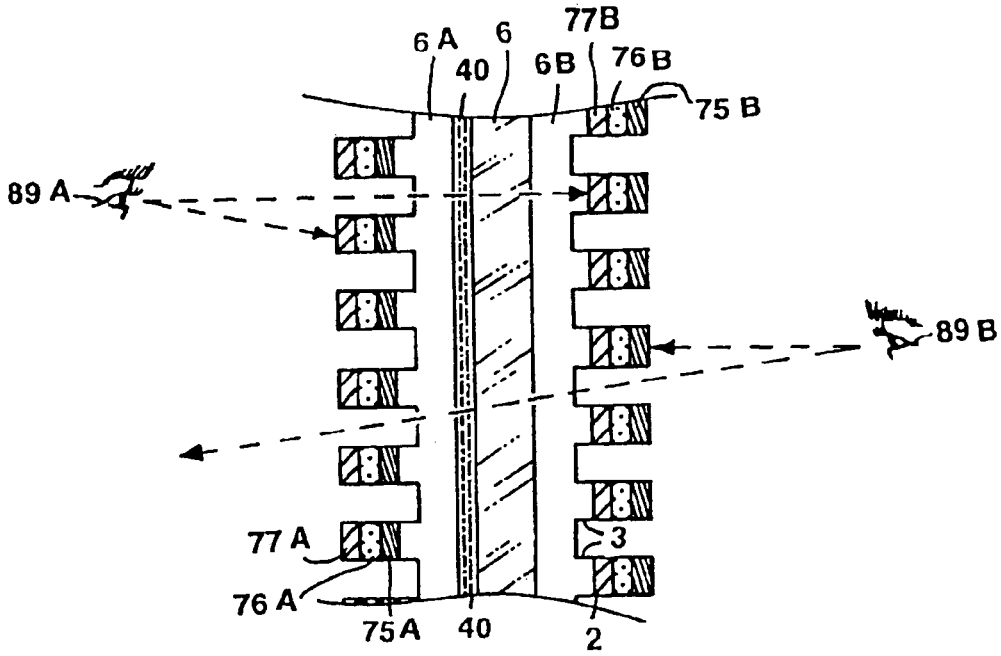
FIG. 41A i a combination of a glass see through surface together with two transparent substrates such as film or rigid plastic attached via adhesive on one side and static or heat attachment on the other and with images aligned such that from one side full vision is obtained of the image whilst from the other side it is possible to see through the structure at certain angles.

FIG. 41A shows application options which include using transparent bases 6A, 6B, which have been manufactured with edges 2 to determine perimeter walls 3, to cause alignment of coatings in a required pattern. The construction from left to right shows coatings applied to a see through base 6A which has been applied with an adhesive 40 to a see through surface 6 which is a window. The second base 6B has been applied by an alternative process such as electrostatic cling attachment, heat transfer, or other methods of attaching the base 6B to the see through surface 6. Typically, the see through surfaces may be glass or plastic, according to the required installation or combination of any materials. An observer 89A will see a complete image which has been manufactured such that a combined image made up of two halves, in this example, or two portions of unequal relationship, such that a portion of the image is located in the coating 77A and the remaining portion of the image is in the coating 77B. When viewed from a position 89A the viewer does not see through to the opposite side of the see through surface 6, 6A, 6B, but sees a complete image made up from two halves, which were independently produced using bases of compatible size and configuration. This means that the observer 89A sees a complete image, and is not conscious of the existence of the see through surface or of the observer 89B, or any other view on the other side. Alternatively, observer 89B may, because of light absorption of the black coating 75A and 75B, have angular visibility through the see through surfaces 6, 6A, 6B, and the joining adhesive 40, so as to allow visibility through the entire structure at certain angles to the opposite side. This will prove useful in many applications including security situations where it is desirable that the observer 89A is not conscious of surveillance from observer 89B. The use of combined coatings on opposite sides of a see through surface are well known in the art, but it has hitherto been almost impossible to create regular and precise alignment due to minor irregularities in printing. Even when using the photo stencil process from a common artwork, it is not possible to regularly precisely align two separate substrates with the same pattern. This is due to variations in screen stretchability if screen printing is used, or various temperature differentials from one day to the next, all of which cause small movements in the positioning of the required pattern, such as a silhouette pattern. Therefore using the teachings of the present invention, it is now possible to precisely produce matched bases, or to use a common base as a transposition means to other materials, such as transparent films, to produce the unique processes and products as taught in this embodiment.

Figure 41B:
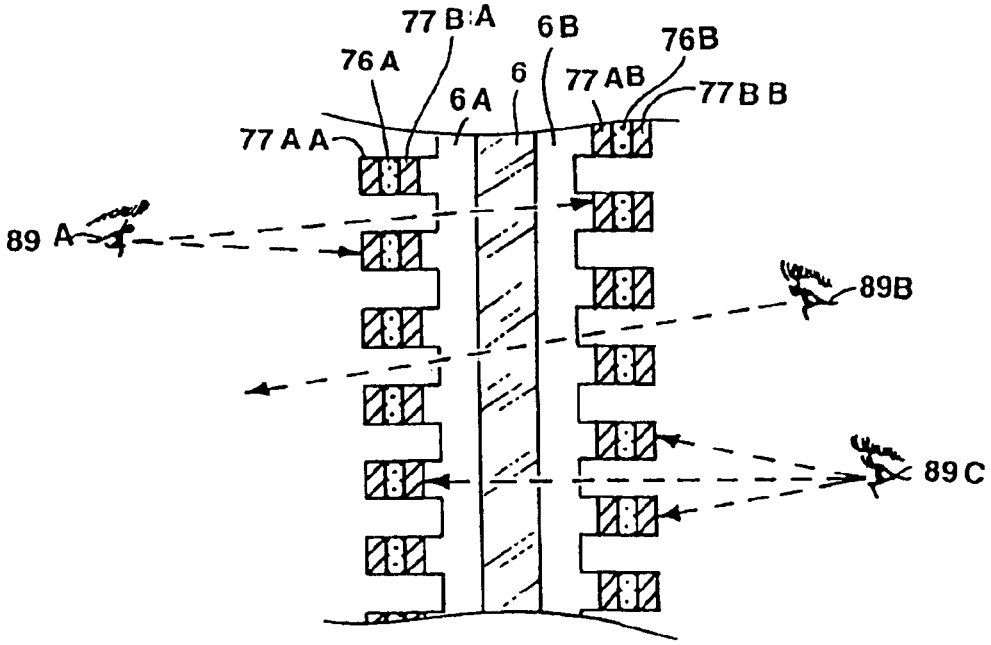
FIG. 41B is a similar concept as FIG. 41A except that the images are facing in two directions or there are two different images facing in opposite directions such as to make vision possible in certain light conditions in one directions whilst making horizontal visibility through the material in the other direction virtually impossible.

FIG. 41B shows another embodiment of the constructions possible with the present invention such that observer 89A can view a complete image that was produced separately in two portions comprised of images 77AA and 77AB such that the observer does not see through to the opposite side of the see through surfaces, but sees the complete image made up of two or more portions. It is also apparent that the see through material 6A and 6B which was attached to either side of the see through surface 6, typically a window, could act as bases such that the coatings were applied in register to each other on the glass or window surface 6 and that the see through surfaces 6A and 6B were not required on either or both sides of the see through surface 6. This would be readily accomplished using the teachings of the present invention, or combination thereof. Observer 89B could selectively view the opposite side of the window at certain angles which are controlled by the relevant positioning of the coatings, with or without the base or bases on both sides of the window. Observer 89C would see a complete image, which would be composed of coating 77BA and 77BB. The images comprises of 77A and 77AB may produce an image which is identical to or quite different from the image comprised of coating 77BA and 77BB. In addition, any of the illustrating figures could incorporate the control of energy or radiated heat from the sun or lighting control by the selection of and positioning of coatings on one or both sides of a surface, with or without images.

Figure 41C:
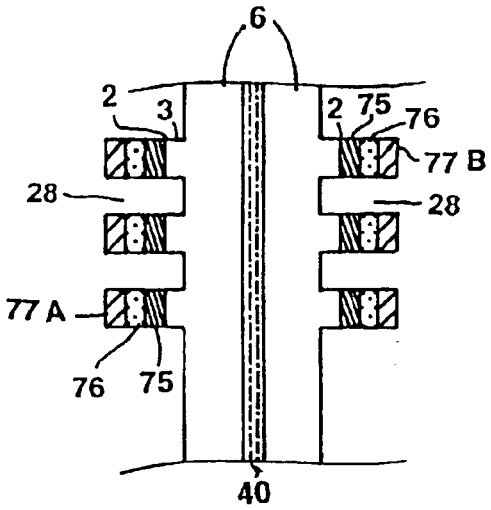
FIG. 41C is two see through surfaces joined together with one identical or two different images facing in opposite directions.

FIG. 41C shows a combination of two see through surfaces 6 attached together as either a laminate step or with adhesive 40 and in this example, both the see through surfaces 6 may have been transparent bases which were subsequently bonded together with the adhesive or other bonding means 40 such that the perimeters 3 created an edge 2, and permitted the addition of black coating 75, a while coating 76, and a color coating 77A and 77B to produce one way vision indicia. The coatings to the left and right of the joining material 40, are in reverse orientation such that the image 77A may be different to the image 77B, or alternatively both images may be identical and yet the material still retains numerous light passages 28 to allow one or two way visibility according to the light levels. The effect of changing these light levels is known to have been used since the early part of this century or earlier to differentiate two sided materials with indicia in different light conditions.

Figure 41D:
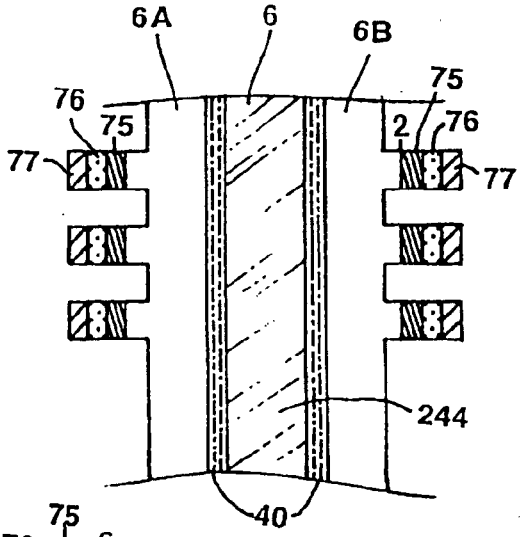
FIG. 41D is two different transparent surfaces, adhesively attached to a see through surface with one or more images facing in one or both directions.

FIG. 41D shows a structure comprising a see through surface 6, such as glass, which has had material 6A and 6B respectively attached to opposite sides of the see through surface 6 using an attachment means such as an adhesive 40. It is assumed that the see through material 6A and 6B may have had images transposed to them or may have been a base as taught in the present invention, whereby coatings which are black 75, white 76, and indicia or color images 77A have been respectively applied on the edges 2 of the materials 6A and 6B respectively. In this example, visibility is also possible through both sides of the material, but it is possible that either material 6A and/or 6B may be individually or separately removable, or both may be removed from the window 244 sometimes in the future if a removable style attachment means 40 was selected. This makes is possible that if one material such as 6A was removed first, then the one way visibility would be easily facilitated from the left to the right side. If, however, material 6A remained in place and material 6B were removed, then one way visibility would be more easily facilitated from the right side whilst the image 77 would be more visible from the left side. Obviously, many other combinations of results may be obtained including the changing of one side of the material to change its image or alternatively to replace one side of the surface with another image that may line up an combine to produce a complete indicia from one or both directions, such as the example is taught in FIG. 41A or 41B.

Figure 41E:
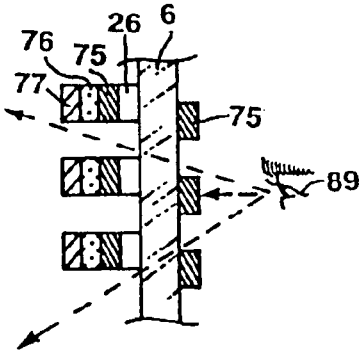
FIG. 41E is the use of multiple coatings on one side of the see through surface and the precise positioning of a matched spacing coating partially offset on the other side.

FIG. 41E teaches the use of multiple coatings applied to one side of a see through surface 6 and a black monochromic coating 75 positioned on the opposite side, in a particular location, such that an observer 89 would not see through the black coating 75 but, in this example, would be able to see upwards and downwards at angles determined by the geometry of the coating thicknesses on one side, the thickness of the see through surface 6, and the size, positioning, and thickness of both the black coating 75, and the coatings 26, 75, 76, 77 on the opposite side.

Figure 41F:
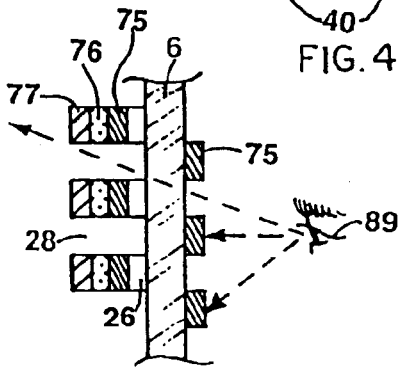
FIG. 41F is similar to FIG. 41E but the coatings on the right side are placed directly in alignment with the light passages of the left side.

FIG. 41F shows a similar construction to FIG. 41E but where the position of the black coating 75 has been positioned to prevent horizontal visibility through the light passages 28, but permits visibility at an upward angle in this example, but prohibits visibility at a certain downward angle. The angles are determined in accordance with teachings described in FIG. 41E.

Figure 41G:
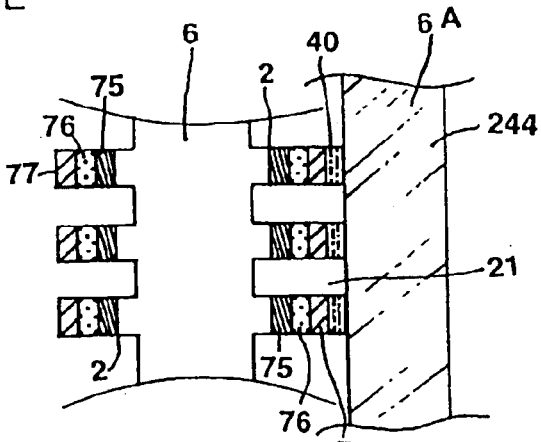
FIG. 41G is a transparent or opaque base with plateau edges on both surfaces, with images on both surfaces, then attached from one side to a see through surface. This produces two way vision and dual images on an independent base together with encapsulating air in the light passages between the see through surface of the base.

FIG. 41G shows a transparent base 6 which was constructed with coatings on two opposing surfaces, such that the orientation of the coatings 75, 76 in this example shows images 77 facing in both directions left and right, in this cross sectional example of the material 6. The structure 6 comprises two sides and two sets of multi coated indicia, alinged on a plurality of edges 2. The construction 6 has been attached on one side to a see through surface 6A which may be for example a glass window 244, using, in this example, an adhesive attachment means 40. The construction causes the encapsulation of air or gas 21 in the space between the transparent base 6 and the see through surface 6A. In normal situations, this may be the natural air mass at that location, or if in a controlled environment, may be a specific gas which responds to certain environmental or energy conditions such as to cause changes for any particular purpose. Further, the encapsulated air or gas 21 in the cavity can act as an insulator against heat, light, or other radiated or transmitted energy. In the same manner, the air or gas chamber 21 may be at least a partial vacuum such as to improve insulative qualities by reducing transmittance of energy through the non existent, or reduced quantity of, air molecules. The use of indicia is not necessary to this construction, and the indicia 77 may be a reflective coating on the outside and an image on the other, or other orientations any of these or other coatings.

Garage doors can be fitted with changeable sections which, by day can be seen out through but not seen into the garage from the outside, and by night can be made opaque, using changeable coatings such as polymers, liquid crystal or others. The chargeable substances can be controlled automatically, such as by a garage door opener, or manually. This provides controlled vision for safety so that the door is not opened if someone or something is in the way of the door or in the driveway.

Other uses include boats where windows can be heat reflective during the hot day and yet transparent from the inside by day and/or by night; observation windows in prisons; retail store; factory surveillance; government departments such a the post office; viewing windows for places such as hospital operation theaters and other observation galleries to avoid distraction to people on one side whilst allowing visibility from the other; office petitions; opening doors; and for privacy screens, such as shower screens; and windows of apartment buildings where occupants of neighboring buildings would otherwise see in.

It should be apparent to one versed in the art that a coating applied to see-through surfaces for the purpose of vision control would also provide a reduction in energy transmission through the see-through surface such as heat radiated from the sun or heat or cold conduced through the surface of the material or reflected from the surface of the material. The use of a decorative image would also affect the reflect the reflectivity of heat and also reflect or reduce the amount of transmission of light under different embodiments of the present invention.

By creating an internally reflective surface, or a light reflective thin film coating on the side of the light chamber opposite to the side of the coatings, it is possible that when the light is illuminated, it is not possible for persons on the coating side to see through because of the reflective coating combined with the reflected light coming from the reflective surface on the side opposite the coating side. Various combinations thereof including partial coatings, partially covered coatings, dual sided coatings, edge coatings, perimeter illumination or multiple sections of illumination, to contain the light within the light chamber area, together with the light source, may be used to create certain effects.

The application of a mirrored film, which is partially transparent, but mostly reflective from one side and partially transmissive from the other, would also enhance this effect. Light chambers could be applied for coating or after coating or between other structures to which the light chamber construction is applied.

FIG. 41A shows a perspective view of a transparent material 26 to which indicia 8 has been applied and as an example of indicia, a multi colored image 77 is visible on the upper surface.

Figure 42A:
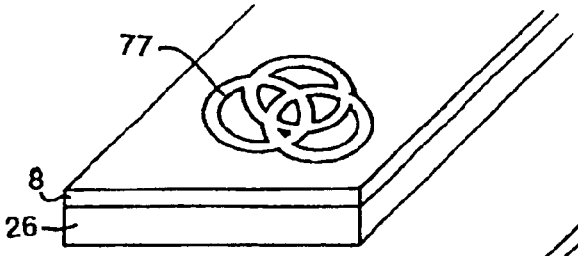
FIG. 42A is a perspective view of a structure where the three interlocked circles are illuminated from within and by one of the layers of the construction such that they are the only visible illuminated indicia from the top.
Figure 42B:
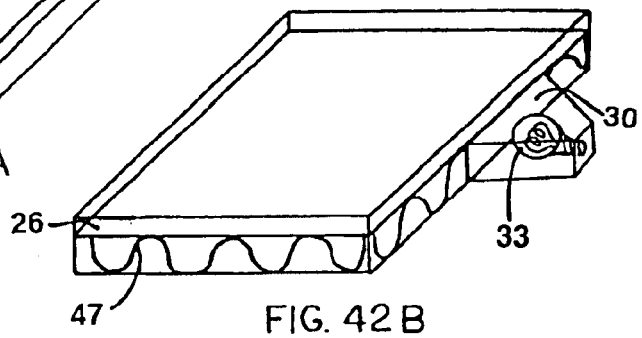
FIG. 42B is a light chamber comprising a substantially transparent layer together with an external light source illuminating one of the layers. The illumination can be contained by an exterior reflectorizing treatment and an opaque coating so that the light is available within the structure to be visible externally through one or more coatings layers or to energize light retentive coatings such as fluorescent inks.

FIG. 42B shows the additional treatment of a light chamber 30 which is provided with light from a light source 33 and the light chamber 30 is substantially surrounded by a reflective coating 47 such that the transparent material 26 can receive light. This type of construction has hitherto been used in illuminated signage commonly found in restaurants at menu boards, and is known as edge lighting. However with the additional improvements of the coating techniques taught herein, it is possible to take this base material and produce new and unexpected improvements.

It is also possible that when the light is off, it's possible to see through light passages in the coatings or when the light is on, to make it more difficult if not impossible to clearly see through the base material, such as at night.

Figure 42C:
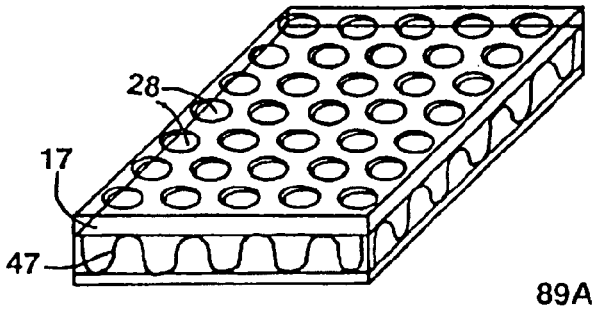

FIG. 42C teaches the addition of an intermediate or final surface 17 comprising a plurality of light passages 28, such that the light from the light chamber, and reflected from a reflective coating 47, can transmit through either the holes, if they are either empty or if the light passage 28 have transparent coatings in them, or alternatively if the light passages 28 are in fact holes which are made opaque, any illumination may transmit through the material 17. It is also possible to have tow images in this constitution whereby the surface of the material 17 is covered with an opaque visual indicia, and the light passages 28 allows transmission of light when light is illuminated. Thus, a different pattern of colorings in the light passage 28 would become apparent when the structure was not exposed to outside light, and the sole illumination came from then the light chamber through the light passages 28 and if some transparent type coating were used in the light passages 28, then visible indicia would become apparent.

Figure 42D:
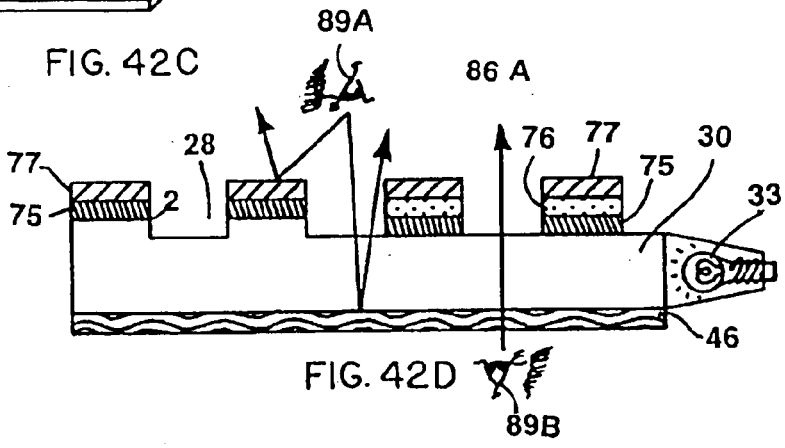
FIG. 42D is a cross section of a light chamber, where a viewer on the one indicia side has light reflected from the mirrored layer and the indicia, while the viewer on the other side sees through the reflective coating and through the light passages.

FIG. 42D shows a cross section of an example structure made with this embodiment, whereby the light source 33 is illuminating the light chamber 30 from an exterior position, but the light source may be contained withing the light chamber 30 as required. An observer 89B is able to see through the light chamber 30 in a direction of observation 86A such as to view objects on the opposite side of the structure, even though the structure is illuminated. This is possible if the reflective liner or coating 46 permits a degree of light transmission from the position of observer 89B whilst providing a higher degree of light reflectance to observer 89A. This is easily obtained using existing products such as one way mirror film, or reflectorized or metalized coatings which provide a controllable degree of transmittance from one sided and reflectance from the other. The example coatings to the left of this figure show a black coating 75 and an indicia coating 77 aligned on an edge 2 and when multiple coating sectors are provided, light passages 28 may become available. The observer 89A is viewing the indicia 77 and also having a degree of reflected light become apparent from reflective liner type material 46. When the light 33 is illuminated, light would also transmit through the light passages 28 to become visible to observer 89A. If the coatings are at least partially transparent, then observer 89A will see colored indicia in a backlit effect together with a reflectorized image. To the right hand side of FIG. 42D, the coatings, including the white coating 76, were not built on an edge 2, but were transposed under the teachings of the present invention or transferred as known in the prior art.

Fiber optic light transmitting layers, which could be fibers layered into the surface in any direction, or directions, can terminate light inside or on the surface of the multi-layered coatings. The fiber optic material, whether it be circular, cylindrical or planer, or with a rectangular cross section or square cross section, such as to diffuse light, may be formed or applied against an edge of the material. The fibre optic material may become the base which would then diffuse light through a particular coating, some of which would be opaque or transparent or translucent.

Figure 42E:
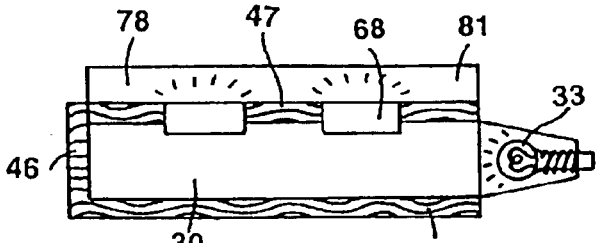
FIG. 42E is a light chamber with inks responsive to light such as fluorescent inks or partially transparent inks where the color can be absorbed into and transferred through the ink or simply illuminate through partially transparent inks or transparency type coatings to produce a backlit effect.

FIG. 42E shows a cross section of a light chamber 30 which is provided with an illumination from a light source 33, in this example exteriorly of the light chamber 30. Surrounding one or more perimeters of the light chamber is a reflective surface of material 46 which may be comprised of a vapor deposited metalized surface, a silvering treatment such as a mirror, a reflective film attached in a variety of ways, a dipping process to coat the light chamber 30 material, and other means. A coating aligned in one or more cavities can incorporate a fluorescent coating 68 or any other type of material which may respond to, transmit, or read to the light entering the light chamber 30 from a light source.

Alternatively, the reflective coating 47 may be printed using the techniques of the present invention, and the coating indicated 68 may in fact be a cavity that allows light transmission through a transparent upper surface, which can be a transparent coating or material 81 or may be a protective coating 78, transparent or translucent laminate, or any other material. It is envisaged that if a liquid or flowable coating 68 were used then the upper protective material would be of a solid and generally non porous construction such as a laminate 45. Using two or more light responsive coatings 68 or reactive, reflective, refractive on top of the coating 68 or as a complete upper coating to fill the holes presently occupied by coating 68, it is possible for light to transmit from small openings and yet to diffuse, refract and the like through one or more coatings to provide unique pattern. If the upper surface of the example material 45 had been coated with a pattern comprising any feature to restrict or prohibit transmission of light in portion of it, patterns and other visual indicia can be created without the light source being readily apparent. Also, structures comprising one or more layers or coatings can produce multi-layer reflectivity. The term "multi-layer reflectivity", or similar, as used herein, includes, but is not limited to, any two or more layers or portions of layers in or as coatings where one or more of the layers may have different amounts or directions of reflectivity, may have different rates of reflectivity and may retain some light transmissiveness, may provide for a total barrier to all energy, thereby reflecting any and all energy sources, may selectively allow transmission of one form of energy, radiation and the like, while restricting in whole or in part other types of selected energy radiation and the like. Also, multi-layer reflectivity includes layers which are bounded by reflective surfaces, such that radiated energy, such as light, is retained within that particular coating layer and is not transmitted out except in desired positions, methods, frequencies or quantities. Numerous uses may be made of constructions combining features of the present invention and, by way of example, the use of photochromic coatings as part of the structure. Alternatively, uses of any of the examples or embodiments of the present invention may be enhanced by the use of laser film which typically is a polyester, metalized film and treated by laser type radiation so as to create unique visual reflective and refractive multi-colored patterns. The use of this technique is well known, but combined with the ability to control light as shown herein, it will be possible to create many unique images with different appearances at different angles, depending on the direction of the transmitted light.

Figure 42F:
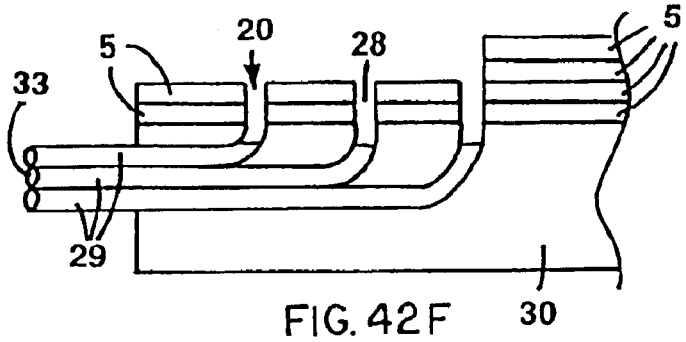
FIG. 42F is a cross section view showing multiple fiber optic fibers entering a base and reaching the surface at the perimeters of coating areas or between the perimeters of coated areas and with different levels and types of coatings on different portions of the base or final surface.

FIG. 42F shows a cross section view of a structure comprising directional and controllable light, as compared to the light chamber 30 of FIG. 42E such that a fiber optic structure 29 may be used to transmit light from the light source 33 into a hole 20 or light passage 28 or other situation, such as to be behind or in close proximity to transparent, semi transparent or translucent coatings or materials. The term "semi-transparent", or similar, as used herein, includes, but is not limited to, materials which are either partially transparent over all of the area, or partially transparent over portion of the area, or other combinations whereby portions of the material may be at least partially transparent, portion of the material may be opaque to the visible spectrum and a portion of the material may be transparent or translucent, or any combination or one or more of these effects, whether with visible light or non-visible radiation, or a combination. The use of fiber optics is well known in the art for transmittance of light from one source to another location and in this construction, coatings 5 may incorporate any one or more coatings on a perimeter such as to provide alignment control, and the fiberoptic material, typically of a round cylindrical shape, may also be used to create perimeters in a variety of construction techniques. These perimeters may be used to align coatings 5. By recessing the ends of the fiberoptics 29, in the hole 20 it is possible that the illumination source is only visible where an observer is directly in front of the material and is able to see into the hole 20. Using the end of the fibers as a coating surface and the edges of the end of the fibers as an edge or perimeter as defined herein, it is possible to print coatings, typically partially transparent, at the peripheral or end of the fiberoptic structure. With control of the light through the fibers, well known in the art, it is possible to generate indicia and other visual information in a decorative and interesting manner.

Figure 42G:
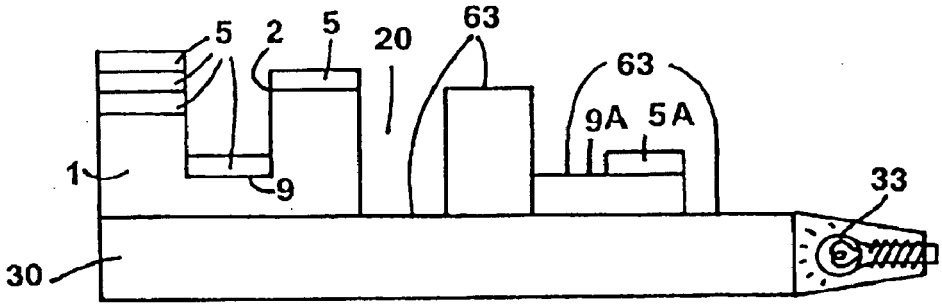
FIG. 42G is a cross section view showing surface and sub-surface illumination in different areas of the material such that different types of images reflecting and transmissive coatings, light shields and other form of coating can be on one or more levels of one or more surfaces surrounding the light chamber.

FIG. 42G shows a composite structure with examples of options of elevated coating surfaces 9 and 9A as part of a base 1. The base 1 may also be considered to be an intermediate or final surface. The light source 33 can provide illumination to a light chamber 30 such that light will be available within the structure, and may exit the structure at illuminated area 63, but coatings 5 may be of any type or combination to either restrict or stop light transmission from the light chamber 30. For example, if coatings 5 were opaque, then any indicia on the front of those coatings would be visible in natural light and not be backlit. Alternatively, if one or more of the coatings 5 were of a partially transparent ink, then the light in the chamber 30 would transmit through those coatings to provide the effect of backlit illumination. Where no coatings exist, an illuminated area 63 could project light beams, and these light beams may be directionally controlled where the side walls of the hole 20 provide directional visibility. The base may have different levels in its construction, and may also have a coating 5A over a portion of a coating surface 9A such as to permit partial visibility through that coating. The use of an edge 2A would limit one perimeter of the coating 5A and thus provide alignment.

Figure 43A:
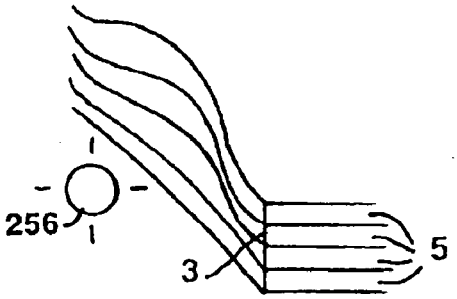
FIG. 43A is an edge with multi-coatings modified by an external source such as heat, light, radiation, or other sources, to cause deformation of the edge.

FIG. 43A shows a multi layer structure comprising one or more coatings 5 where a perimeter edge 3, at least in one direction, has been exposed to a radiation source 256. The radiation source may be heat, light, or any other type of radiation such as to cause a change in the edge surfacing of the coatings 5 where exposed to one or more types of radiation. The pattern, type, and frequency of radiation, together with the selection of the types of coatings, can produce precise results, and form the edge of the coatings in patterns accordingly. It is also possible that only one or more of the coatings may react to the radiation source 256 and change individually. Also, it is possible that only a portion of a layer of coatings react to a radiation source or outside influence and therefore only the appropriate portion changes its shape, configuration, appearance, or other such examples of change, and can then provide identifiable differences.

It is possible to also create a precise edge using precision, mechanical, or other cutting means such as laser. When using laser it is possible for the light frequency to have particular effects on one or more coatings to further provide security identification. The angle and effect of the laser can provide microscopic surface treatments unique to the particular manufacture, which are visible when magnified, and which can extend beyond or remain within perimeters of one or more coatings.

Figure 43B:
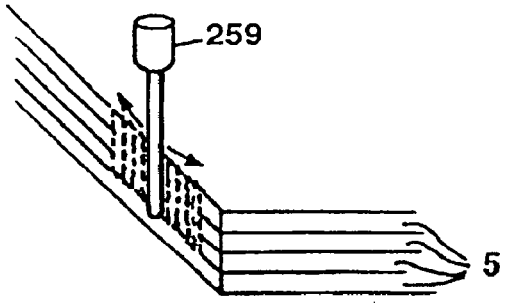

FIG. 43B shows a similar construction of coatings 5 which are being exposed to a laser 259 such that the laser beam is being scanned in a particular pattern or movement direction so as to create a unique treatment of the exposed edges in the coatings 5. Also a laser may scan an upper coating or be used to penetrate through certain coatings or layers to cause damage in the subsurface construction such that an upper coating or a coating in the subsurface environment changes color, shape, or conformity according to the radiated energy from the laser 259 or other forms of radiation for particular purposes. The term "sub-surface", or similar, as used herein, includes, but is not limited to, means partially or completely below the normal surface of the material or contained completely within the material. All of these treatments create unique patterns in the finished or partially finished product, and offer numerous advantages in terms of identification, non repeatability, security, and many other uses of this present invention, whether singly or in combination.

Figure 43C:
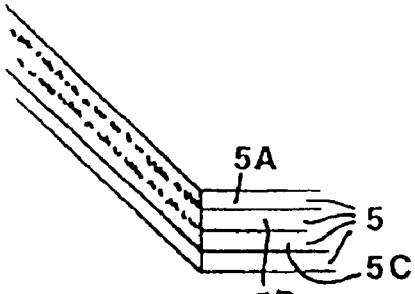

FIG. 43C shows an example of coatings of any type 5 which were selected such that coatings 5A and 5B would interact with each other and where coatings 5B and 5C would also inter-react with each other. It is possible that if coatings 5A and 5C were brought into close proximity, that they would also cause an interaction between the coatings, or it may be that 5B acts like a catalyst to cause reactions with coatings 5A and 5C at the same time. These reactive effects may be caused by numerous methods including, for example, chemical interreaction, or the reactions may be triggered by some outside source such as acting radiation or other energy, or may be triggered by changes in temperature or other causes.

Figure 43D:
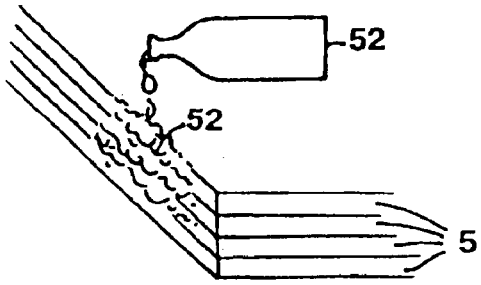

FIG. 43D shows similar constructions of multi layer coatings, where the exposed edge of coatings 5 are being affected by some chemical 52 reaction, such as acid, which causes reactions or changes in the surface texture, construction, or other readable or visual changes. By selecting one coating different to the others, it is possible to have a coating that is, for example metallic, which would when exposed to a reactive substance, for example acid, change only that coating and cause it to recess till the reaction of the acid was dissipated by its activity with the metal coating. All of these can produce identifiable effects, which become very difficult to replicate, and would also be very difficult for a counterfeit to try to determine the methodology used to create the unusual effect invisible to them. If a coating was selected where the surface changed texture as a result of the chemical reaction, then the changed texture result may be impossible to reverse engineer without knowing the composition of the original coating and the reaction that caused the surface change. All of these methods produce identifiable materials which are difficult to replicate or duplicate. Any of these edges forming part of the teachings of the present invention may, where necessary, incorporate substances as coatings which are very difficult to hold or retain in alignment. An example would be very thin liquids or other substances which may migrate from the coating position to an alternative position, whether quickly or over time. Therefore, any edge or coating edge may have been made using known techniques and some form of cutting such as die cut, laser, shearing, and the like, may have been used to realign an edge or to create an edge in any one or more structures. The edge could have been made at an angle by angling the cutting device, or in any other pattern or texture required. Cutting may occur through one or more sides of the structure, or through any coating or coatings such as to weed out any coating layer, whether it be on an edge or in some other part of a structure or material.

Figure 43E:
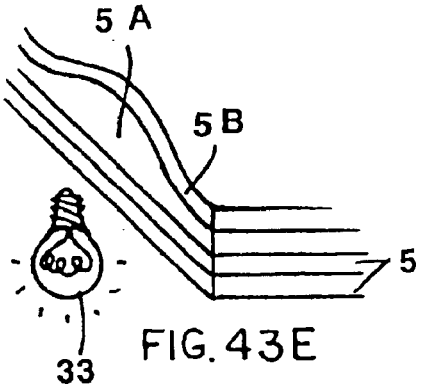

FIG. 43E is an example of a multi layer construction comprising one or more coatings 5 where at least one particular coating responds, in this example by expansion, when exposed to light 33 or actinic or other radiation such as to cause deformation of itself, and any other coatings which were in proximity and flexible enough to change shape with expansion of the particular coating 5A. It is possible that the coating would only change in exposure to light, and that where the coating was not exposed to light it not expand. Therefore, the light source could be above the upper surface of a planar structure and assuming the coating 5A was the second coating from the top as shown on the example of FIG. 43E, and if the top coating 5B was partially transparent in some areas and opaque or partially opaque in others, and the entire surface was exposed to a source of radiation such as a light source, then the coating 5A would distort and expand under exposure in proportion and size to both the area of exposed coating and may also respond to the duration and intensity of the radiation such as to cause a precise upper surface pattern to develop, whereby the upper coating 5B would undulate due to the pressure of the expanded coating beneath. It could be possible to print a structure whereby the opacity and transparency were controlled, and subsequent exposure could create, for example, raised lettering or other indicia, to provide a positive identification of the document or material, or for advertising or other purposes.

Changeable coatings on surfaces or inside structures include coatings which soften, swell, contract, expand, or other responses under radiated force such as microwave or some other radiated energy or heat, or pressure, or vacuum or combinations thereof to produce a change in a visible or invisible layer.

Materials such as documents, certificates and the like, can have a hidden coating and/or visible layers when viewed from an edge or other position for identification purposes. By printing particular types of layers in certain sequences it is possible to use various identification means, including hidden identifiers and readable, but normally invisible, identifiers to determine if the particular coating was printed by the person or organization who has an interest in the coated object. For example, one particular coating may be overlaid with a coating which is visible only in ultraviolet light which may be followed, for example, by a metallic coating of a certain type, silver, gold, aluminum or other material which may be followed by a phase change or other thermochromic, electrochromic or photochromic ink and other coatings, as desired.

Figure 44A:
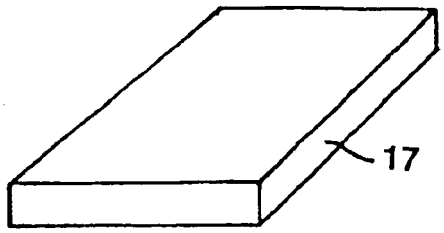

FIG. 44A shows a base or intermediate or final surface 17 which, from the exterior, displays no identifiable indicia. It is also possible that one or more surfaces of this material may have a superficial indicia visible to the naked eye, or other means, but that indicia concealed within is not readily apparent.

Figure 44B:
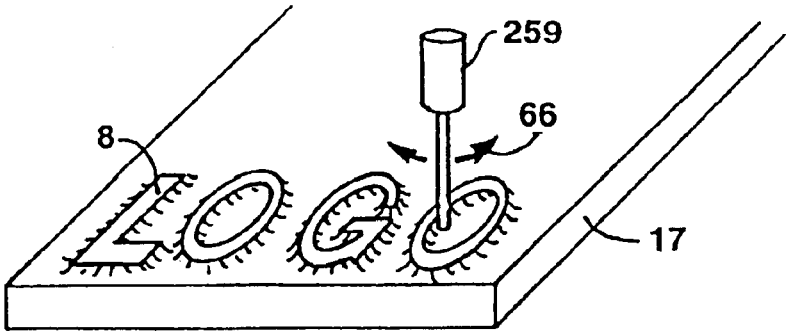

FIG. 44B shows the same material being treated from an external source of energy, such as a laser 259, whereby the laser may scan or otherwise project light onto the surface in a direction of movement 66 such that the previously indicia 8, in this case the word "LOGO", becomes visible as the surface material is encoded. The indicia 8 may be formed of a substance which does not dissolve, dissipated, or otherwise under the laser 259 while the surrounding structure of the material 17 is removed or otherwise affected. Apart from laser, there are numerous other radiation sources or treatments which could reveal an indicia which was previously not visible or apparent to normal inspection.

Alternately, a metal or epoxy coat may be placed over a partial internal or partially internal substance which is an ink or other readable indicia, beneath which is a solid x-ray proof non-readable, non-scannable base or coating, so that, for identification purposes, the upper layer can be abraded off by mechanical or other means, friction, sanding, and the like, to expose the indicia trapped between the two layers. As radiation shields, the present invention can use small holes in a larger open area to reduce radiation but not eliminate it.

Figure 44C:
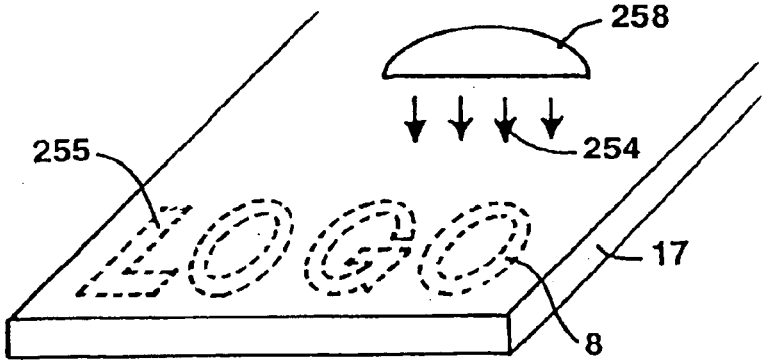

FIG. 44C shows an alternative whereby the same example structure material 17 is being subjected to an alternative example radiation source such as x-ray 258 such that an example of radiated energy 254 is able to reflect or transmit through the material and the indicia 8, in this example "LOGO", becomes apparent to a sensing means. As an alternative, the indicia "LOGO" may be a reflective material 255 such as to reflect radiated energy back to the source or receiver. There are numerous choices of materials and scanning, radiation and other sensing means to determine the presence of the indicia 8. In this embodiment, the indicia remains concealed throughout the entire process and is not visually apparent.

Figure 45A:
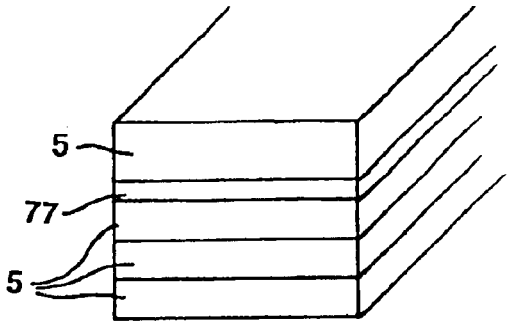

FIG. 45A shows a multi layer structure comprising one or more coatings 5 together with one or more multi colored indicia coatings 77.

Figure 45B:
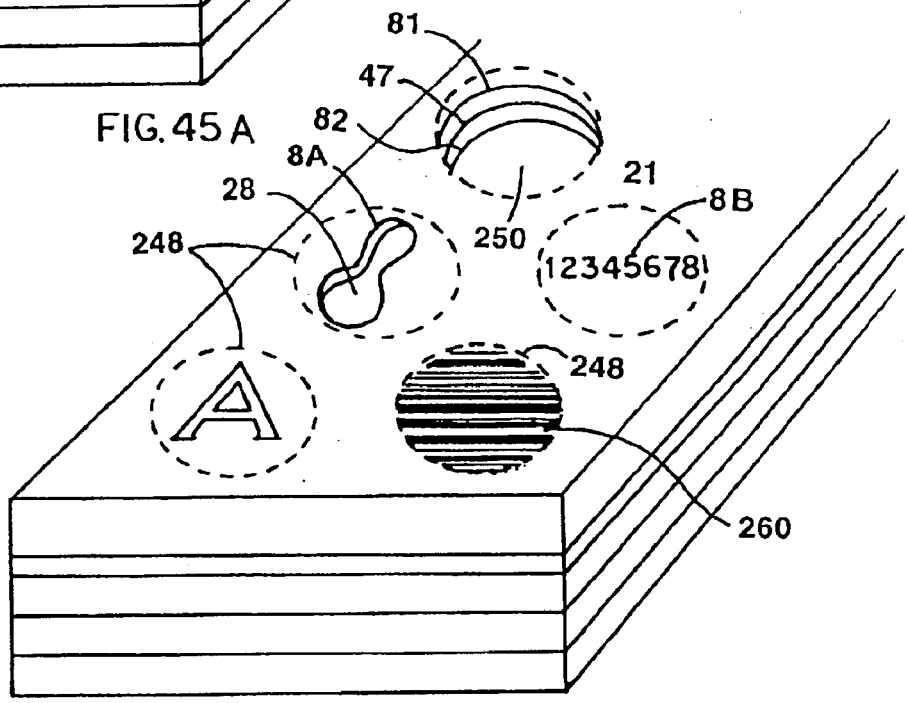

FIG. 45B shows a series of "cutaways" 248 which are intended to illustrate the coatings concealed beneath an upper surface. Various examples include indicia 8A, a bar code 260, numerals "123456" as indicia 8B, an unusually shaped light passage 28, a reflective coating 47 contained in a subsurface condition between a transparent coating 81, which would permit "readability" of the reflective coating 47, and an inter-reactive coating 82 which may respond to certain types of radiation. The cavity formed by this coating in the subsurface, and the perimeter upon which it was printed can incorporate an air or gas chamber 21 which may contain a unique, gaseous material which is responsive to radiation or which changes its composition due from influence to outside energy or other forces. The floor of this cavity may be an opaque material 250 such as to limit radiation. There are numerous other combinations of which these examples are only intended as a guide for the innumerable possibilities for structures, coatings, or materials which may be concealed within a structure, and yet are manufactured in alignment to provide recognizable and readable, whether by artificial or other sensory means, information and identification.

FIG. 46A shows a cross section of a base 1 which has been backed by a vapor deposited coating, or other means, to make a mirror surface or mirror film 83 and coatings 5 which, with alignment, create either holes 20 or light passages 28 if the base material was transparent. Also, the base may be an intermediate or final surface. The coatings 5 may have been transposed from another base or other material.

FIG. 46B shows a similar construction with a base 1 comprising edges 2, where the edges define the perimeters of either a cavity 20 or light passages 21. The coatings 5 are applied on upper surfaces defined by edges 2, and a metalized layer 70 has been selected to provide reflective means.

By manufacturing a web material or base with coatings varied over different portions of the web or surface area, it is possible to create two directional mirrored effects by having a metalized coating on, say, the one half and not on the other half of the web after separation. When made into a one-way vision product, a mirrored coating becomes a mirrored surface while the other half is a matt surface or has other coatings.

It is possible after building up layers of coating on the base to apply a solid liner of transparent, opaque, part transmissive or other material such that the coating can be separated from the base and be transposed, using a solid liner, to the final surface. The solid liner may be a temporary liner to carry the coatings from one base to another or from one base to a final surface and may also be a protective laminate or other material which stays with the coatings after application to the final surface.

FIG. 46C shows an alternative whereby the base 1 has had printing surfaces created such as to elevate the coatings well above the surface or a reflective liner 46. The reflective liner may be intended for attachment to see through surfaces and any adhesive or other surface coating or treatment present on material 46 can be protected by a solid backing liner 44. The observer 89A, located generally in front of the surface of the material, will have visibility reflected in the holes 20 from the reflective surface of the material 46 such as to be not readily able to see through the structure or the light passages 28, and would see a combined image of any indicia applied to the coatings 5, which would be visually combined with the reflection from the mirrored surface. However, observer 89B, located at a small angle at the plane of the material, would not see the mirror film, but would see the indicia or other images or patterns and the like of coatings 5. Also, such constructions can provide, a colored indicia on the coatings 5 which may be matched with or different from the color or reflectivity or effect of the material 46. If this construction was used on buildings, whether mounted inside or outside the glass, then it would be possible to reflect heat and other radiated energy and yet to present an indicia, such as a colored surface to observers such as 89A and 89B, from the exterior of the building.

FIG. 46D shows a cross section view whereby a base 1 has had four coatings 5 applied to a surface. Attached to the base 1 can be another intermediate or final surface 17 which may be a material for any purpose, and that structure can be attached to a rigid plastic 245. There are many uses for rigid plastics, including one way vision and see through surface applications where the plastic is colored or partially opaque, and for advertising and/or other uses. In particular, such a construction could be used to provide two or more functions, such as soundproofing and control of visibility, or soundproofing and glare reduction, such as from oncoming traffic, in proximity to roads and highways.

By building a motion or other type of sensor in one or more coatings or structures, it is possible to activate external or internal effects, such as to illuminate the structure, or send control signals through or between the coatings, for numerous purposes.

If a metal coating layer is present, and can conduct electrical flow or be used in conjunction with the measurement of capacitance or resistance or similar, and the coating is broken or otherwise modified, the coating can form part of an alarm or other system providing one or more functions. As an example, in manufacturing, a breakage in a machine or process may be detected by this means. Such a structure may also be used to provide warning or notice of internal failure in equipment, before the problem with the part, machine or equipment and the like becomes apparent from visual inspection. A similar structure may also give indication of stress or distortion beyond certain limits, which may crack or break a thin conductive coating.

FIG. 46E shows a construction of a similar type to FIG. 46D except that the base 1 had an elevated coating surface defined by edges 2 and incorporated a translucent material 251 attached to a intermediate or final surface 17 to provide a degree of light transmissive control, and that structure was in turn applied to a glass surface 244. Such constructions can be useful for light filters, to keep down glare to improve privacy, and yet to provide visual colors or other indicia on the surface of the coatings 5, whilst restricting or prohibiting visibility into a building, and yet permitting a degree of light transmission.

FIG. 47A shows a multi sided structure on a pivoting axis such that the structure may rotate, for example, in the direction of movement 66 or the reverse, and with multi sides may provide various indicia and/or different control of light transmission. Similar structures may be used to present different indicia, but the current invention allows the formability of a structure of any shape, including circular, squared, curved walls, and any other structure including triangles and the like, which would produce different optical effects. Rotating signage of three sides has been commonly used to create billboards with three messages changeable by rotation of the triangle. The present invention produces the ability for finely registered patterns, which have degrees of light control such as indicia 8, may be visible from one side and not visible from the opposite side and where multi colored indicia may be visible from one side, but with the addition of light passages may be apparently transparent, or see through, from the other side. Such rotatable structures permit numerous advantages over the prior art whereby it is possible to present a reflective surface to the other side in one position and yet be able to see through it, from at least one side, to rotate the structure such that an opaque panel 75 prevents visibility in either direction, to further rotate it and present an indicia on one side which is viewable through the structure from the other side, and numerous other combinations. By providing such changeability, vertical shades, mini blinds, vertical blinds and other structures which may be moved from one position to another and may be coated or constructed with different materials on different surfaces or parts of the surface, it is possible to obtain the benefits of the teachings of the present invention for numerous uses including heat control, energy control, privacy, vision control, reflectivity of energy, presentation of advertisements or other colored indicia, messages, images, photographs, and numerous other uses.

FIG. 47B shows a prism by way of example whereby one surface of the prism may be coated with one substance, in this example, a colored image 77, whilst another surface of a prism may, for example, be coated with or covered with a reflective surface, mirror film, or reflective film 46 and the other side of the prism may be transparent or opaque depending on the desired light effects. There are numerous combinations of coatings and constructions and one example is that multi colored coating 77 may be transparent, partially transparent, or translucent such that in certain lighting situations it becomes visible and if light is directed towards the prism from certain positions, the coating 46 could reflect the reverse side of the image coating 77 and may then project one or more images of coatings 77. Using optics as known in the art, it is possible that with precision printing of two layers of multi image coating 77, made from a common master but separated slightly in their placement, the prismatic design, together with selected light, types and intensities, a stereoscopic image may be produced. Alternatively, a projected or transmitted image which may alternatively create the appearance of a three dimensional image, or alternatively may be design and positioning produce a shaded image or, in an alternative construction, provide an image of apparent depth and color intensity, even whilst the colors themselves are transparent or semi transparent is possible. There are numerous examples by taking optical techniques well known in the art together with the combinations of bases and other constructions and coating control in the present invention, to produce interesting and unique constructions and results, visual and otherwise. Multiple geometric or other optically light transmissive material such as prisms may be used one in conjunction one with the other to provide effects, whereby the optics, using knowledge known in the art, and the precision coating capabilities of the present invention, permit repeated exact registration of coatings on different materials, on different parts of the same material, or in different coating layers on the same surface of the same material to provide optically interesting and unique results.

FIG. 47C shows an alternative example of an embodiment whereby a surface of single or multiple dimensions may be coated in sectors such that different segments may have unique imagery, indicia, light, effects, energy reactions, and other control features which are different from one or more other parts of the same surface. By way of a limited example, FIG. 47C shows an indicia 8 in one portion of the material whilst a multi colored image 77 occupies another see through surface 6 portion, using a design called "racetacks". In another segment, a clear area 26 and an opaque coating area 75 such as to provide a variety of visual options and other numerous combinations. If the circular surface example shown were then to be formed into a hemisphere whereby the current perimeter formed the base and the central portion formed a highpoint, then each of these coatings would remain in alignment with each other, whilst being expanded in the forming process. Alternatively, if the flat material were to be folded along the line AA, then the indicia 8 in the letter "A" would be applied against the multi color image 77. This could provide different visual effects from one side to the other of the now half circle formed by one side being folded over the other. By having the structure movable along an example axis A—A, it is equally possible to conceal an reveal repetitively certain indicia or other information which had been previously printed to cause alignment.

FIG. 47D shows one of many examples of possible structures which may provide differential control of a variety of factors including visibility, light transmission, energy transmission, privacy, heat control, and other teachings of the present invention where one side of a multi sided structure comprises a colored image 77. Another face of the multi sided structure comprises light passages 28 provided within the boundaries of a dark monochromic coating 75 which would provide a degree of light transmissiveness and the ability to see through one surface. Other surfaces may be reflectorized, opaque, translucent, transparent and many other examples of coatings, both in the teachings of this invention and those well known in the art.

FIG. 47E shows a perspective view of a multi sided, flat or multi dimensional object which may either be fixed, movable, or rotatable so as to use different surfaces of such multi sided structures, to provide a variety of uses including light control, energy control, heat control, vision control, and by way of example of some coatings which may be used in such a structure include an indicia 8, holes 20, light passages 28, monochromic coating 75, striped multi segmented structures 50, multi colored indicia 77 and numerous other coating, surfacing, and material construction treatments and choices. Also a structure may be prepared using bases which become a portion of the finished structure or via transposition means to provide identical images on opposite faces, adjoining faces, or any other surface of the multi sided structure for any reason.

Plateaus or levels on a base provide for contact surfaces for transportation via various methods, for example , heat and/or pressure. Direct transpositions are facilitated when the coatings on the plateaus are brought into contact with the end material and transposed. Also plateaus could be reusable and the end result of the coating shape would be the shape of the plateau, for example, round dot, squares, other multi-sided, or combinations of shapes, according to the desired pattern.

The surface of the base material may be treated by well known processes such as embossing whereby interesting surface effects may be created for numerous reasons, including for the simulation of other material or as light reflective, transmissive, or absorbent means when used with various available surface coatings or treatments. The structure shown in FIG. 48A produces one way vision without the need for perforating or using the photo stencil process to provide ink control.

FIG. 48A shows a base 1 comprising, in this example, a series of coating surfaces 9 defined by a series of edges 2 and perimeter walls 3. The coating surface 9 would then be used to apply coatings using any contact or transfer or other print method including screen printing, lithography, offset, electrostatic transfer, heat transposition, and the like. If the upper coating surface 9 had been previously covered with a removable coating and the material was then imaged such that the structure provided a very shallow perimeter wall 3, then the lower surfaces between the coating surfaces 9 would become the receiving surface or coatings. After coating, removal of the material on the coating surface 9 would provide an area of the base which could be used in see through or one way vision applications, or may then become a coating surface for other coatings, such as reflectorized coatings or other imaged coatings. Instead of a removable material, it would be possible to apply removable films, which would perform the same function. If a releasable layer was applied to the coating surface 9, the entire structure was imaged, and the removable layer were removed and transposed to another material, it would provide a method to produce two image materials for virtually the same cost as one. If each of the upper coating surfaces 9 and the lower coating surfaces were of approximately equal area, then the images produced could be used for one way vision applications or as parts of a matched pair which could be brought together at a future time to prove identification of the original structure. Whilst the example in FIG. 48A shows parallel ridges of material to provide a coating surface 9, it is apparent that any pattern may be used in this example. In lithography, offset and other drum or transfer offset printing processes it is possible that these misregistrations will not be visible if a plateau on either the surface of the material or on the lithographic blanket, or printing plate surface, is used where FIG. 48A is a section of such an ink printing system.

In FIG. 48A it is possible to apply a thin film over the top level, shown as coating surface 9, or any other surface with two or more levels, holes, cavities and the like so that the thin film burns, or shrinks, upon exposure to heat or flame, by a method known as flame perforating, for example, which provides unexpected results. The first result is that the film may be applied over the base, exposed to flame, whereby the film will shrink over the cavities between the edges 2, but remain over the coating surfaces 9, to act as a mask. This means the coating surfaces may have the film removed after coating to expose the surface 9 for any purpose,, such as one way vision light passages if the material 1 were transparent. Alternately, the coating surface 9 may be coated prior to the film application and flame treatment taught herein, then coatings may be applied, for example by spraying, into the lower surfaces between the coating surfaces 9, followed by the removal of the film from the upper layers. The film may also act as a protective laminate, over the upper coatings. Partial removal of the film, adding one or more coatings to the structure or part thereof, and later removal of the remainder of the film or part thereof can produce identifiable structures and materials for many uses. Use of the films as an intermediate or final surface, or as a release layer are also possible.

Figure 48B:
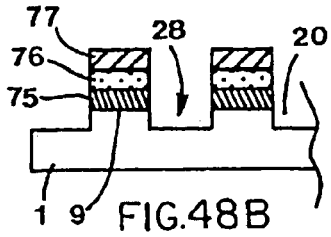

FIG. 48B shows a cross section view of a portion of base 1 whereby, for example, three coatings have been applied to the coating surface 9. Example coatings include a black coating 75, a white coating 76, and a multi color indicia or image coating 77. Light passages 28 exist by virtue of the holes 20 and this embodiment may become the final structure for a one way vision type product for attachment or use in conjunction with see through surfaces such as windows. Assuming the non coating surface of base 1 were to be a static cling type surface or have an adhesive and protective liner applied for subsequent adhesion to a surface, such as a window, then this construction would provide an economical alternative to current known art, such as perforated films and photo stencil type films.

Figure 48C:
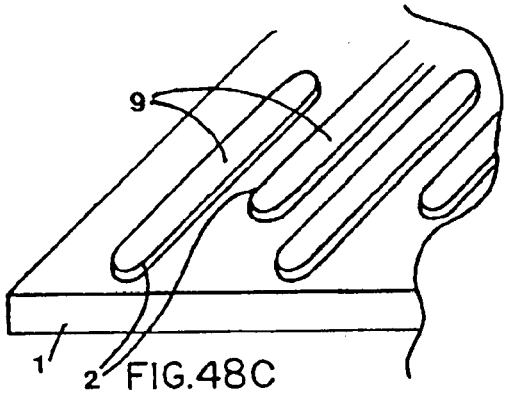

FIG. 48C shows a base 1 comprising a series of coating surface 9 contained on plateaus, as defined herein, using the edge 2 to define the print surface.

Figure 48D:
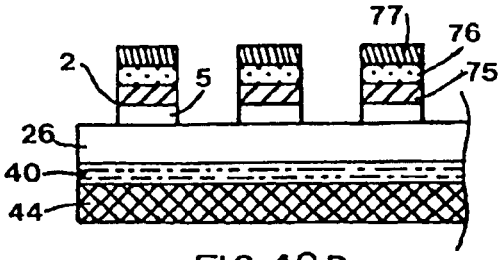

FIG. 48D shows a cross section of a typical construction comprising a release liner 44 together with an adhesive 40 attached to, in this example, a transparent material 26 which has had coatings applied. To create a defined edge 2, a coating 5 has been applied in one or more patterns to the upper surface of transparent material 26. The applied coatings could produce a one way vision result by their orientation, for example black 75 is applied first, white 76 follows, and an indicia coating 77 is last. Additionally, other coatings including protective cover coats or other material such as protective laminates may be applied as a subsequent step. The coating 5 is used to provide a secondary base level under the teachings herein and, in this example, would be typically transparent. It is also possible for the base 5 to be an opaque, monochromic, or black coating such as to provide a base which is formed of one of the steps well known in one way vision art.

FIG. 49A shows two levels of imagable material whereby the lower substrate 1A is a solid material, where solid means not containing any holes or cavities as a portion of its structure, and may be opaque, but would normally be transparent for the preferred use. Substrate or base 1B may be releasable attached by release layer 7 and may be opaque or could become at least partially opaque after imaging, on the coating surface 9B. The holes 31 in substrate 1B will serve two uses.

By taking a recessed base, printing one or more layers of coatings, placing a separating layer such as a release coat, water soluble coat, low tack adhesive or other means of creating temporary attachment, but separation late, and then adding one or more layers of coatings an then splitting the material at the release layer point, you can have a matched pair of different materials or images combining the same recess or raised or other pattern, as the case may be, together with the same edge or edge treatment to create paired documents or items. It is also useful if the recess in the substrate is of sufficient depth and diameter to resist the acceptance of ink from any paint or print method, such as screenprint, offset, lithography and the like, such that an unprinted area can be obtained, or, alternatively, it is possible to have small recesses of narrow surface diameters such that ink, under normal printing processes, such as screenprinting, will bridge the gap across the hole and create an air space. Combinations of recesses on a base can create precise patterns. With selective treatment, it is possible to add other materials into the recess such as metals, for example.

FIG. 49B shows the same construction as FIG. 49A from a perspective view whereby bases or substrates 1A and 1B have been releasably attached to each other and the pattern of holes 31 in substrate 1B is more apparent. The upper surface 9B of substrate B is intended to be a coating surface, and the holes 31 of substrate 1B have, as one use, to permit coatings to penetrate the holes and come in contact with the upper surface of substrate 1A at the coating positions 9A. If, for example, the holes in substrate 1B occupied approximately 50% of its surface area, this would mean that the upper coating surface 9B of substrate 1B would have an image occupying that upper surface which would provide a readable image if and when separation between materials 1A and 1B occurs. The coatings 9A, which penetrated the holes 31 of substrate 1B and became deposited in part of the upper surface of substrate 1A, would also form an independent image after separation of substrates 1A and 1B. Whilst it is assumed that a 50/50 type coating area to the whole area would be desirable, it is naturally possible to have any ratio between one and the other. Further, it is possible that with a reasonably deep hole 31 and by keeping the substrate 1A and 1B together in contact, to create a degree of directional visibility such that when viewed from wide side angles, only the coatings 77A on the upper surface would be visible whilst the coatings 77B on the lower surfaces would not be visible until an observer was directly in front of the structure, and could see in through the holes 31 to the lower substrate and thus, form a complete image when viewed from that angle. Therefore as an observer walked from one side to the other, they would have an initial view of the upper surface images as they passed at approximately right angles to the plane of the structure they would see a complete image, and as they continued walking or moving past the surface the image area would reduce until only the upper surface was visible. This will create dramatically visual and attention getting effects.

FIG. 49C shows a similar structure of FIG. 49B, with the addition of a second material contained between the base 1A and a release coat 7, whereby a coating is being applied from an external source such that coatings 5, in this example, may be sprayed onto the upper surface 9B of the upper substrate 1B to become indicia or image 77A. Because it is a spray, inkjet, paintjet, hot wax, or other process, the coating will also penetrate into the holes and become deposited as a coating 77B. The upper surface 9B will have the coating 77A, typically a multi colored image of some sort. It is likely that several coatings would be applied according to specific needs. If the intended result were to create two one way vision panels both of the same general image from this one operation, then it may be that a black coating could be applied first, followed by a white, followed by the multi colored indicia, or if reverse image printing were desirable, then the reverse of these steps could be completed. Additionally, other coatings such as clear cover coats or protective coats may be applied at this time or later. After imaging or coating the surfaces may separate at release coating 7 such that the upper base 1B has a multicolored indicia 77A and the lower base 1A has indicia 77B visible within the holes 2.

FIG. 49D shows a side elevation through a section of a typical structure. In this example, there are three applied coatings, namely 77A on the upper level, and three coatings 77B on the lower levels, and no coatings on coating surface 9B whereby the holes 31 and an edge 2 which was used to separate the upper and lower levels for coating purposes. It is usual that coatings 77B are not thick enough to contact coatings 77A. If the release substance 7 lined the sides of the holes 31, then separation of both layers 1A and 1B could be easier.

FIG. 49E shows a representation of the separation after imaging such that the substrate 1B is being separated from substrate 1A and that the indicia or other readable, visible, light reflective, or absorbent, image 77A shows, in this example, round, circular, regularly spaced dots. The image 77B on substrate 1B has contained within at least part of it or image, one or more holes which become in one embodiment, light passages. Thus, the perimeter coating alignment has made possible two images from one process. Of course, the holes need not be round, and there may be only one hole, one irregular shape, or portion, on any material, and it is possible to have any shape overlapped upon a usually solid shape or to have a combination of holes in some materials, some of which line up with other substrates and some of which do not, to be able to reproduce more than two images in one series of coating applications or even with one single coating being applied.

it is also possible to apply one or more initial coatings to the construction as shown in FIGS. 49A–E, but to separate the two or more substrates at some stage in a multi coating process such that certain substrates receive additional coatings of similar or different types, whilst another one of the substrate remains unchanged after that step, or separately it may have different coatings applied for different purposes such that a portion of the image is identical on both substrates. After separation and subsequent coatings as taught herein, the final result may comprise the addition of different coatings as well as the common coatings. Should the different coatings be such as to seal the original matched coatings, then the result is an identifiable pair of substrates, for example documents, which may when brought back together to provide positive identification, or other uses. Other examples of these constructions include one way vision purposes whereby each substrate 1A and 1B, when separated, include light passages. In the case of substrate 1B, the light passages are formed through the holes 31. If the substrate 1A were transparent, and the indicia was in the shape of the example round dots with images 77B, then the light passages could be through the transparent substrate 1A between the areas of coating.

FIG. 50A shows a pattern which may comprise either the structure of a base with a teardrop shape on the imaging surface or cavities or holes of teardrop shape or indicia on a final surface. This pattern may also be beneficial in one way vision applications whereby the teardrop is a light passage 28 and between the light passages is indicia 8. The indicia may either be a mono or multi colored image or, when viewed from the other side the indicia 8 may be a black coating. The teardrop shape is beneficial optically in image creation for use on see through surfaces above ground level, such that observers to the left, below, and to the right of the structure gain, through perspective, a more even appearance of light passage and/or image combination. When viewed from above, the reverse effect of perspective applies, and the pattern looks uneven.

FIG. 50B shows a reverse of FIG. 50A such that the coating surfaces of indicia 8 are in the teardrop shape, and the remaining area is a contiguous light passage 28.

It is also possible to produce the effect or appearance as shown in the following two figures, using either the same base and reusing the base on two or more occasions, or alternatively, using two bases of the same or different constructions.

FIG. 50C shows two types of coatings, one placed over the other at an angle, in this case, at right angles to the first Black coating 75 may be used and applied, for example, to a see through surface or may be a self sustaining structure whereby the finished product may be suspended or supported to provide a one or two way vision effect. The light passages 28 are formed between, in this example, parallel pairs of bars of coatings where the horizontal bars show an indicia of one or more colors 77 and the vertical bars show a black 75 coating. By varying the width of the bars or the spacing between either the vertical or horizontal bars, or both, it is possible to produce advantageous results as follows. When the black bars 75 are placed further apart, it is easier to see through the surface. If the colored bars are enlarged or placed closer together, it is more difficult to see through from the one side, and a differential effect is visible on the other side.

FIG. 50D is the reverse of FIG. 50C whereby the horizontal bars are covering and concealing a portion of the vertical bars and yet the light passages 28 remain square and equal. Also, variations as disclosed in FIG. 50C can provide a variety of control effects for visibility such that enlargement of the horizontal black bars 75 or spacing the black bars 75 closer together will cover more of the vertical image bars 77 and whilst producing less visibility through the structure from the side of the viewer, will also reduce the apparent effect of the multi colored indicia 77.

It is possible that the same see through surface may have one portion of the window with substantially a one way vision orientation from the one side and another portion or the remaining area of the see-through surface can have one way vision from the other side. It is possible to combine this feature so that portions of the window may have different rates of light transmission from one section to another or an opaque area between two or more areas of light transmissive sections and other combinations thereof.

In creating patterns for perimeter printing, including specifically uses for one way vision, it is economical to use processes which weed out portions of the material and this technique is well known in the art, and has been used extensively in the die cutting of labels and the like. If the base is prepared using this technique, it is possible to have an exactly registered and repeatable structure for coating under the teachings of the present invention and interesting and advantageous shapes can be reproduced repetitively.

FIG. 50E teaches an indicia 8 of a particular pattern such as to leave continuous and repeating patterns of light passages 28. It is possible to vary the relationship between the indicia 8 and the transparent light passage area 28 for particular purposes. It is also possible using multi level techniques as taught herein to have one row of indicia of one image and another row of indicia producing a different effect or image.

FIG. 50F shows the reverse of FIG. 50E by using patterns which are not parallel lines. It is possible to make the pattern less apparent than parallel bars or stripes and thus to not require the same precision of printing orientation that might be necessary in printing horizontal or vertical bars.

FIG. 50G shows a parallelogram pattern which in the orientation as drawn symbolizes a diamond in which indicia is in the background and the diamonds shapes are light passages 28.

FIG. 50H shows the reverse construction of FIG. 50G. Such shapes are reproducible readily because it is possible to cut out via laser or mechanical means, the light passage areas 28 or other area for differentiating between coating and non coating surfaces as shown in FIG. 50H leaving the plateaus as taught herein for the placement of indicia 8. Such constructions are economical and easily repeatable with accuracy.

FIG. 50I shows an embodiment of round indicia 8 with contiguous non indicia or light passage areas 28, whereby each dot is discrete and separated from the other, and would have been printed on a differential material or transposed from another material.

FIG. 50I is the reverse of FIG. 50I whereby the light passages 28 are in a round staggered pattern and this pattern has proved popular for one way vision applications in the prior art. However, the construction of previous patterns producing light passages 28 of this configuration was achieved using the method of punching materials which does not allow for the transportation of multi coatings and a variety of the optional coating choices, such as PVC, of the present invention.

FIG. 50K shows a six sided structure as an example of any multi sided structure of any type and placement such that the light passages 28 are through the multi sided structure and the indicia 8 is between the multi sided structures.

FIG. 50L is the reverse of FIG. 50K. It is possible to create such symmetrical patterns using known preparation means to create unique bases, and it is of course possible to create combinations of any of the shapes, patterns, and other teachings of this invention to produce unique results. A simple example would be the use of parallel bars around the extremity of an image such as the concept of a picture frame, whilst the interior image may be composed of other shapes to provide a variety of light control, heat control, energy control, reflectivity, opacity, and any other teachings as disclosed herein, or other uses.

FIG. 50M is a simple construction of parallel bars whereby the base may have been produced by cutting, embossing, or other means and the width and there is a spatial relationship between the indicia bars 8 and the non imaged areas or light passage areas 28. It is also possible to have a gradiated effect whereby, for example, the highest bar may be of a wide width whilst the bar on the other side of the base may be of a narrow width and each bar between the widest and narrowest reduces slightly in size as it progresses across the surface area.

FIG. 50N is a reverse of FIG. 50M and the bars may be parallel, angular, or mixed in size or proportion as disclosed herein, or overlaid one against the other in both right angular relationship or at an angular relationship such as to create a visual diamond effect when the bars of one coating are laid across the bars of another at any angle. The right angle relationship between these bars may be combined with a reversing of the image orientation as taught in FIGS. 50C and 50D.

One method to remove the such a product is to apply a pressure sensitive type material to the coatings or film on the window, when the adhesive strength of the removal material is greater than the adhesion between the product and the window and to then remove it by removing the now attached structure. If a film is used, an adhesive tape is adequate on one end of each of the interleave stripes which, when attached, can be used to lever and pull the ends up and thereby pull the remaining length of the material off the window readily.

Figure 50O:
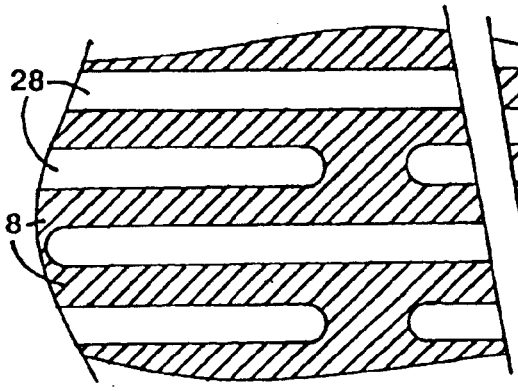

FIG. 50O shows a pattern comprising parallel sides with rounded ends which bear a similarity to a shape known as "racetracks" whereby the construction of the base material provides a contiguous imaging surface 8 of the entire structure as compared to the discrete coating surface as shown in FIG. 50M or 50N, and yet retains the ability to control non imaged areas or light passages 28 in some percentage relationship compared to the coated or imaged areas of indicia 8.

Figure 50P:
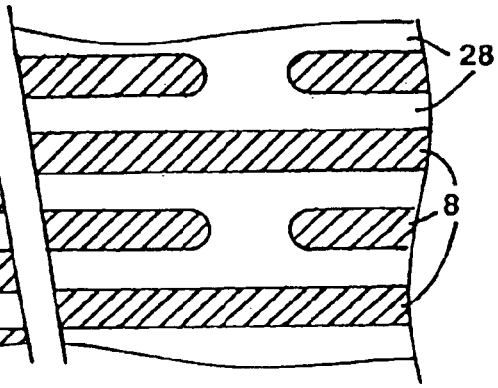

FIG. 50P is the reverse of FIG. 50O, and the coatings would be discrete from each other.

Figure 50Q:
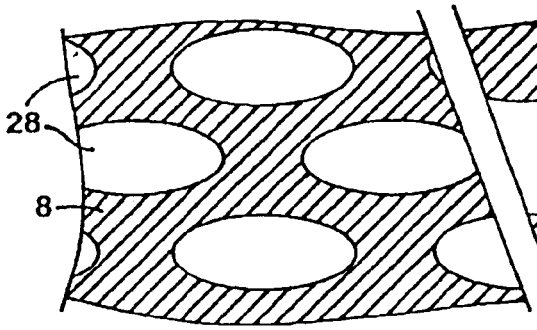

FIG. 50Q shows oval light passages 28 and a contiguous indicia 8. It is possible to vary the length, shape, and proportion of such ovals or other shapes, or to use ovals in conjunction with other shapes, to produce desired visual patterns.

Figure 50R:
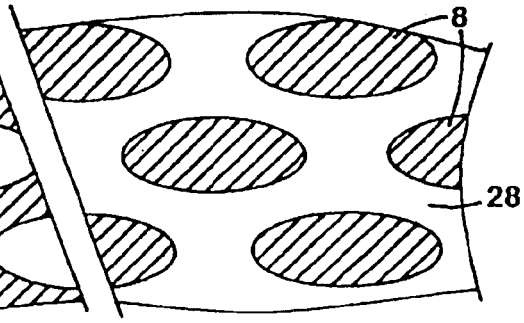

FIG. 50R is the reverse of FIG. 50Q.

Certain structures may be made to leave on a surface or for combining with a partially aligned surface overlaid with a transposed surface and/or an over laminated protective surface, for numerous purposes.

Patterns, such as the examples included in the present invention, may be used for window treatments, such as mini-blinds, horizontally and vertically rotatable panels, multi-sided panels. Venetian blinds, shades, vertical blinds, shutters and other materials used to provide a degree of energy, glare, light or vision control between the inside and the outside of the building, and can be made to provide either dual images such that when, for example, a vertical blind is rotated it can have a message on one or both side or a decorate pattern or other colored indicia on one side and a mirrored or see through effect on the other.

Protection of a material in sunlight conditions can be obtained by the addition of UV resistant formulations in the base material or by the addition of protective coatings on the exposed surfaces of the material or by the use of a over-laminate film or similar material to provide protection for both the material and any indicia or visible coatings placed on or in close proximity to the surface thereof.

Other combinations of control examples as taught herein include heat and light; heat and energy and light; energy and light radiation and thermal conductivity; light and radiation, radiation and energy, and others such as glare

SUMMARY

The subject matter of this present invention as taught herein together with any embodiment, example, figures, title or combinations of part of any one or more of all of them, and the uses of any of the teachings herein, including combinations of any one or more or all of the embodiments, any one or more or all of the examples, any one or more or all of the figures or titles, or any part of any one of the embodiments together with any one or more parts of the examples or any one or more part or parts of the figures. It would be apparent that there are numerous permutations of combinations of embodiments, examples, figures and titles, and the teachings, any part of any one of which can be combined to produce different results, or to accomodate uses which have not been specifically taught in the present application, and are incorporated by reference together with any coating which may be applied in a variety of ways known in the prior art or taught herein or which become available in the future, and the same types of coatings may be applied in the same or different ways and any other combination to any one or more materials of any type.

It is anticipated that new methods of applying coatings, new formulations of coatings and new compounds or coatings comprising multiple elements and functions will be developed in the future and these are incorporated by reference.

Technical improvements, advances in imaging methods, techniques and materials, future improvements and specialized techniques in electronics and other methods of scanning and identification or anti counterfeiting techniques which may now exist or will be invented in the future and combinations of all of the above may be used with the teachings of the present invention.

It is envisaged that like numerals in the figures may have different meanings in various embodiments, and also may have the same meaning in any one or more embodiments or examples. For example, "coating 5" may be one substance on one figure, embodiment or example, and a different substance in one or more other figure, embodiment or example, situation or use or uses.

Since certain changes may be made in the teachings in the present invention without departing from the spirit and scope of the invention herein, it is intended that all matter contained in the above-description or shown in the accompanying figures shall be interpreted as illustrative and not in a limiting sense.

What is claimed is:

1. A method of forming a pattern of color coatings onto a light permeable panel with exact registration between successive color coatings along defined edges of the pattern, and wherein the panel with the pattern of color coatings formed thereon for use as a one-way vision panel, the method comprising the steps of:

a) providing a base material having an ink printable release coating on one side thereof;

b) applying a first color coating to the printable release coating side or said base material;

c) applying at least one additional color coating over at least a portion of said first color coating;

d) perforating said base material with said color coatings to provide a pattern of perforate and non-perforate portions to achieve exact registration of said at least one additional color coating with said first color coating for achieving one-way vision effects;

e) transferring said pattern of color coatings from said non-perforate portions of said base material onto a surface of a light permeable panel maintaining the exact registration; and f) heating said light permeable panel to fuse said pattern of color coatings onto said surface of said light permeable panel.

2. The method according to claim 1 wherein:

a) said base material comprises water slide paper; and b) said step of transferring said pattern of color coatings includes wetting said base material to release said pattern of applied color coatings therefrom for water slide transfer to said light permeable panel.

3. The method according to claim 2 wherein at least one of said color coatings is opaque.

4. The method according to claim 3 wherein said color coatings comprise ceramic ink.

5. The method according to claim 3 wherein said color coatings comprise enamel.

6. The method according to claim 2 which includes the step of applying at least one coating of metalized material over at least a portion of said printable release coating side of said base material prior to applying said first color coating.

7. The method according to claim 1 wherein:

a) said base material comprises heat transfer paper;

b) said step of transferring said pattern of color coatings includes applying pressure and heat to said heat transfer paper to release said pattern of applied color coatings therefrom.

8. The method according to claim 7 wherein at least one of said color coatings is opaque.

9. The method according to claim 8 wherein said color coatings comprise ceramic ink.

10. The method according to claim 8 wherein said color coatings comprise enamel.

11. The method according to claim 7 which includes the step of applying at least one coating of metalized material over at least a portion of said printable release coating side of said base material prior to applying said first color coating.

12. A method of forming a laminate pattern of color coatings onto a light permeable panel with exact registration between successive color coatings along defined edges of the pattern, and wherein the panel with the laminate pattern of color coatings formed thereon for use as a one-way vision panel, the method comprising the steps of:

a) providing a base material having an ink printable release coating on one side thereof;

b) cutting the base material to provide a desired pattern of perforate and non perforate portions for attaining exact registration of successively applied layers of color coatings suitable for one-way vision effects;

c) applying a first color coating to the non-perforate portions of the printable release coating side of the base material;

d) applying at least one additional color coating over at least a portion of the first color coating, the application of the additional color coating to the first color coating defining a laminate pattern of color coatings with exact registration along defined edges of the remaining non-perforate portions of the cut base material;

e) transferring the laminate pattern of color coatings onto a surface of a light permeable panel maintaining the exact registration; and f) heating the light permeable panel to fuse the laminate pattern of color coatings onto the surface of the light permeable panel.

13. The method according to claim 12 wherein:

a) the base material comprises water slide paper; and b) the step of transferring the laminate pattern of color coatings includes wetting said the material to release the laminate pattern of applied color coatings therefrom for water slide transfer to the light permeable panel.

14. The method according to claim 13 wherein at least one of the color coatings is opaque.

15. The method according to claim 14 wherein the color coatings comprise ceramic ink.

16. The method according to claim 14 wherein the color coatings comprise enamel.

17. The method according to claim 13 which includes the step of applying at least one coating of metalized material over at least a portion of the non-perforate portions of the printable release coating side of the base material prior to applying the first color coating.

18. The method according to claim 12 wherein:

a) the base material comprises heat transfer paper;

b) the step of transferring the laminate pattern of color coatings includes applying pressure and heat to the heat transfer paper to release the laminate pattern of applied color coatings therefrom.

19. The method according to claim 18 wherein at least one of the color coatings is opaque.

20. The method according to claim 19 wherein the color coatings comprise ceramic ink.

21. The method according to claim 19 wherein the color coatings comprise enamel.

22. The method according to claim 18 which includes the step of applying at least one coating of metalized material over at least a portion of the non-perforate portions of the printable release coating side of the base material prior to applying the first color coating.

*23. A method of forming a pattern of at least two coatings onto a base substrate to achieve edge alignment between at least a part of each of said coatings along at least a part of one edge of said pattern, the method comprising the steps of:*

*a) providing a substrate comprising at least one base;*

*b) applying a first coating to at least a part of said base;*

*c) applying at least a second coating over at least a portion of said first coating; and*

*d) during formation of said pattern, modifying at least a portion of said first coating over-covered by said second coating by applying energy thereto via an over-covering region of said second coating such that a characteristic of said first coating is altered;*

*wherein said edge alignment is achieved without mechanically altering an edge portion of either applied coating.*

* * * * *